(12) United States Patent
Ellsworth et al.

(10) Patent No.: US 12,705,260 B2
(45) Date of Patent: Aug. 11, 2026

(54) USER-DEFINED GRAPHICAL CROSS-LAYOUT WITH INTERSECTION AREAS REPRESENTING TWO-DIMENSIONAL GROUP MEMBERSHIP AND NON-INTERSECTION AREAS REPRESENTING ONE-DIMENSIONAL GROUP MEMBERSHIP

(71) Applicant: Lucid Software, Inc., South Jordan, UT (US)

(72) Inventors: Kevin M. Ellsworth, Sandy, UT (US); Kevin J. Reece, South Jordan, UT (US); Jonathan Bronson, Salt Lake City, UT (US)

(73) Assignee: LUCID SOFTWARE, INC., South Jordan, UT (US)

(*) Notice: Subject to any disclaimer, the term of this patent is extended or adjusted under 35 U.S.C. 154(b) by 206 days.

(21) Appl. No.: 18/463,195

(22) Filed: Sep. 7, 2023

(65) Prior Publication Data

US 2023/0418846 A1 Dec. 28, 2023

Related U.S. Application Data

(63) Continuation-in-part of application No. 18/168,747, filed on Feb. 14, 2023, now abandoned, which is a (Continued)

(51) Int. Cl.
*G06F 16/28* (2019.01)
*G06F 3/04812* (2022.01)
*G06F 3/04842* (2022.01)

(52) U.S. Cl.
CPC ........ *G06F 16/288* (2019.01); *G06F 3/04812* (2013.01); *G06F 3/04842* (2013.01); *G06F 16/287* (2019.01)

(58) Field of Classification Search
None
See application file for complete search history.

(56) References Cited

U.S. PATENT DOCUMENTS 6,292,933 B1 * 9/2001 Bahrs ................ H02M 3/33592 707/999.203
6,968,511 B1 11/2005 Robertson (Continued)

FOREIGN PATENT DOCUMENTS

| | | | |
|---|---|---|---|
| WO | 98-29820 | A1 | 7/1998 |
| WO | 2004-051521 | A1 | 6/2004 |
| WO | 2018-085785 | A1 | 5/2018 |

OTHER PUBLICATIONS

PCT International Search Report and Written Opinion issued in corresponding application No. PCT/US2024/044429, dated Dec. 10, 2024.

(Continued)

*Primary Examiner* — Gabriel Mercado
(74) *Attorney, Agent, or Firm* — Maschoff Brennan

(57) ABSTRACT

In an example, a computer-implemented method to modify a displayed hierarchy of a graphical diagram includes displaying, on a display device, a graphical diagram with multiple graphical objects. The method includes receiving input effective to modify a hierarchy of the graphical diagram, the hierarchy including two or more hierarchical levels. The method includes rearranging the graphical diagram according to the modified hierarchy, including rearranging at least some of the plurality of graphical objects according to the modified hierarchy.

18 Claims, 29 Drawing Sheets

Related U.S. Application Data continuation of application No. 17/491,334, filed on Sep. 30, 2021, now Pat. No. 11,593,410.

(56) References Cited

U.S. PATENT DOCUMENTS

| | | | | |
|---|---|---|---|---|
| 7,962,859 | B2* | 6/2011 | Attili | G06F 16/283 715/217 |
| 8,429,179 | B1 | 4/2013 | Mirhaji | |
| 8,677,268 | B2 | 3/2014 | Capela et al. | |
| 9,035,949 | B1 | 5/2015 | Oberheu | |
| 9,626,098 | B2 | 4/2017 | Migos | |
| 9,674,045 | B2 | 6/2017 | Latham et al. | |
| 9,717,055 | B2 | 7/2017 | Su et al. | |
| 10,061,849 | B2 | 8/2018 | Hyman | |
| 10,565,471 | B1 | 2/2020 | Abdi Taghi Abad et al. | |
| 10,802,698 | B1* | 10/2020 | Draper | G06T 11/206 |
| 10,860,635 | B2 | 12/2020 | Bator et al. | |
| 11,029,806 | B1 | 6/2021 | Wijegunawardana | |
| 11,593,410 | B1 | 2/2023 | Ellsworth et al. | |
| 2002/0112180 | A1 | 8/2002 | Land et al. | |
| 2003/0212585 | A1 | 11/2003 | Kyoya et al. | |
| 2004/0090472 | A1 | 5/2004 | Risch et al. | |
| 2005/0198605 | A1 | 9/2005 | Knol et al. | |
| 2007/0009178 | A1 | 1/2007 | Kim et al. | |
| 2008/0147605 | A1 | 6/2008 | Bensalah et al. | |
| 2008/0172628 | A1 | 7/2008 | Mehrotra et al. | |
| 2009/0132497 | A1 | 5/2009 | Nagai | |
| 2010/0161558 | A1 | 6/2010 | Goldberg et al. | |
| 2011/0029933 | A1 | 2/2011 | Chu et al. | |
| 2011/0181528 | A1 | 7/2011 | Capela et al. | |
| 2013/0002796 | A1* | 1/2013 | Hiller | G06F 3/0485 348/E7.078 |
| 2013/0124528 | A1* | 5/2013 | Gourdol | G06F 16/148 707/740 |
| 2013/0262522 | A1 | 10/2013 | van Rotterdam et al. | |
| 2013/0283175 | A1 | 10/2013 | Faridian et al. | |
| 2013/0339311 | A1 | 12/2013 | Ferrari et al. | |
| 2014/0095972 | A1 | 4/2014 | Molesky et al. | |
| 2014/0218383 | A1 | 8/2014 | Srivastava | |
| 2014/0280849 | A1 | 9/2014 | Aras | |
| 2014/0380232 | A1 | 12/2014 | Sarnoff et al. | |
| 2015/0281342 | A1 | 10/2015 | Lee | |
| 2015/0288569 | A1 | 10/2015 | Agarwal | |
| 2015/0309692 | A1 | 10/2015 | Migos | |
| 2015/0378521 | A1* | 12/2015 | Wang | G06F 9/451 715/841 |
| 2016/0004752 | A1 | 1/2016 | Zlamany | |
| 2016/0292443 | A1 | 10/2016 | von Muhlen et al. | |
| 2016/0335280 | A1 | 11/2016 | Shmerl | |
| 2017/0083920 | A1 | 3/2017 | Zoldi | |
| 2017/0213349 | A1 | 7/2017 | Kuo et al. | |
| 2018/0089299 | A1 | 3/2018 | Collins et al. | |
| 2018/0107348 | A1 | 4/2018 | Nakao | |
| 2018/0173406 | A1 | 6/2018 | Hill et al. | |
| 2018/0365279 | A1 | 12/2018 | Kaipainen | |
| 2019/0097890 | A1 | 3/2019 | Zhang et al. | |
| 2019/0362016 | A1 | 11/2019 | Xie et al. | |
| 2020/0160188 | A1* | 5/2020 | Zhao | G06N 5/022 |
| 2020/0175043 | A1 | 6/2020 | Hughes | |
| 2020/0175181 | A1 | 6/2020 | Hughes | |
| 2020/0195459 | A1 | 6/2020 | Liu | |
| 2020/0341606 | A1 | 10/2020 | Kleinerman | |
| 2021/0150489 | A1* | 5/2021 | Haramati | G06F 16/252 |
| 2021/0334270 | A1 | 10/2021 | Li | |
| 2021/0358476 | A1 | 11/2021 | Leone et al. | |
| 2021/0406288 | A1 | 12/2021 | Wright | |
| 2023/0418846 | A1 | 12/2023 | Ellsworth et al. | |
| 2024/0126814 | A1 | 4/2024 | Soto | |
| 2025/0086169 | A1* | 3/2025 | Zeng | G06F 16/9024 |

OTHER PUBLICATIONS

European Search Report issued in corresponding application No. 22877137.4, dated Jun. 2, 2025.

International Search Report and Written Opinion, as issued in connection with International Patent Application No. PCT/US2022/043977, mailed Jan. 12, 2023, 10 pgs.

Australian First Examination Report, as issued in connection with Australian Application No. 2022358239, dated Nov. 26, 2024, 4 pgs.

Australian Second Examination Report, as issued in connection with Australian Application No. 2022358239, dated Apr. 15, 2025, 3 pgs.

* cited by examiner

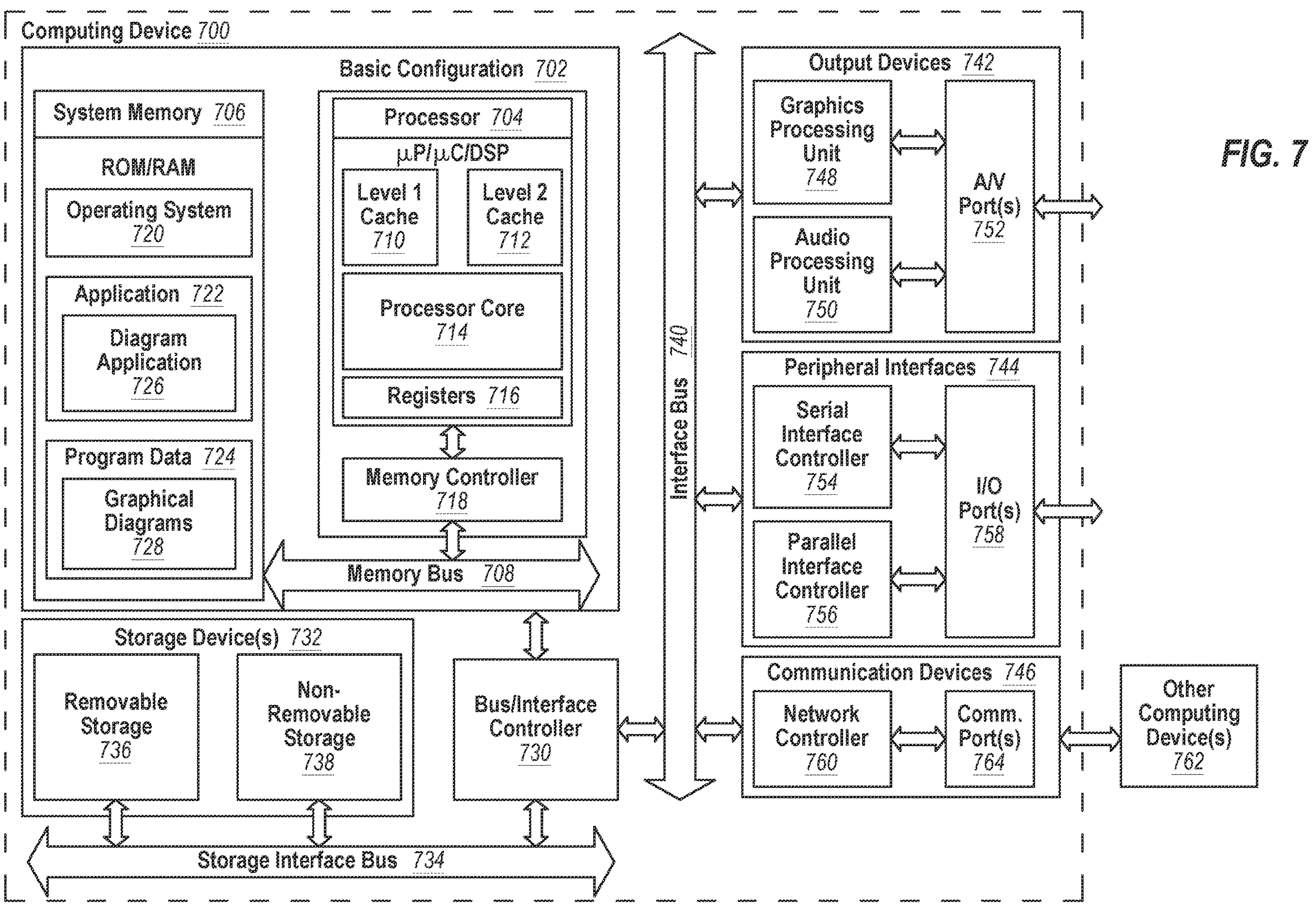
FIG. 7
Computing Device 700
Basic Configuration 702
System Memory 706
ROM/RAM
Operating System 720
Application 722
Diagram Application 726
Program Data 724
Graphical Diagrams 728
Processor 704
μP/μC/DSP
Level 1 Cache 710
Level 2 Cache 712
Processor Core 714
Registers 716
Memory Controller 718
Memory Bus 708
Storage Device(s) 732
Removable Storage 736
Non-Removable Storage 738
Bus/Interface Controller 730
Storage Interface Bus 734
Interface Bus 740
Output Devices 742
Graphics Processing Unit 748
Audio Processing Unit 750
A/V Port(s) 752
Peripheral Interfaces 744
Serial Interface Controller 754
Parallel Interface Controller 756
I/O Port(s) 758
Communication Devices 746
Network Controller 760
Comm. Port(s) 764
Other Computing Device(s) 762

USER-DEFINED GRAPHICAL CROSS-LAYOUT WITH INTERSECTION AREAS REPRESENTING TWO-DIMENSIONAL GROUP MEMBERSHIP AND NON-INTERSECTION AREAS REPRESENTING ONE-DIMENSIONAL GROUP MEMBERSHIP

CROSS-REFERENCE TO RELATED APPLICATIONS

This application is a continuation-in-part of U.S. patent application Ser. No. 18/168,747 filed on Feb. 14, 2023 which is a continuation of U.S. patent application Ser. No. 17/491,334 filed on Sep. 30, 2021 (now U.S. Pat. No. 11,593,410). Each of the Ser. No. 18/168,747 application and the Ser. No. 17/491,334 application is incorporated herein by reference in its entirety.

FIELD

The embodiments discussed herein are related to user-defined graphical hierarchies.

BACKGROUND

Unless otherwise indicated herein, the materials described herein are not prior art to the claims in the present application and are not admitted to be prior art by inclusion in this section.

Some structured source data, e.g., of networks, organizations, or other structured source data, lends itself to representation in the form of a diagram or other visualization, such as a network diagram or an organizational chart. Some diagram applications allow users to generate graphical diagrams on a computer based on the structured source data. Such graphical diagrams may include graphical objects that represent data objects, resources, or nodes in the structured source data.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a computer-implemented method to display graphical objects includes displaying, on a display device, a graphical diagram with multiple graphical objects. The method includes receiving input effective to modify a hierarchy of the graphical diagram, the hierarchy including two or more hierarchical levels. The method includes rearranging the graphical diagram according to the modified hierarchy, including rearranging at least some of the graphical objects according to the modified hierarchy.

In another example embodiment, a non-transitory computer-readable medium has computer-readable instructions stored thereon that are executable by a processor to perform or control performance of operations. The operations include displaying, on a display device, a graphical diagram with multiple graphical objects. The operations include receiving input effective to modify a hierarchy of the graphical diagram, the hierarchy including two or more hierarchical levels. The operations include rearranging the graphical diagram according to the modified hierarchy, including rearranging at least some of the graphical objects according to the modified hierarchy.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 7 is a block diagram illustrating an example computing device that is arranged to generate and/or display graphical diagrams, all arranged in accordance with at least one embodiment described herein.

DETAILED DESCRIPTION OF SOME EXAMPLE EMBODIMENTS

Figure 1:
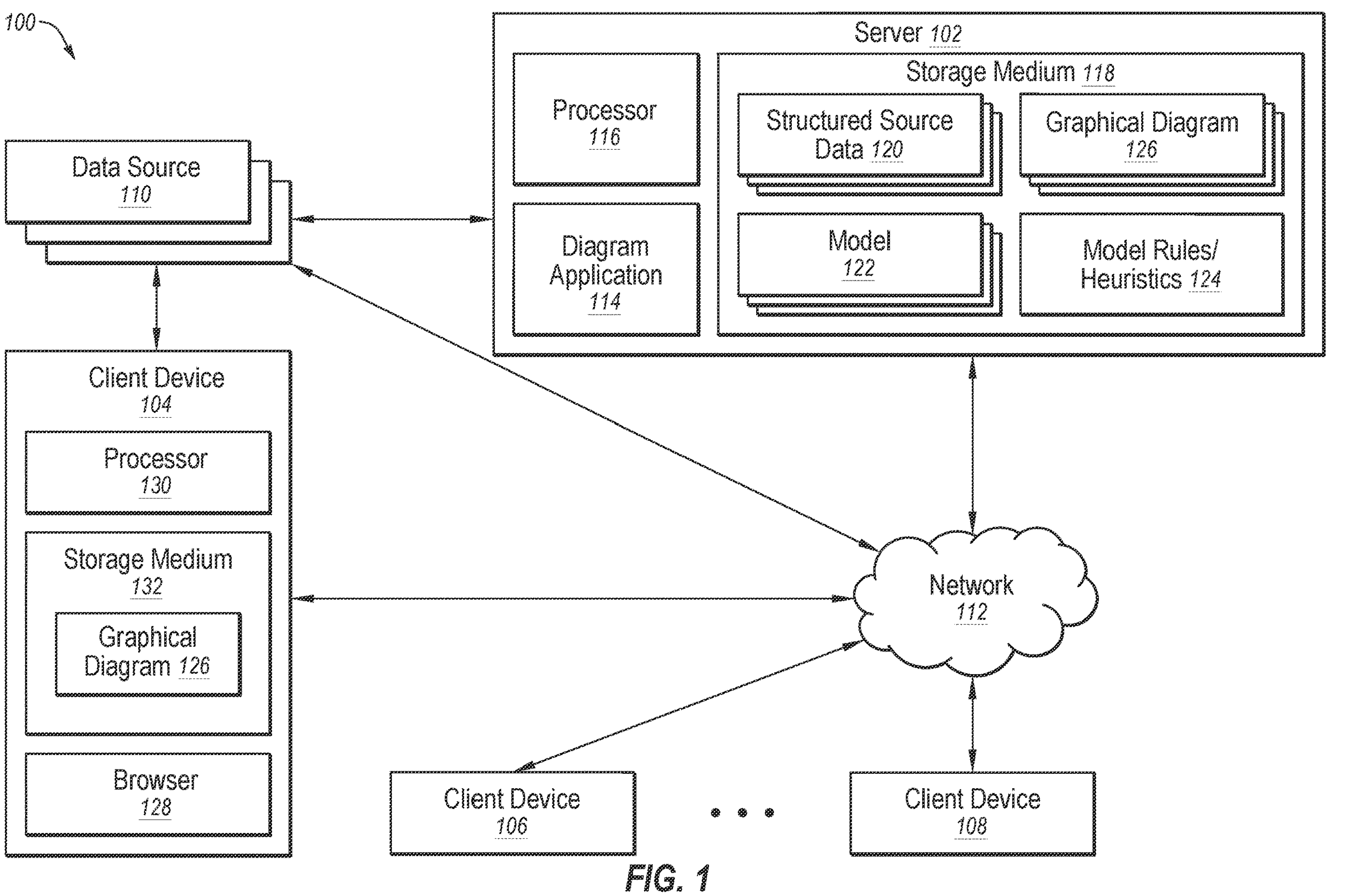
FIG. 1 is a block diagram of an example operating environment that includes a server and one or more client devices.

Some users may desire to group various data objects, nodes, or resources of structured source data together even if they are unrelated in the structured source data. For example, some EC2 instances in AWS structured source data may be part of the same subnet but may serve completely different applications. While the structured source data may reflect the inclusion of the EC2 instances in the same subnet and a suitable diagram application may illustrate the EC2 instances as belonging to the same subnet (or more particularly may illustrate graphical objects representing the EC2 instances within a container graphical object representing the subnet), the structured source data may fail to reflect the relationships between the EC2 instances and the applications they serve and the diagram application may be unable to show that the EC2 instances serve different applications without the relationships in the structure source data.

Some embodiments herein may permit users to define groups, hereinafter user-defined groups, of resources or other entities, or more particularly of graphical objects that represent resources or other entities. For example, a user may define groups based on one or more existing properties, or attributes, of the graphical objects. The attributes may include tags that may be system-defined or user-defined. In this example, a user may define one or more groups by selecting an attribute to group on. The system may identify one or more unique values of the selected attribute, may generate a different container for each unique value, and may group the graphical objects into one or more resulting containers according to the value each graphical object has for the selected attribute. As another example, the user may define a group by selecting a single graphical object or simultaneously selecting multiple graphical objects and selecting an option in a UI to group the selected graphical object(s) together. In this example, the system may generate a container and arrange the selected graphical objects in the container.

Alternatively or additionally, some embodiments herein may permit users to define a displayed hierarchy, or specifically how hierarchical data is displayed in a graphical diagram. For example, users may enable or disable a given hierarchical level to add or eliminate the display of graphical containers at the given hierarchical level. Graphical objects at a next lower hierarchical level may be arranged within the graphical containers according to their membership in the graphical containers when the given hierarchical level is enabled, or may be redistributed from among multiple graphical containers at the given hierarchical level to within a single graphical container at a next higher hierarchical level when the given hierarchical level is disabled. As another example, users may enable or disable one or more groups at a given hierarchical level to add or eliminate the display of graphical containers corresponding to the one or more groups at the given hierarchical level. Graphical objects at a next lower hierarchical level may be arranged within the graphical containers according to their membership in corresponding group members of the groups, the group members represented by the graphical containers, when the given group is enabled, or may be redistributed from among multiple graphical containers representing the corresponding group members of the group at the given hierarchical level to within a single graphical container at a next higher hierarchical level when the given group is disabled. Some embodiments may permit users to simultaneously display containers representing group members of two different groups in a cross-layout arrangement in which group members of a first group are represented by first graphical containers arranged in a row or column and group members of a second group are represented by second graphical containers arranged in the other of the column or row. In the cross-layout arrangement, the first and second graphical containers may be arranged to intersect each other such that any graphical object at a lower hierarchical level from the two groups and that belongs to both a first given group member of the first group and a second given group member of a second group may be arranged in an intersection area of a corresponding one of the first containers (e.g., that represents the first given group member) and a corresponding one of the second containers (e.g., that represents the second given group member).

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1 is a block diagram of an example operating environment 100 that includes a server 102 and one or more client devices 104, 106, 108, arranged in accordance with at least one embodiment described herein. The server 102 and/or the client devices 104, 106, 108 may be configured to generate and display graphical diagrams or visualizations that include graphical objects based on structured source data. The terms graphical diagram and visualization are used interchangeably herein. In some embodiments, users may be able to create user-defined groups of graphical objects in graphical diagrams and/or may be able to impose or apply a user-defined hierarchy to graphical diagrams.

The structured source data may be received from one or more data sources 110. Each of the data sources 110 may include, for example, a cloud infrastructure provider such as AWS, GOOGLE CLOUD, or MICROSOFT AZURE; a human resources (HR) system or database such as BAMBOOHR or WORKDAY; a customer relationship management (CRM) system such as SALESFORCE.COM or MICROSOFT DYNAMICS CRM; a spreadsheet for HR, e.g., with names, pictures, and/or a reporting structure for employees of an entity; a custom internal logging system; a floorplan database (e.g., with employee office/workstation assignments); a database schema (e.g., to generate Entity Relationship Diagrams); a service-oriented architecture; physical network discovery tools; custom-built technical systems that can be modeled similar to a network; or other suitable data source and/or data collection. The data in each of the data sources 110 may have a specific format, which may be different and/or the same from one data source 110 to another. Some example data formats include proprietary formats, Structured Query Language (SQL), and JavaScript Object Notation (JSON).

The structured source data may identify two or more nodes, resources, and/or other entities and relationships among them. For instance, the structured source data may identify various network resources such as compute nodes, storage nodes, database nodes, networking nodes (e.g., virtual private clouds (VPCs)), regions, availability zones (AZs), and/or other resources deployed by a customer in AWS as well as relationships among the entities, such as specific ports over which specific nodes can communicate or specific VPCs and/or AZs to which compute nodes belong. As another example, the structured source data may identify databases and tables within databases and/or other entities in a database schema as well as relationships among the entities, such as foreign and/or primary keys. As another example, the structured source data may identify employees, executives, owners and/or other personnel of a company as well as their relationships to each other, such as relative ranks and organization into one or more divisions, departments, or other logical units.

Each graphical diagram may graphically represent one or more of the nodes using one or more graphical objects. In particular, each node may be represented by or otherwise associated with a set of one or multiple graphical objects. For example, compute nodes and database nodes of AWS structured source data may each be represented by a corresponding graphical node in a graphical diagram. As another example, a node of an employee or other individual in an organization may be graphically represented by a box or other shape outline (e.g., a first graphical object), a photo of the employee (e.g., a second graphical object), text (e.g., a third graphical object) that may include the employee's name, office location, and/or other information, and/or a connector (e.g., a fourth graphical object) that indicates the employee's supervisor or manager or other individual the employee reports to.

Graphical objects that represent nodes in structured source data may be referred to as data-backed graphical objects. Data-backed graphical objects may be explicitly stored as and/or represented by data collections in structured source data. Each data-backed graphical object may have a corresponding data collection or attribute schema in a set of structured source data that explicitly identifies attributes of the graphical object, such as graphical attributes (e.g., fill color, outline color, shape) as well as other attributes such as resource type or other attribute(s).

The server 102 and/or the client devices 104, 106, 108 may be configured to automatically generate graphical diagrams based on structured source data. The graphical diagrams may be generated based on contract maps. Alternatively or additionally, automatically-generated graphical diagrams or graphical objects therein may be customized by application of conditional formatting. In some embodiments, updates made to the graphical drawings, e.g., to graphical objects within the graphical drawings that represent the nodes, may be propagated back to the structured source data in some circumstances. Alternatively or additionally, the server 102 and/or the client devices 104, 106, 108 may be configured to apply one or more reversible data transforms to the structured source data when generating graphical diagrams. Additional details regarding contract maps, customization of graphical diagrams, conditional formatting, updating structured source data, and reversible data transforms are disclosed in the following U.S. patent documents which are incorporated herein by reference in their entireties: U.S. Patent Pub. No. 20200004865 (U.S. application Ser. No. 16/024,533, filed Jun. 29, 2018), U.S. Patent Pub. No. 20200004866 (U.S. application Ser. No. 16/024,544, filed Jun. 29, 2018), U.S. Patent Pub. No. 20200004872 (U.S. application Ser. No. 16/024,551, filed Jun. 29, 2018), and U.S. application Ser. No. 16/796,757, filed Feb. 20, 2020.

Although one server 102 and three client devices 104, 106, 108 are illustrated in FIG. 1, the operating environment 100 may more generally include one or more servers 102 and one or more client devices 104, 106, 108. In these and other embodiments, the operating environment 100 may include other servers and/or devices not illustrated in FIG. 1.

The operating environment 100 may additionally include a network 112. In general, the network 112 may include one or more wide area networks (WANs) and/or local area networks (LANs) that enable the server 102, the client devices 104, 106, 108, and the data sources 110 to communicate with each other. In some embodiments, the network 112 may include the Internet, including a global internetwork formed by logical and physical connections between multiple WANs and/or LANs. Alternately or additionally, the network 112 may include one or more cellular radio frequency (RF) networks and/or one or more wired and/or wireless networks such as 802.xx networks, Bluetooth access points, wireless access points, Internet Protocol (IP)-based networks, or other wired and/or wireless networks. The network 112 may also include servers that enable one type of network to interface with another type of network.

In general, the server 102 may host a web-based diagram application (hereinafter application) 114 that allows the client devices 104, 106, 108 to generate and display graphical diagrams. In other embodiments, the application 114 may include a non-web-based application but may generally be described herein as a web-based application for simplicity. Alternatively or additionally, some or all of the functionality described as being performed by the diagram application 114 may be performed locally on the client devices 104, 106, 108, such as by a browser or other application executed by the client devices 104, 106, 108.

The server 102 may additionally include a processor 116 and a storage medium 118. The processor 116 may be of any type such as a central processing unit (CPU), a microprocessor (μP), a microcontroller (μC), a digital signal processor (DSP), or any combination thereof. The processor 116 may be configured to execute computer instructions that, when executed, cause the processor 116 to perform or control performance of one or more of the operations described herein with respect to the server 102.

The storage medium 118 may include any non-transitory computer-readable medium, including volatile memory such as random access memory (RAM), persistent or non-volatile storage such as read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium 118 may store computer instructions that may be executed by the processor 116 to perform or control performance of one or more of the operations described herein with respect to the server 102.

The storage medium 118 may additionally store one or more sets of structured source data 120, one or more models 122, model rules and/or heuristics 124 ("Model Rules/Heuristics" in FIG. 1), and/or one or more graphical diagrams 126. Each set of structured source data 120 may be imported from a corresponding one of the data sources 110. The structured source data 120 may be imported over the network 112 or directly from the corresponding data source 110 if a direct connection exists.

The model rules and/or heuristics 124 include rules and/or heuristics that may be applied to the structured source data 120 to derive information about the nodes and/or their relationships represented in the structured data. The structured source data 120 and/or the information derived by the model rules and/or heuristics 124 may be used by the server 102 to generate the models 122, each model 122 corresponding to a different set of structured source data 120. Each of the graphical diagrams 126 may be generated directly from a corresponding set of the structured source data 120 and/or from a corresponding one of the models 122 derived from the corresponding set of structured source data 120. The graphical diagrams 126 may be generated based on input received from users at the client devices 104, 106, 108 and may include some or all of the nodes or other entities represented in the corresponding set of structured source data 120 and/or in the corresponding model 122 derived from the corresponding set of structured source data 120.

Each of the client devices 104, 106, 108 may execute an application, such as the browser 128, configured to communicate through the network 112 with the server 102. The browser 128 may include an Internet browser or other suitable application for communicating through the network 112 with the server 102. The browser 128 may generate, download and/or interact with structured source data 120 and/or graphical diagrams 126. Each of the client devices 104, 106, 108 may include a desktop computer, a laptop computer, a tablet computer, a mobile phone, a smartphone, a personal digital assistant (PDA), a wearable device (e.g., a smart watch), or another suitable client device.

Each of the client devices 104, 106, 108 may additionally include a processor and a storage medium, such as a processor 130 and a storage medium 132 as illustrated for the client device 104 in FIG. 1. Each of the other client devices 106, 108 may be similarly configured. Similar to the processor 116 of the server 102, the processor 130 may be of any type such as a CPU, a μP, a μC, a DSP, or any combination thereof. The processor 130 may be configured to execute computer instructions that, when executed, cause the processor 130 to perform or control performance of one or more of the operations described herein with respect to the client device 104 and/or the browser 128.

Similar to the storage medium 118 of the server 102, the storage medium 132 of the client device 104 may include any non-transitory computer-readable medium, including volatile memory such as RAM, persistent or non-volatile storage such as ROM, EEPROM, CD-ROM or other optical disk storage, magnetic disk storage or other magnetic storage device, NAND flash memory or other solid state storage device, or other persistent or non-volatile computer storage medium. The storage medium 132 may store computer instructions that may be executed by the processor 130 to perform one or more of the operations described herein with respect to the client device 104 and/or the browser 128. The storage medium 132 may additionally store, at least temporarily, a graphical diagram 126, some of a corresponding set of structured source data 120 or model 122, and/or other content obtained from the server 102 and/or generated locally on the ° client device 104.

In some embodiments, the browser 128 on the client devices 104, 106, 108, the diagram application 114 on the server 102, and/or other application, system, or device may execute a layout algorithm to generate and display graphical diagrams 126 on displays of or coupled to the client devices 104, 106, 108. The resources, nodes, or other entities of the structured source data 120 may be arranged hierarchically. In these and other embodiments, the layout algorithm may recursively call down to the bottom of the hierarchy how much space is needed for graphical objects representing resources or nodes at each level of the hierarchy. At each level of the hierarchy, the algorithm may determine how much space a graphical object such as a container graphical object needs based on the space needed by each graphical object at the next lowest level of the hierarchy that is included in the container graphical object and an amount of padding (e.g., around the constituent graphical objects or the container graphical object itself) which may be a fixed parameter, a configurable parameter, and/or may be determined in some other manner. In effect, layout information at lower levels of the hierarchy bubbles up to the higher levels of the hierarchy allowing the layout algorithm to determine which containers to generate, the size of each container, where to position them, a number and size and location of rows and/or columns within each container, a size and location of each graphical object, and so on.

Embodiments described herein are not limited to using a browser to communicate with the server 102 to generate and display graphical diagrams 126 with user-defined groups and/or user-defined hierarchies. For example, rather than or in addition to a browser, the client devices 104, 106, 108 may include a native app as are often used on client devices such as mobile devices including smartphones and tablet computers. Accordingly, embodiments described herein generally include generating and displaying graphical diagrams and grouping and collapsing graphical objects therein using a browser, a native app, or another suitable application on the client devices 104, 106, 108.

FIGS. 2A-2D include graphical representations 200A, 200B, 200C, 200D (collectively "graphical representations 200") of a UI to generate graphical diagrams, arranged in accordance with at least one embodiment described herein. The UI may be provided by the browser 128 and/or the diagram application 114 of FIG. 1. For instance, the browser 128 in cooperation with the diagram application 114 may present the UI to a user through a display of the client device 104.

In FIGS. 2A-2D, the graphical representations 200 include a graphical drawing canvas 202, a panel 204 to one side of the graphical drawing canvas 202, one or more menus, and/or other UI elements. In other embodiments, the panel 204 may be positioned in some other location relative to the graphical drawing canvas 202 and/or may be expanded into two or more panels. For example, the panel 204 may be positioned on a left side, above, or below the graphical drawing canvas 202 or other location relative to the graphical drawing canvas 202 and/or may be divided into two or more panels positioned in two or more locations relative to the graphical drawing canvas 202.

In general, graphical drawings or diagrams of structured source data may be displayed in the graphical drawing canvas 202. In FIGS. 2A-2D, the graphical drawing canvas 202 displays an example graphical diagram 206 that includes various graphical objects that represent resources or nodes in underlying structured source data. The graphical objects in this example include various AWS icons to represent AWS nodes, resources, entities, or the like, including a region graphical object 208 that represents a region, virtual private cloud (VPC) graphical objects 210A, 210B (hereinafter collectively "VPC graphical objects 210") that represent VPCs, compute node graphical objects 212A, 212B, 212C, 212D, 212E (hereinafter collectively "compute node graphical objects 212") that represent compute resources, auto-scaling graphical objects 214A, 214B (hereinafter collectively "auto-scaling graphical objects 214") that represent auto-scaling resources, SQS queue graphical objects 216A, 216B, 216C (hereinafter collectively "SQSQ graphical objects 216") that represent SQS queue resources, and an application programming interface (API) gateway graphical object 218 that represents an API gateway resource.

The panel 204 includes an input field 220, such as a dropdown list from which a particular view of structured source data may be selected. In the example of FIGS. 2A-2D, the selected view is "Infrastructure". The panel 204 additionally includes an Explore tab, a Layout tab, and a Data tab.

Although not shown in FIGS. 2A-2D, the Explore tab may include a hierarchy selection area in which a user can turn on or off various hierarchy levels, or container levels, in the graphical diagram 206 shown in the graphical drawing canvas 202. The hierarchy selection area may also permit a user to specify which types of nodes the user desires to see at each container level, e.g., by selecting a dropdown arrow to display a list of all nodes at that container level (or hierarchical level) which the user can select or deselect. Alternatively or additionally, the hierarchy selection area may permit a user to modify a hierarchy of the graphical diagram, such as enabling or disabling hierarchical levels, enabling or disabling one or more group categories within any given hierarchical level, enabling or disabling a cross-layout arrangement, or the like or any combination thereof.

The Layout tab has been selected in FIGS. 2A-2D and includes an example UI to group graphical objects. In particular, the Layout tab includes buttons 222, 224 that may be toggled between off and on to turn various types of grouping off or on.

Figure 2A:
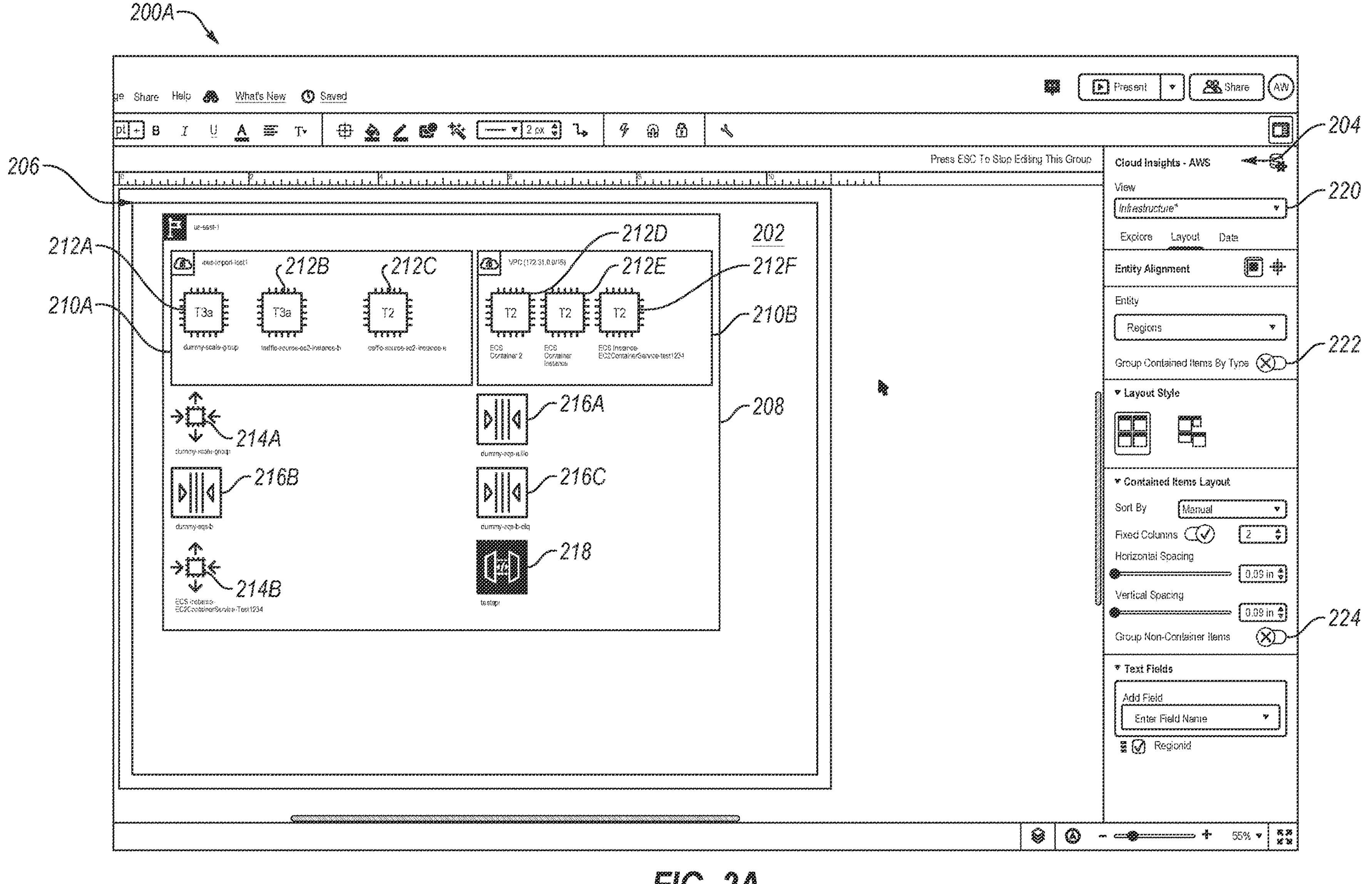
FIGS. 2A-2D include graphical representations of a user interface (UI) to generate graphical diagrams.

In FIG. 2A, both buttons 222, 224 are toggled to off.

Figure 2B:
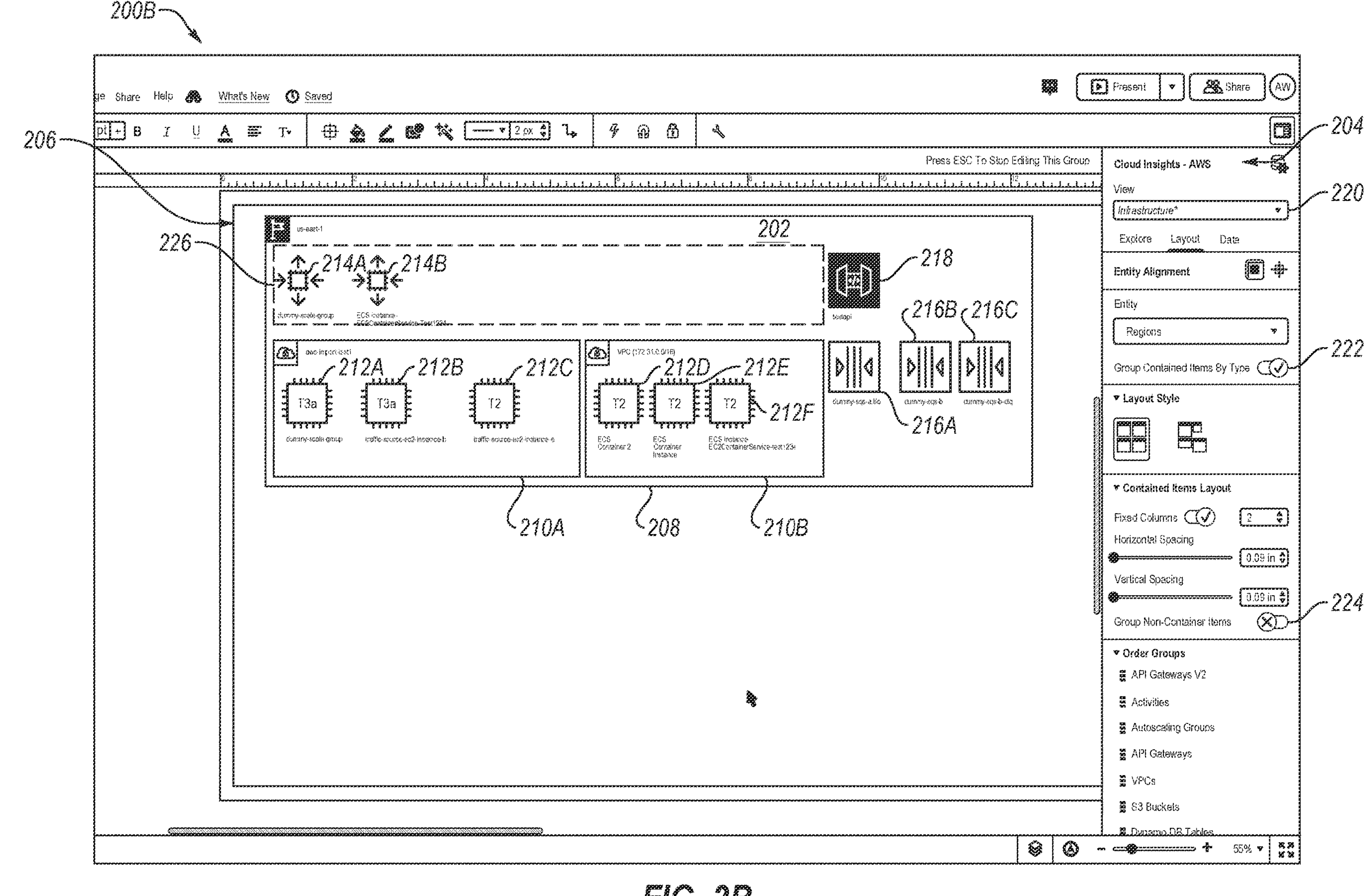

In FIG. 2B, the button 222 is toggled to on while the button 224 is toggled to off. Toggling the button 222 to on may cause graphical objects to be grouped by resource type, which may be one of the attributes of each graphical object in their underlying schema. In this example, each graphical object that has the same value for the resource type attribute may be grouped together. For example, as illustrated in FIG. 2B, each of the VPC graphical objects 210 may have a value of VPC for their resource type attribute and may be grouped together, each of auto-scaling graphical objects 214 may have a value of auto-scaling for their resource type attribute and may be grouped together as shown in FIG. 2B, each of the SQSQ graphical objects 216 may have a value of SQS queue for their resource type attribute and may be grouped together, and the API gateway graphical object 218 may have a value of API gateway for its resource type attribute and may be grouped by itself.

Figure 2C:
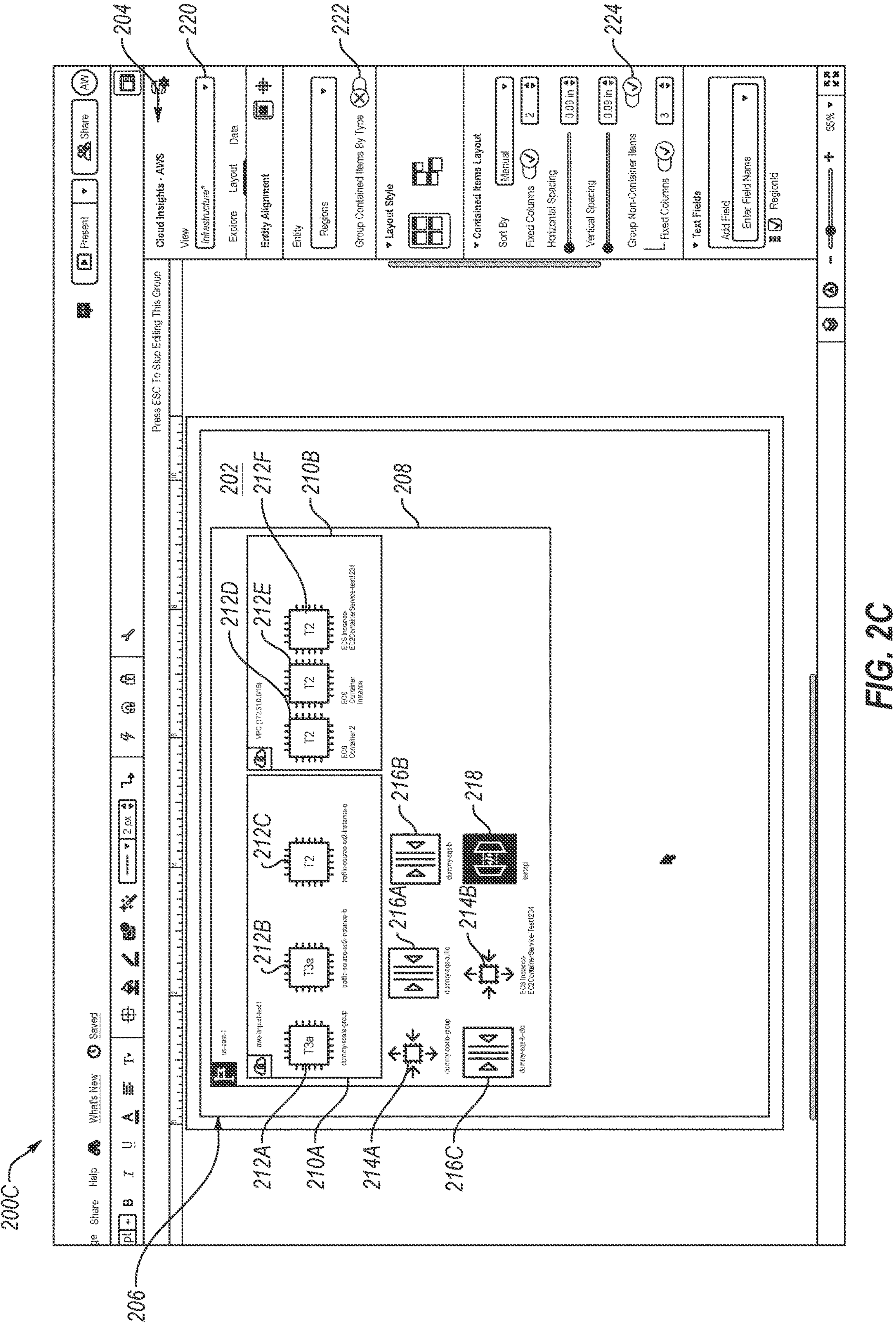
Figure 2D:
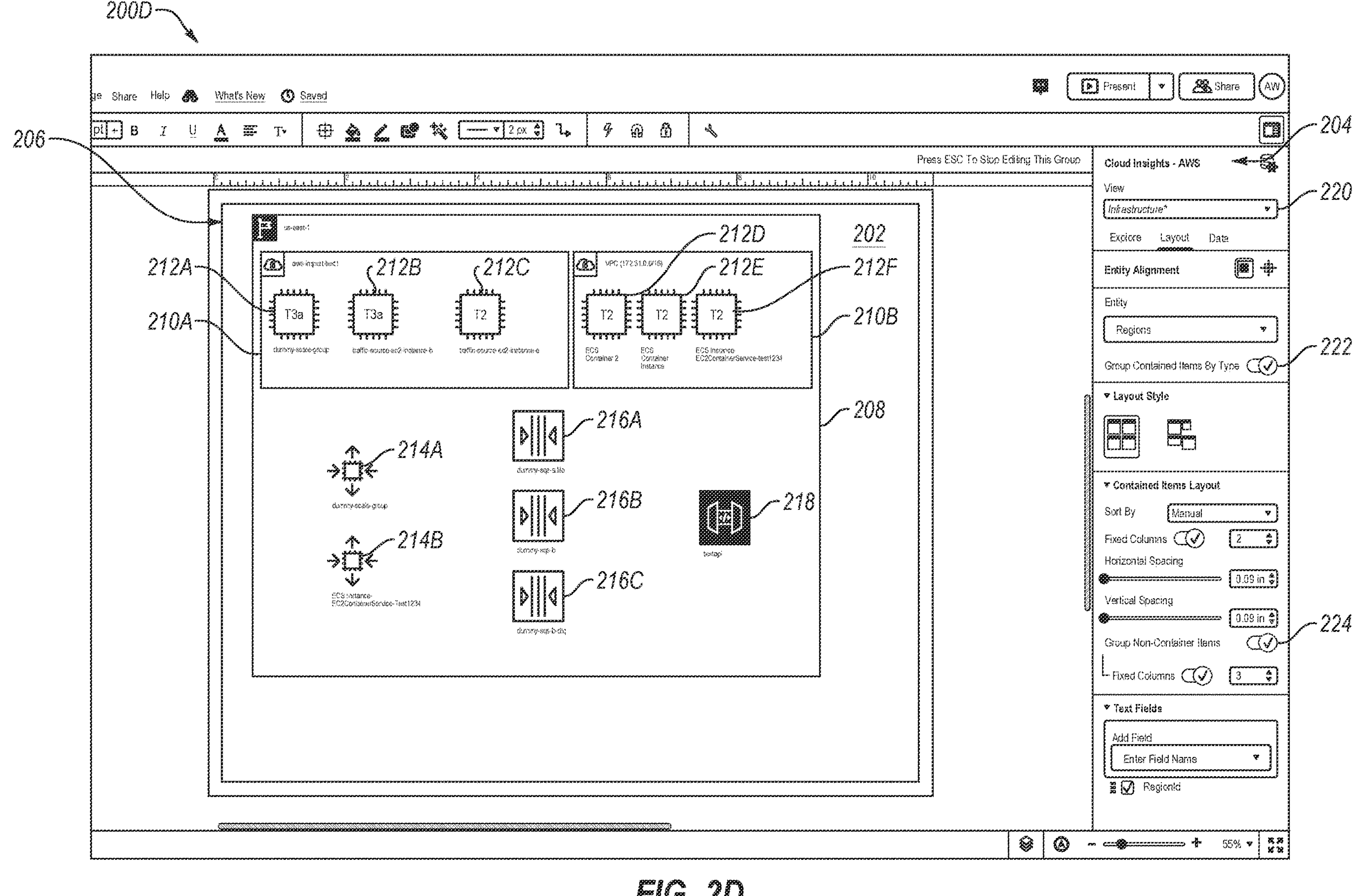

Graphical objects may be grouped in this and other embodiments by arranging them next to or near each other, within a container that may or may not be visible, and/or within duplicated versions of a container. In the example of FIGS. 2B-2D, graphical objects that are grouped in response to input, e.g., from a user, are arranged next to each other and within containers that are invisible. For example, in FIG. 2B, the auto-scaling graphical objects 214 are positioned within an invisible container that may have a boundary indicated by a dashed line 226 in FIG. 2B for illustrative purposes. The VPC graphical objects 210 are similarly positioned near each other within another invisible container. The SQSQ graphical objects 216 are similarly positioned near each other within another invisible container. The API gateway graphical object 218 is similarly positioned within another invisible container. The use of visible or invisible containers for grouping graphical objects may facilitate use of a layout algorithm such as described elsewhere herein to arrange grouped graphical objects within the graphical drawing canvas 202.

In some embodiments, grouping may be applied at a single hierarchical level and/or within a single selected graphical object. For example, in FIGS. 2A-2D, the region graphical object 208 may be selected to apply grouping to graphical objects within the region graphical object 208. Alternatively or additionally, grouping may be applied only at a hierarchical level immediately below a hierarchical level of the selected graphical object. For example, in FIGS. 2A-2D, and assuming the region graphical object 208 has been selected, grouping may be applied to VPC graphical objects 210, auto-scaling graphical objects 214, SQSQ graphical objects 216, and API gateway graphical object 218 that represent resources or nodes at a child hierarchical level immediately beneath a parent hierarchical level of a resource or node represented by the region graphical object 208. In some embodiments, the grouping is not applied to the compute node graphical objects 212 because they represent resources or nodes in a next level down from the child hierarchical level, e.g., in a grandchild hierarchical level.

In FIG. 2C, the button 222 is toggled to off while the button 224 is toggled to on. Toggling the button 224 to on may cause graphical objects that are not container graphical objects to be grouped together. A container graphical object may be any graphical object that may enclose at least one other graphical object therein. Alternatively or additionally, a container graphical object may be any graphical object that represents a resource or node with at least one child resource or node in structured source data. Graphical objects that are not container graphical objects may include any graphical object that does not enclose at least one other graphical object therein and/or that represents a resource or node with no child resources or nodes in the structured source data. As illustrated in FIG. 2C, the auto-scaling graphical objects 214, the SQSQ graphical objects 216, and the API gateway graphical object 218 are not container graphical objects and are grouped together. In FIG. 2C, the auto-scaling graphical objects 214, the SQSQ graphical objects 216, and the API gateway graphical object 218 are grouped next to and/or near each other and/or may be grouped within a visible or invisible container. In addition, the grouping of graphical objects that are not container graphical objects may be applied only to graphical objects within a selected container graphical object (e.g., the region graphical object 208 in this example) and/or at a single hierarchical level within the selected container graphical object (e.g., at the child hierarchical level relative to the parent hierarchical level of the region graphical object 208). Alternatively, the grouping of graphical objects may be applied in other manners, e.g., to all or a subset of graphical objects within the graphical drawing canvas 202 and/or to all or a subset of hierarchical levels.

In FIG. 2D, both buttons 222, 224 are toggled to on. As a result, graphical objects are grouped based on both the value of their resource type attribute and their status as a container or non-container graphical object. For example, the VPC graphical objects 210 are grouped together as container graphical objects each having a resource type of VPC, the auto-scaling graphical objects 214 are grouped together as non-container graphical objects each having a resource type of auto-scaling, the SQSQ graphical objects 216 are grouped together as non-container graphical objects each having a resource type of SQS queue, and the API gateway graphical object 218 is grouped by itself as a non-container graphical object having a resource type of API gateway. As in other embodiments, the grouping of graphical objects may be applied only to graphical objects within a selected container graphical object (e.g., the region graphical object 208 in this example) and/or at a single hierarchical level within the selected container graphical object. Alternatively, the grouping of graphical objects may be applied in other manners, e.g., to all or a subset of graphical objects within the graphical drawing canvas 202 and/or to all or a subset of hierarchical levels.

FIGS. 3A-3J include graphical representations 300A, 300B, 300C, 300D, 300E, 300F, 300G, 300H, 300I, 300J (collectively "graphical representations 300") of other UIs to generate graphical diagrams, arranged in accordance with at least one embodiment described herein. The UIs may be provided by the browser 128 and/or the diagram application 114 of FIG. 1. For instance, the browser 128 in cooperation with the diagram application 114 may present the UIs to a user through a display of the client device 104. The UIs of FIGS. 3A-3J may be implemented individually or in combination (in whole or in part) with the UI of FIGS. 2A-2D (in whole or in part) and/or other UIs described herein (in whole or in part).

In FIGS. 3A-3J, the graphical representations 300 include a graphical drawing canvas 302. Although not shown in all of FIGS. 3A-3J, the graphical representations 300 may further include one or more panels, such as a panel 301 illustrated in FIG. 3A, one or more menus, and/or other UI elements, some examples of which are described with respect to FIGS. 2A-2D. As in FIGS. 2A-2D, in general, graphical drawings or diagrams of structured source data may be displayed in the graphical drawing canvas 302. In FIGS. 3A-3J, the graphical drawing canvas 302 displays an example graphical diagram 304 that includes various graphical objects that represent resources, nodes, entities, or the like in underlying structured source data. The graphical objects in this example include various AWS icons to represent AWS nodes, resources, entities, or the like, including a download distribution graphical object 306 that represents a download distribution H resource, API gateway graphical objects 308A, 308B, 308C (hereinafter collectively API gateway graphical objects 308") that represent API gateway resources, an SQSQ graphical object 310 that represents an SQS queue resource, a bucket graphical object 312 that represents an S3 Bucket resource, application load balancer (ALB) graphical objects 314A, 314B (hereinafter collectively "ALB graphical objects 314") that represents ALB resources, Amazon relational database service (RDS) graphical objects 316A, 316B (hereinafter collectively "Amazon RDS graphical objects 316"), compute node graphical objects 318A, 318B, 318C, 318D (hereinafter collectively "compute node graphical objects 318") that represent compute resources, Elastic Network Interface (ENI) graphical objects 320A, 320B (hereinafter collectively "ENI graphical objects 320") that represent ENI resources, lambda function graphical objects 322A, 322B (hereinafter collectively "lambda function graphical objects 322") that represent lambda function resources, an account graphical object 324 that represents an account, a region graphical object 326 that represents a region, a VPC graphical object 328 that represents a VPC, and a private subnet graphical object 330 that represents a private subnet. Each of the account graphical object 324, the region graphical object 326, the VPC graphical object 328, and the private subnet graphical object 330 is a container graphical object and may be referred to hereinafter as a corresponding container, e.g., the account container 324.

In an example implementation, a user may provide input to define one or more groups based on an attribute and/or based on an arbitrary selection. The resulting groups may be referred to as user-defined groups. When based on an attribute, graphical objects that have the same value for a given attribute may be grouped together. When based on arbitrary selection, graphical objects that are selected, e.g., by the user, may be grouped together. A UI to define one or more groups may be implemented in any suitable manner. FIGS. 2A-2D illustrate one such UI in the form of the panel 204 in which groups may be defined by toggling on/off the buttons 222, 224.

The same, similar, or different UI as the panel 204 may be implemented to define groups in FIGS. 3B-3J. For example, FIG. 3A includes the panel 301 with UI elements to define one or more groups. The panel 301 may include a list 303, such as a scrolling list, of various attributes that may be selected to define one or more groups. The list 303 in this example includes an "Environment tag" attribute, an "Application tag" attribute, and a "Resource type" attribute. More generally, such a list may include one or more selectable attributes. In some embodiments, selection of the desired attribute from the list 303 may define the groups and result in generation of one or more containers for one or more resulting user-defined groups and relative arrangement of the generated containers and the graphical objects to depict membership of the graphical objects U in the groups. Alternatively or additionally, after selecting the desired attribute from the list 303, the user may select a "group" button 305A, 305B (hereinafter generically "group button 305") to define the groups and cause generation of the containers and relative arrangement of the generated containers and graphical objects to depict membership. Selection of the group button 305A may group graphical objects in the graphical diagram 304 that represent all resources in underlying source data according to their value for the selected attribute. The group button 305A may be displayed in the panel 301 when no graphical object is selected in the graphical diagram 304. Selection of the group button 305B may group only those graphical objects in the graphical diagram 304 that represent resources of a given resource type in underlying source data according to their respective value for the selected attribute. The group button 303 may be displayed in the panel 301 when a graphical object representing a resource with the given resource type has been selected to apply grouping as described herein only to graphical objects that represent resources of the given resource type, e.g., graphical objects that have the same value for their resource type attribute as the selected graphical object.

Figure 3A:
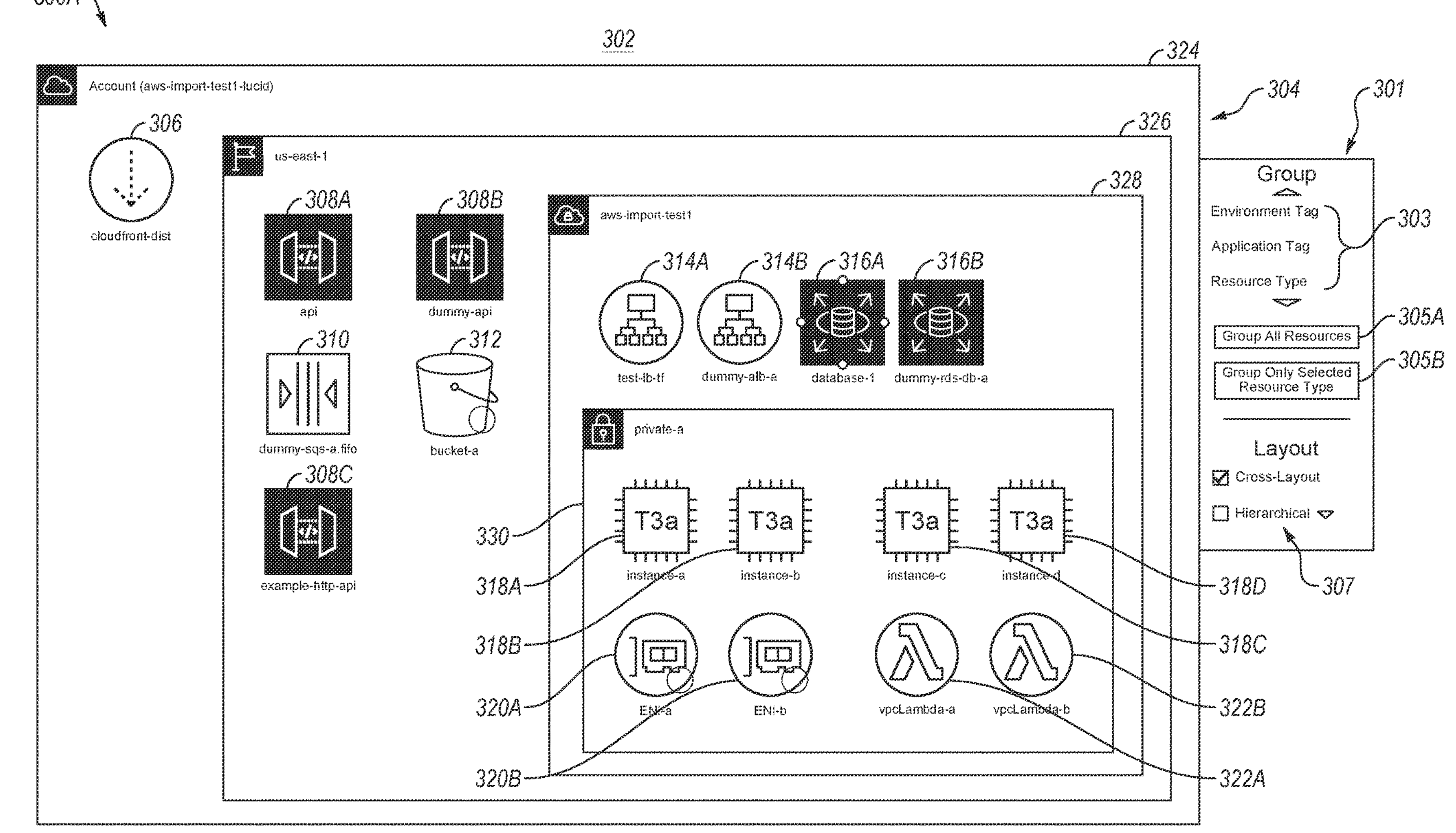
FIGS. 3A-3J include graphical representations of other UIs to generate graphical diagrams.
Figure 3B:
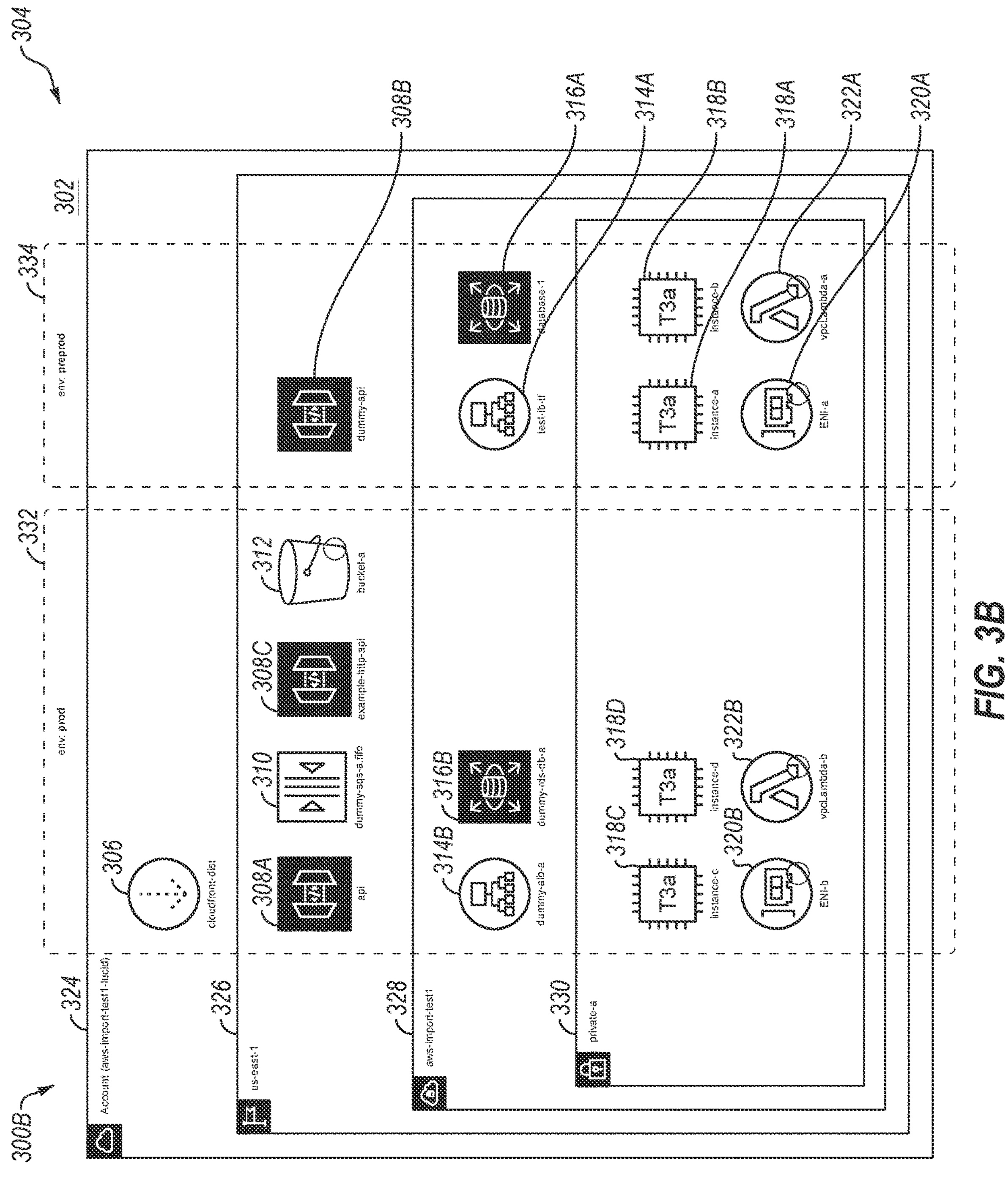
Figure 3C:
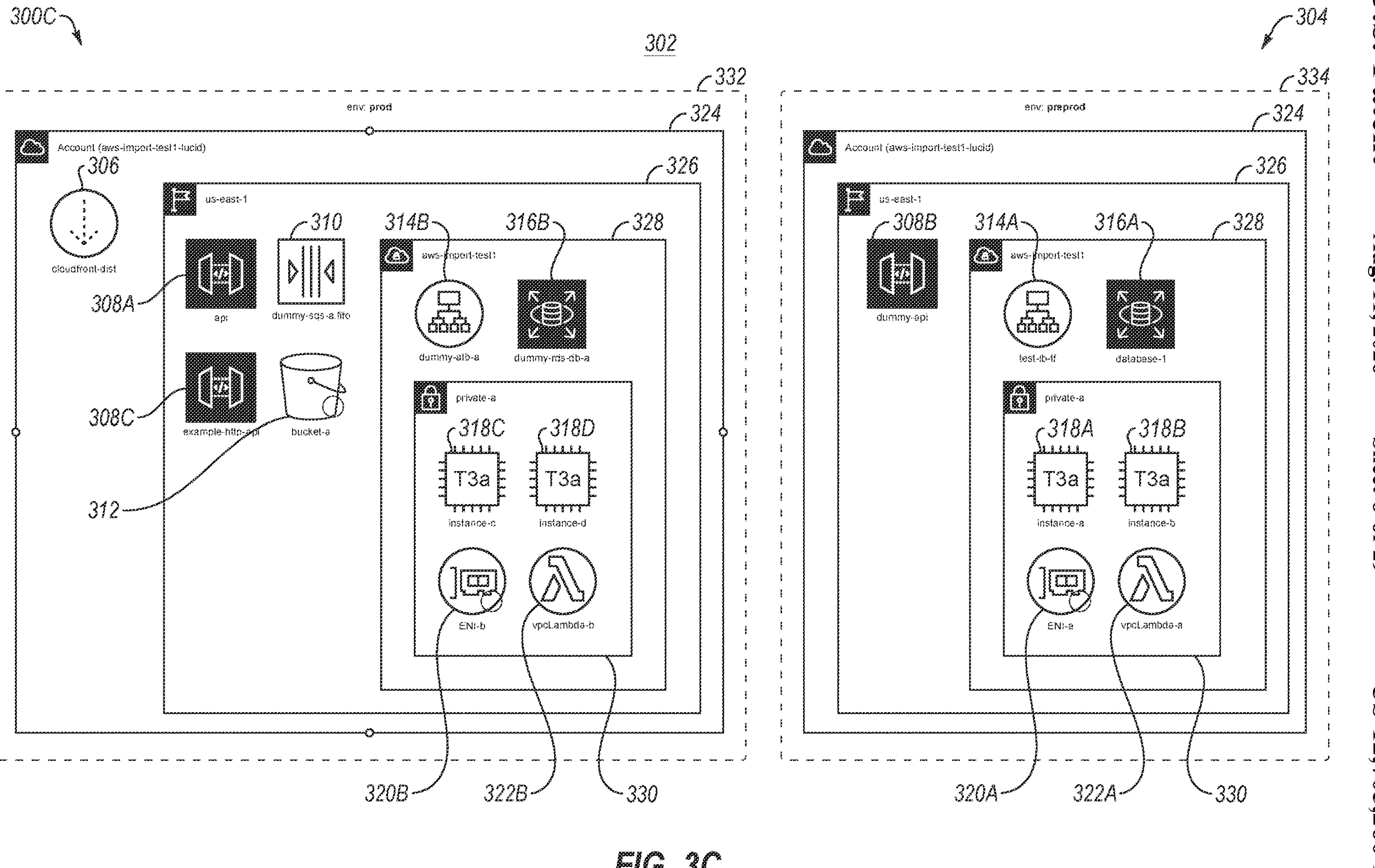
Figure 3D:
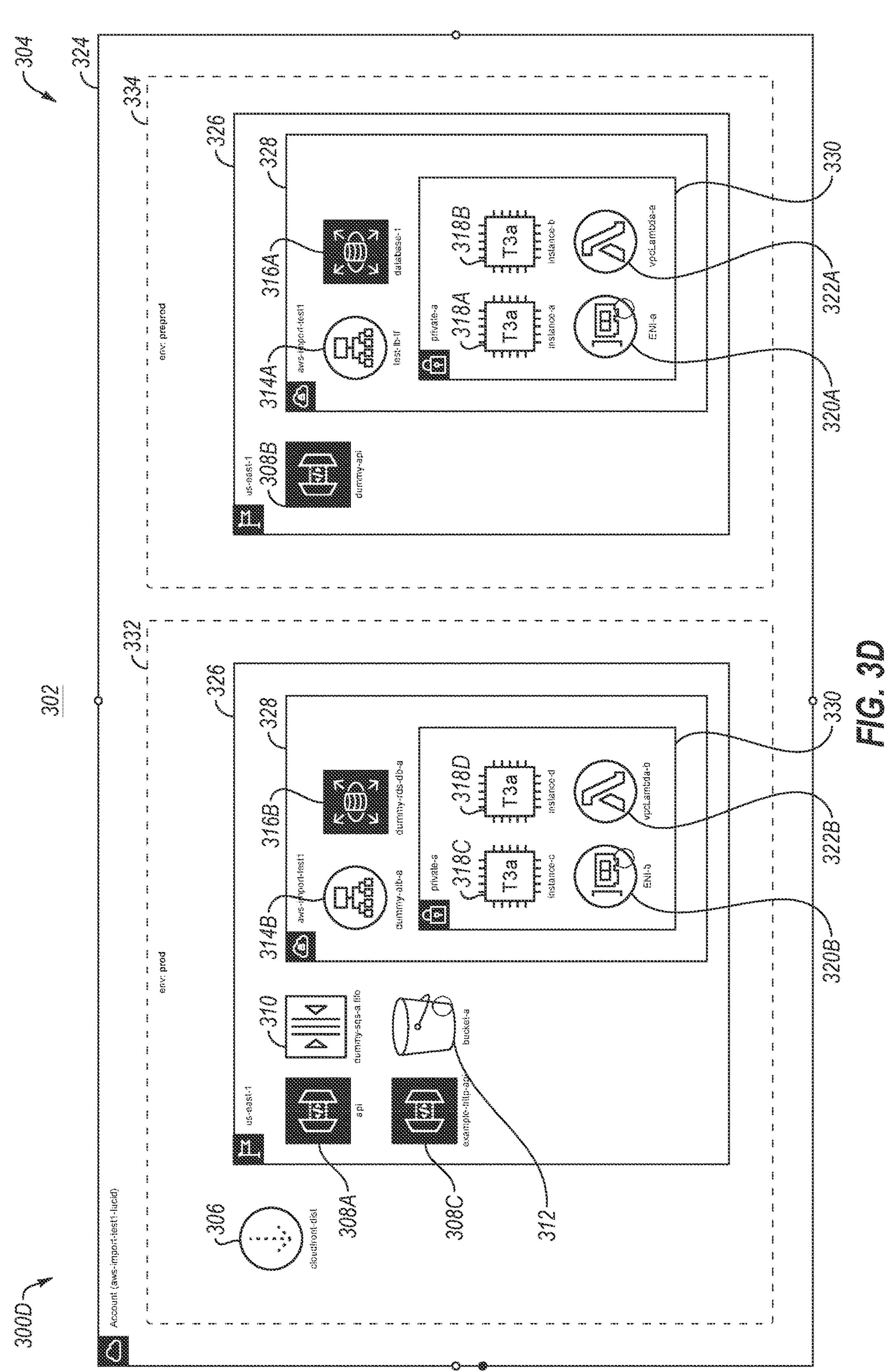
Figure 3E:
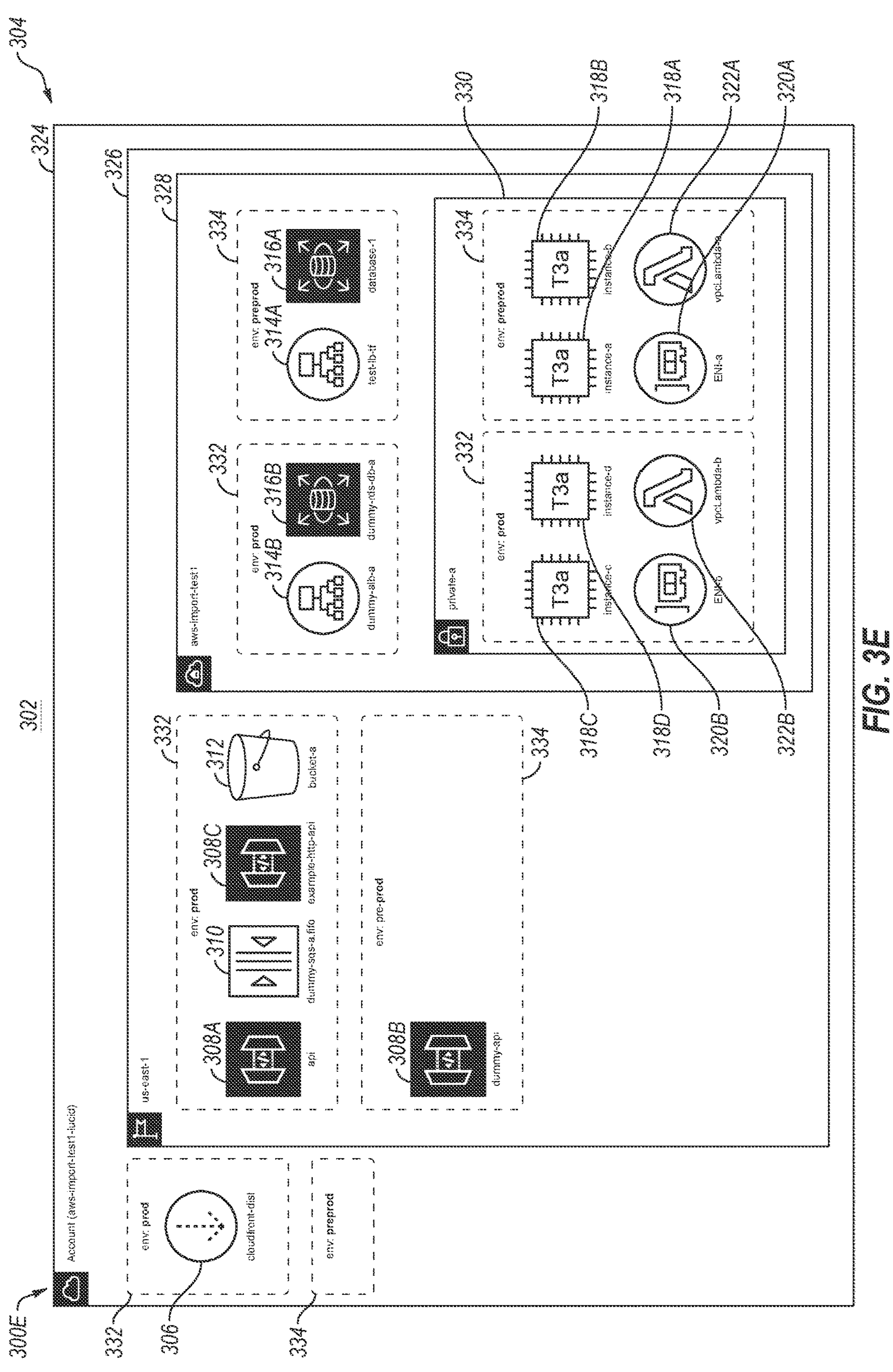

Alternatively or additionally, the panel 301 may include layout elements 307 to select a layout of the graphical diagram 304 and/or to define a hierarchy of the resulting diagram. The layout elements 307 may be operable with or without application of grouping based on user-defined groups as described herein. In the illustrated example, the layout elements 307 include selectable layout options, including a selectable "Cross-layout" option and a selectable "Hierarchical" layout option. An example of the graphical diagram 304 with the cross-layout option applied is depicted in FIG. 3B. Examples of the graphical diagram 304 with various hierarchical layout options applied are depicted in FIGS. 3C-3E. In some embodiments, the hierarchical layout option may include a drop-down menu or other UI element to select or identify a location at which to position containers generated for user-defined groups or to otherwise modify the graphical hierarchy.

In the examples of FIGS. 3B-3E, user input is provided through the panel 301 or other suitable UI to define groups based on a selected attribute, which in this example is the environment tag attribute in which various graphical objects have a value of "production" ("prod" in the FIGS.) or "preproduction" ("preprod" in the FIGS.) for the environment tag attribute. The groups thus defined include a first group of graphical objects 306, 308A, 308C, 310, 312, 314B, 316B, 318C, 318D, 320B, 322B with a value of "production" for the environment tag attribute and a second U group of graphical objects 308B, 314A, 316A, 318A, 318B, 320A, 322A with a value of "preproduction" for the environment tag attribute. More generally, the defined groups may include one group for each unique value of the selected attribute. In response to the input, one or more containers are generated, including a first container 332 for the first group of "production" graphical objects and a second container 334 for the second group of "preproduction" graphical objects in this example. In some embodiments, each of the first and second containers 332, 334 may include a label to identify the group represented by the container. For example, the first container 332 may have a "prod" label to indicate that it represents the "production" group while the second container 334 may have a "preprod" label to indicate that it represents the "preprod" group. Membership of the graphical objects 306, 308, 310, 312, 314, 316, 318, 320, 322 in the groups may be graphically depicted by relative arrangement of the graphical objects 306, 308, 310, 312, 314, 316, 318, 320, 322 and the one or more containers, e.g., first and second containers 332, 334 in this example, on the graphical drawing canvas 302 according to group membership of each of the graphical objects 306, 308, 310, 312, 314, 316, 318, 320, 322. Numerous arrangements to show membership are possible including some specific examples depicted in FIGS. 3B-3E.

In these and other examples, the graphical objects may represent data objects of a data source and the data objects may have a hierarchy. The hierarchy may be graphically represented in the illustrated embodiment by arrangement of the graphical objects within nested containers 324, 326, 328, 330. For example, the private subnet container 330 is positioned within the VPC container 328, which is positioned within the region container 326, which is positioned within the account container 324, thus indicating the level in the hierarchy of each of the underlying account, region, VPC, and private subnet corresponding to these containers. Further, the various graphical objects are positioned within a corresponding one of the containers 324, 326, 328, 330 according to the level of the hierarchy at which the underlying data objects are located.

One layout and/or arrangement to show membership is illustrated in FIG. 3B as a cross-layout arrangement of the generated containers 332, 334 with the nested container 324, 326, 328, 330. In this example, the first container 332 for the "production" group of graphical objects and the second container 334 for the "preproduction" group of graphical objects are arranged side-by-side and extending across the nested containers 324, 326, 328, 330, with any graphical objects ° ° belonging to each first or second container 332, 334 and a corresponding one of the nested containers 324, 326, 328, 330 being positioned at a corresponding intersection of the first or second container 332, 334 with the corresponding one of the nested containers 324, 326, 328, 330. For example, the download distribution graphical object 306 is a member of the "production" group (e.g., it has "production" as the value of its environment tag attribute) and belongs to the account container 324 but not any of the other nested containers 326, 328, 330 so the download distribution graphical object 306 is displayed at the intersection of the first container 332 with the account container 324 in an area where the other nested containers 326, 328, 330 are absent. As another example, the compute node graphical object 318A is a member of the "preproduction" group (e.g., it has "preproduction" as the value of its environment tag attribute) and belongs to the private subnet container 330 nested within the other containers 328, 326, 324 so the compute node graphical object 318A is displayed at the intersection of the second container 334 with the private subnet container 330. Example embodiments of how to generate graphical diagrams with such cross-layout arrangements are disclosed in U.S. patent application Ser. No. 17/176,975 filed Feb. 16, 2021 and titled DIAGRAMMING CHILD NODES WITH MULTIPLE PARENT NODES, which is incorporated herein by reference in its entirety.

The cross-layout arrangement of FIG. 3B may preserve hierarchical information represented by the graphical diagram 304 since the cross-layout arrangement of FIG. 3B depicts members of each of the graphical objects 306, 308, 310, 312, 314, 316, 318, 320, 322 in both a correct location of the nested containers 324, 326, 328, 330 (representing the correct hierarchical level of the underlying data objects) and the corresponding group container 332, 334. FIGS. 3C-3E depict other arrangements that may preserve hierarchical information while showing membership in user-defined groups such as the "production" group and the "preproduction" group in these examples.

Referring to FIG. 3C, the first and second containers 332, 334 are placed at a highest level of the hierarchy represented in FIG. 3C, e.g., above the account container 324. To preserve the hierarchical information, the nested containers 324, 326, 328, 330 may be duplicated. A different duplicate of the nested containers 324, 326, 328, 330 is positioned within each of the first and second containers 332, 334. Each of the graphical objects 306, 308, 310, 312, 314, 316, 318, 320, 322 is then positioned at the appropriate hierarchical level within one of the duplicates in a corresponding one of the first and second containers 332, 334. For example, each of the graphical objects 306, 308A, 308C, 310, 312, 314B, 316B, 318C, 318D, 320B, 322B in the "production" group is positioned at the appropriate hierarchical level within the duplicate of the nested U containers 324, 326, 328, 330 on the left in FIG. 3C, e.g., the duplicate within the first container 332. Similarly, each of the graphical objects 308B, 314A, 316A, 318A, 318B, 320A, 322A in the "preproduction" group is positioned at the appropriate hierarchical level within the duplicate of the nested containers 324, 326, 328, 330 on the right in FIG. 3C, e.g., the duplicate within the second container 334.

Referring to FIG. 3D, the first and second containers 332, 334 are placed at a lower level of the hierarchy than in FIG. 3C, e.g., above the region container 326 but below the account container 324. Since the account container 324 is above the hierarchical level at which the first and second containers 332, 334 are placed, the account container 324 is not duplicated. However, to preserve the hierarchical information, the nested containers 326, 328, 330 below the hierarchical level of the first and second containers 332, 334 may be duplicated. A different duplicate of the nested containers 326, 328, 330 is positioned within each of the first and second containers 332, 334. Similar to FIG. 3C, each of the graphical objects 306, 308, 310, 312, 314, 316, 318, 320, 322 is then positioned at the appropriate hierarchical level within one of the duplicates in a corresponding one of the first and second containers 332, 334. For example, each of the graphical objects 306, 308A, 308C, 310, 312, 314B, 316B, 318C, 318D, 320B, 322B in the "production" group is positioned at the appropriate hierarchical level within the duplicate of the nested containers 324, 326, 328, 330 on the left in FIG. 3D, e.g., the duplicate within the first container 332. Similarly, each of the graphical objects 308B, 314A, 316A, 318A, 318B, 320A, 322A in the "preproduction" group is positioned at the appropriate hierarchical level within the duplicate of the nested containers 324, 326, 328, 330 on the right in FIG. 3D, e.g., the duplicate within the second container 334.

Referring to FIG. 3E, the first and second containers 332, 334 are placed at each level of the hierarchy around any graphical objects at each level of the hierarchy that belong to the corresponding group. In particular, the first and second containers 332, 334 may be duplicated and distributed across the nested containers 324, 326, 328, 330 such that each set of one or more graphical objects that belong to a corresponding one of the groups at each hierarchical level immediately below a corresponding one of the nested containers 324, 326, 328, 330 is positioned within a corresponding one of the duplicates. For example, the first container 332 is duplicated and then distributed throughout the nested containers 324, 326, 328, 330 including one duplicate of the first container 332 beneath the hierarchical level represented by the account container 324 being positioned around the download distribution graphical object 306, another duplicate of the first container 332 beneath the hierarchical level represented by the region container 326 being positioned around the graphical objects 308A, 308C, 310, 312, another duplicate of the first container 332 beneath the hierarchical level represented by the VPC container 328 being positioned around the graphical objects 314B, 316B, and another duplicate of the first container 332 beneath the hierarchical level represented by the private subnet container 330 being positioned around the graphical objects 318C, 318D, 320B, 322B. As another example, the second container 334 is duplicated and then distributed throughout the nested containers 324, 326, 328, 330 including one duplicate of the second container 334 beneath the hierarchical level represented by the region container 326 being positioned around the API graphical object 308B, another duplicate of the second container 334 beneath the hierarchical level represented by the VPC container 328 being positioned around the graphical objects 314A, 316A, and another duplicate of the second container 334 beneath the hierarchical level represented by the private subnet container 330 being positioned around the graphical objects 318A, 318B, 320A, 322A. Optionally, duplicates of the containers generated for the user-defined groups may be provided beneath hierarchical levels at which there are no members of the group. For example, although the “preproduction” group does not include any graphical objects in the hierarchical level immediately beneath the account container 324, the graphical diagram 304 may nevertheless include an empty duplicate of the second container 334 beneath the hierarchical level represented by the account container 324, as illustrated in FIG. 3E.

FIG. 3C shows containers generated for user-defined groups (e.g., the first and second containers 332, 334) placed at a highest level of the hierarchy, FIG. 3D shows containers generated for user-defined groups placed at a next level down compared to FIG. 3C, and FIG. 3E shows containers generated for user-defined groups placed at all levels of the hierarchy. More generally, the containers generated for user-defined groups may be placed at any level in the hierarchy or at multiple levels of the hierarchy. The particular placement level may determine whether some or all of the nested containers are duplicated as in FIGS. 3C and 3D or whether one or more of the containers generated for the user-defined groups are duplicated. Some implementations may H involve both duplication of some nested containers and duplication of the containers generated for the user-defined groups. For example, suppose the first and second containers 332, 334 are placed U at the level in the hierarchy immediately beneath the region container 326. The VPC and private subnet containers 328, 330 would be duplicated with one of the duplicates positioned within the first container 332 inside the region container 326 and the other duplicate positioned within the second container 334 also inside the region container 326. In addition, at least the first container 332 would be duplicated so that one of the duplicates could be placed around the download distribution graphical object 306 outside the region container 326 but inside the account container 324.

When the containers generated for user-defined groups are duplicated and one of the duplicates of a given container is selected, some embodiments may alter the graphical diagram 304 to indicate that all other duplicates of the given container are duplicates of the same container as the selected duplicate. Altering the graphical diagram 304 may include highlighting all other duplicates of the first or second container or displaying connectors between the selected duplicate of the first or second container and all other duplicates of the first or second container.

Figure 3F:
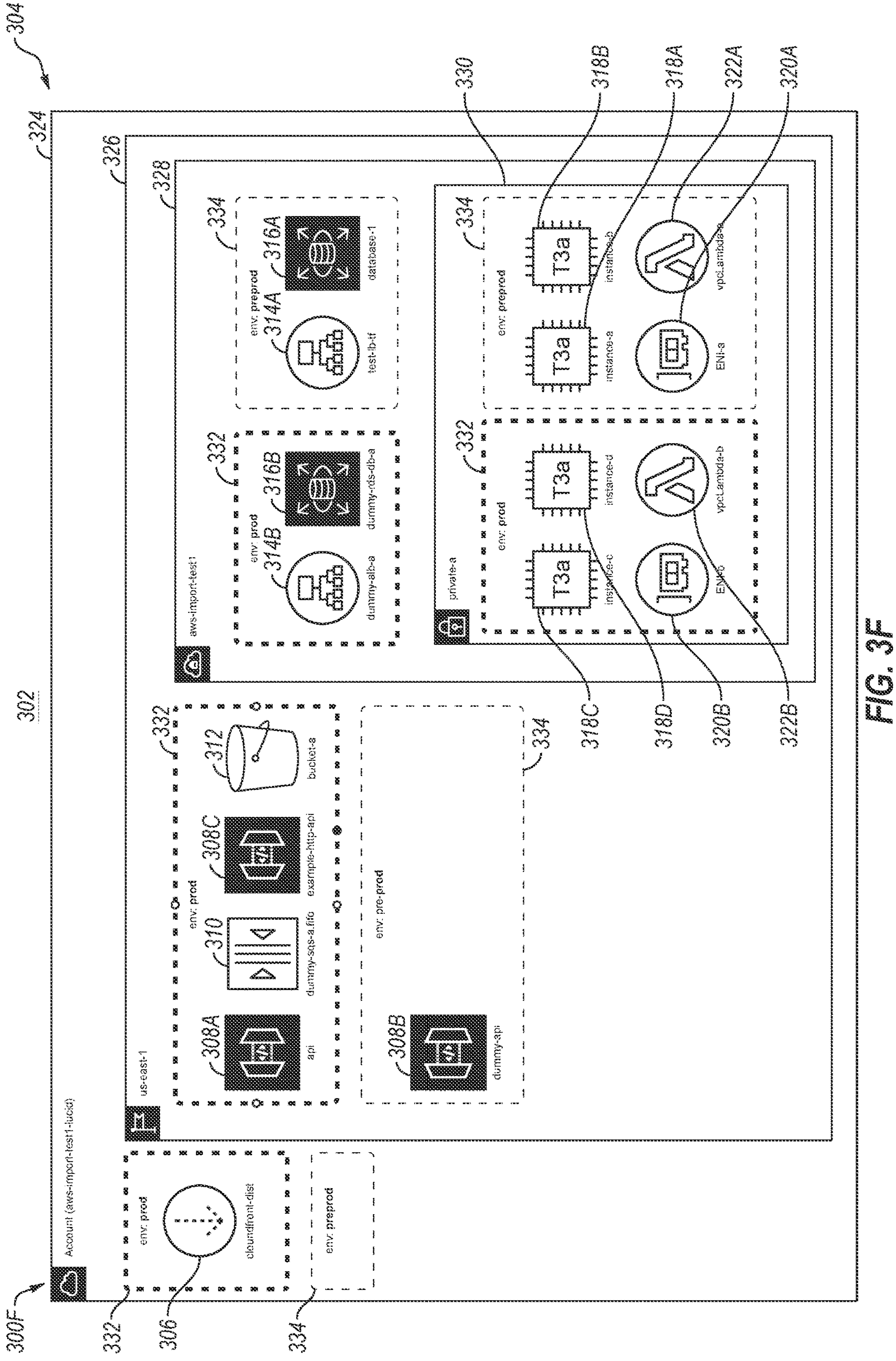

For example, FIG. 3F illustrates the same layout and/or arrangement as in FIG. 3E. In FIG. 3F, one duplicate of the first container 332 has been selected. In particular, the duplicate of the first container 332 immediately beneath the level of the hierarchy represented by the region container 326 has been selected. The selection of the given duplicate of the first container 332 (and/or of other graphical objects) may be indicated by adding one or more graphical object controls to, around, and/or near the selected duplicate, by highlighting the selected duplicate, or more generally by altering the display of the selected duplicate in some manner. Other duplicates of the first container 332 may be highlighted or more generally altered in some manner to indicate that the other duplicates are duplicates of the same first container 332 as the selected duplicate. By way of example, in FIG. 3F, the selected duplicate of the first container 332 is indicated by added graphical object controls to the middle of each side, top, and bottom of the selected duplicate of the first container 332 and by increased or otherwise altered brightness, line thickness, color, and/or other characteristic of the selected duplicate. In addition, all other duplicates of the first container 332 are highlighted to indicate that they are duplicates of the same container as the ° selected duplicate.

Figure 3G:
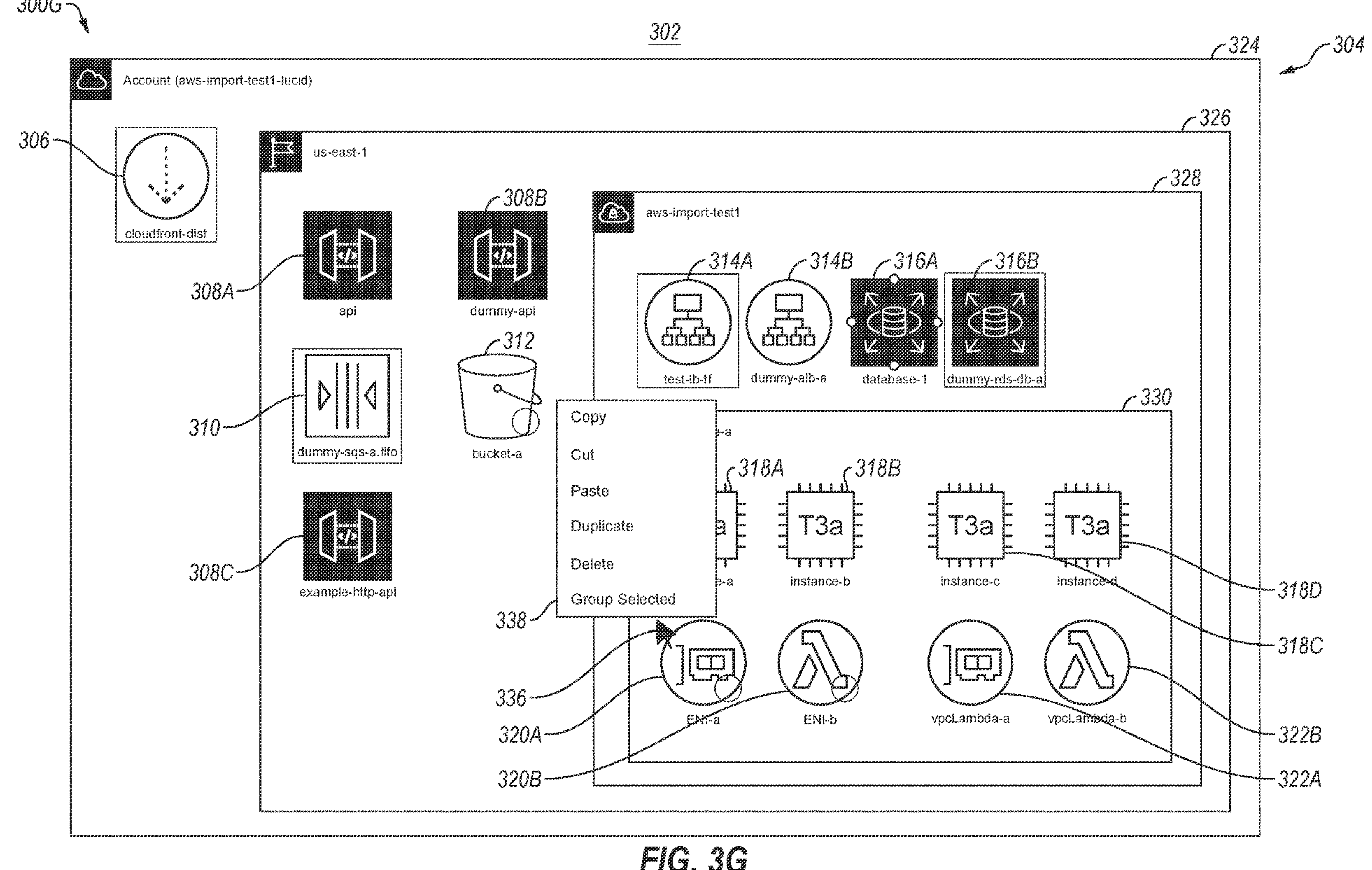

Another example UI to define one or more groups of one or more graphical objects in the graphical diagram 304 is illustrated in FIG. 3G. In this example, the user may position a mouse cursor 336 (or other input system or device) to simultaneously select multiple graphical objects, including the graphical objects 306, 310, 314A, 316B, 318A, and 320A in this example. To say that multiple graphical objects are simultaneously selected does not necessarily mean that an act of selection by a user of all of the graphical objects occurs at the same time. Rather, it means that multiple graphical objects have been selected (sequentially or simultaneously) and all remain selected at a given point in time that may be referred to as the time at which they are simultaneously selected. Multiple graphical objects may be simultaneously selected by a single act of selection (e.g., by dragging a single mouse window around all the desired graphical objects at once) or by multiple non-simultaneous acts of selection (e.g., by sequentially selecting the graphical objects with the mouse cursor 336 while the control key of a keyboard is depressed at least during each selection by the mouse cursor 336) or a combination of the two. At the time at which the desired graphical objects are simultaneously selected and the mouse cursor 336 is positioned over one of the selected graphical objects, the user may provide a suitable input, such as a right mouse input, to open a menu that may include an option to group the selected graphical objects. The option to group the selected graphical objects may be selected from the menu and the graphical objects may then be grouped together in an arbitrary user-defined group. In FIG. 3G, for instance, the mouse cursor 320 may be positioned on the ENI graphical object 320A after all of the graphical objects 306, 310, 314A, 316B, 318A, 320A are simultaneously selected and a menu 338 may be opened responsive to right mouse input. The menu 338 includes various options, including a “Group Selected” option that may be selected to define an arbitrary user-defined group that includes all of the selected graphical objects 306, 310, 314A, 316B, 318A, 320A.

In response to selection of the “Group Selected” option or other suitable input, a container 340 may be generated for the arbitrary user-defined group. In addition, membership of the selected graphical objects 306, 310, 314A, 316B, 318A, 320A in the arbitrary user-defined group may be graphically depicted by relative arrangement of the selected graphical objects 306, 310, 314A, 316B, 318A, 320A and the generated container 340. The generated container may include a label that may be a default label and/or a user-defined label. The label is "Application 1" in this example.

Figure 3H:
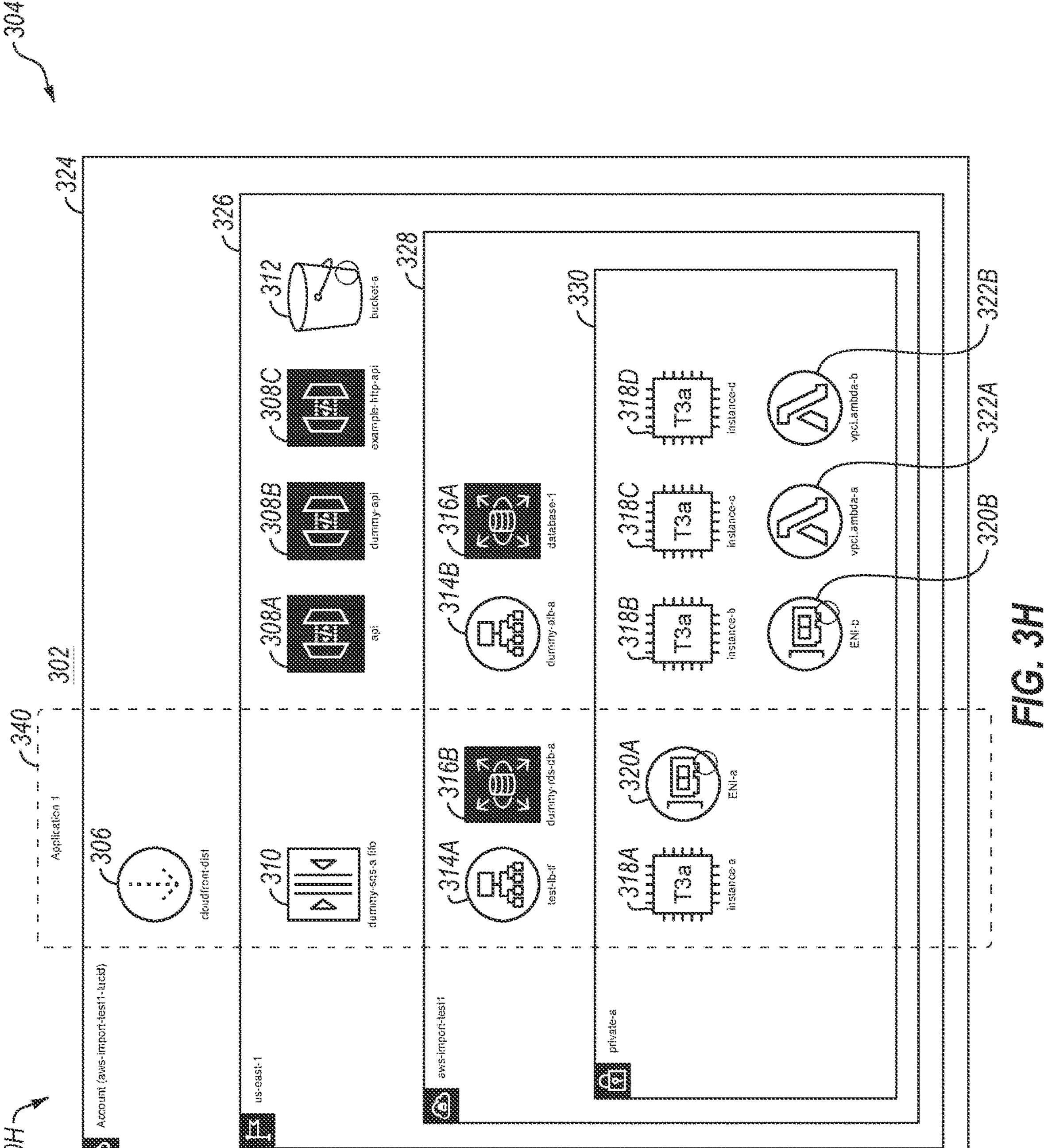
Figure 3I:
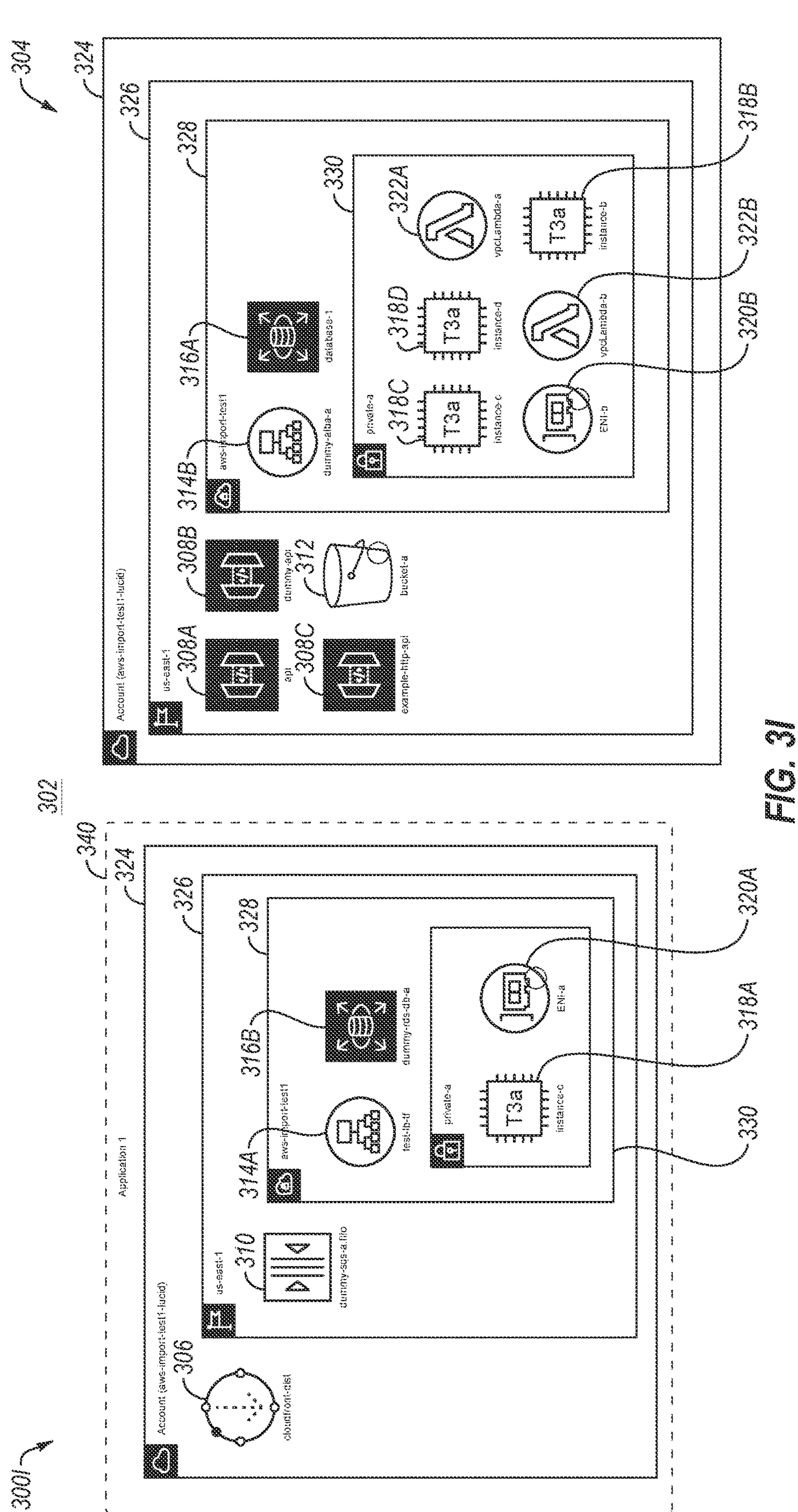
Figure 3J:
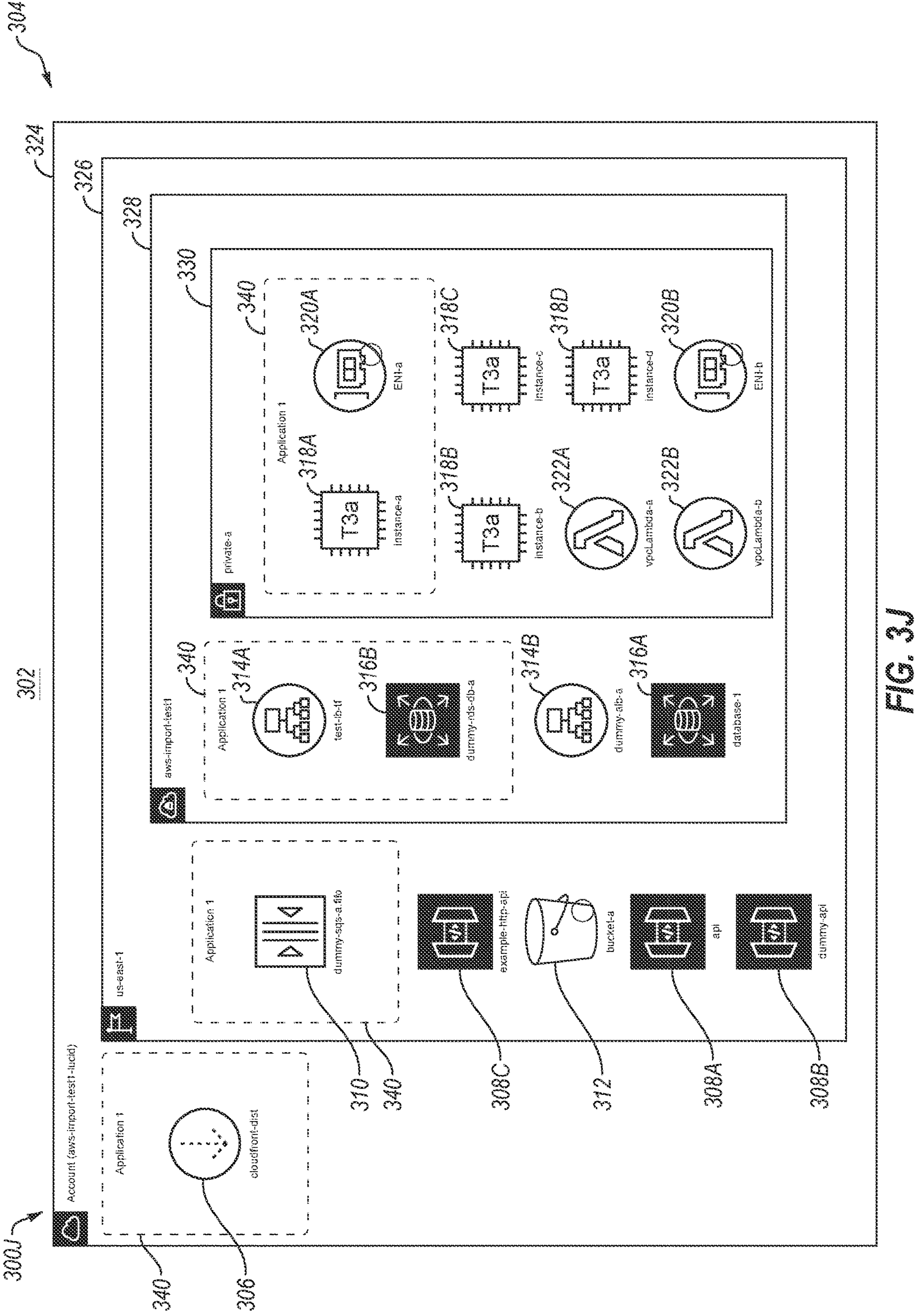

Various example arrangements of the graphical diagram 304 after selection of the "Group Selected" option in the menu 338 are illustrated in FIGS. 3H-3J. As illustrated in FIGS. 3H-3J, the graphical diagram 304 may be arranged in one or more of the same or similar layouts as in FIGS. 3B-3E. For example, FIG. 3H illustrates the graphical diagram 304 with a cross-layout arrangement, FIG. 3I illustrates the graphical diagram 304 with a hierarchical arrangement in which the generated container 340 is at a highest level of the hierarchy with duplicated nested containers 324, 326, 328, 330, and FIG. 3J illustrates the graphical diagram 304 with another hierarchical arrangement in which the generated container 340 is duplicated and distributed throughout the nested containers 324, 326, 328, 330. In the example of FIGS. 3G-3J, a panel (such as the panel 301 of FIG. 3A) or other UI with one or more layout elements, such as the layout elements 307, may be provided for the user to select and/or otherwise configure a desired layout, such as one or more of the layouts depicted in FIGS. 3H-3J.

In some embodiments, existing user-defined groups such as those generated as described with respect to FIGS. 3A-3J may be ungrouped. For instance, the user may select an "ungroup button" displayed in a UI panel (such as the panel 301) that may be displayed in the UI panel after the group button 305 has been selected in the generation of the user-defined group(s) to turn off the grouping and ungroup the group graphical objects. Alternatively or additionally, for an arbitrary user-defined group, the user may position the mouse cursor 336 over any graphical object of the arbitrary user-defined group and provide a right mouse input or other suitable input with the mouse cursor 336 over the graphical object to open a menu, similar to the menu 338, that may have an option to ungroup the graphical objects of the arbitrary user-defined group. Selection of the ungroup option may ungroup the graphical objects. Alternatively or additionally, additional graphical objects may be added to existing arbitrary user-defined groups. For instance, the user may position the mouse cursor 336 over a graphical object the user desires to add to an existing arbitrary user-defined group and provide a right mouse input or other suitable input with the mouse cursor 336 over the graphical object to open a menu, similar to the menu 338, that may have an option to add the graphical object to an existing arbitrary user-defined group. As another example, the user may position the mouse cursor 336 over any graphical object of an arbitrary user-defined group and provide a right mouse input or other suitable input with the mouse cursor 336 over the graphical object to open a menu, similar to the menu 338, that may have an option to edit the group, e.g., by adding additional graphical objects to the group. Selection of the editing option may allow the user to select the desired additional graphical object to add to the group.

Figure 4:
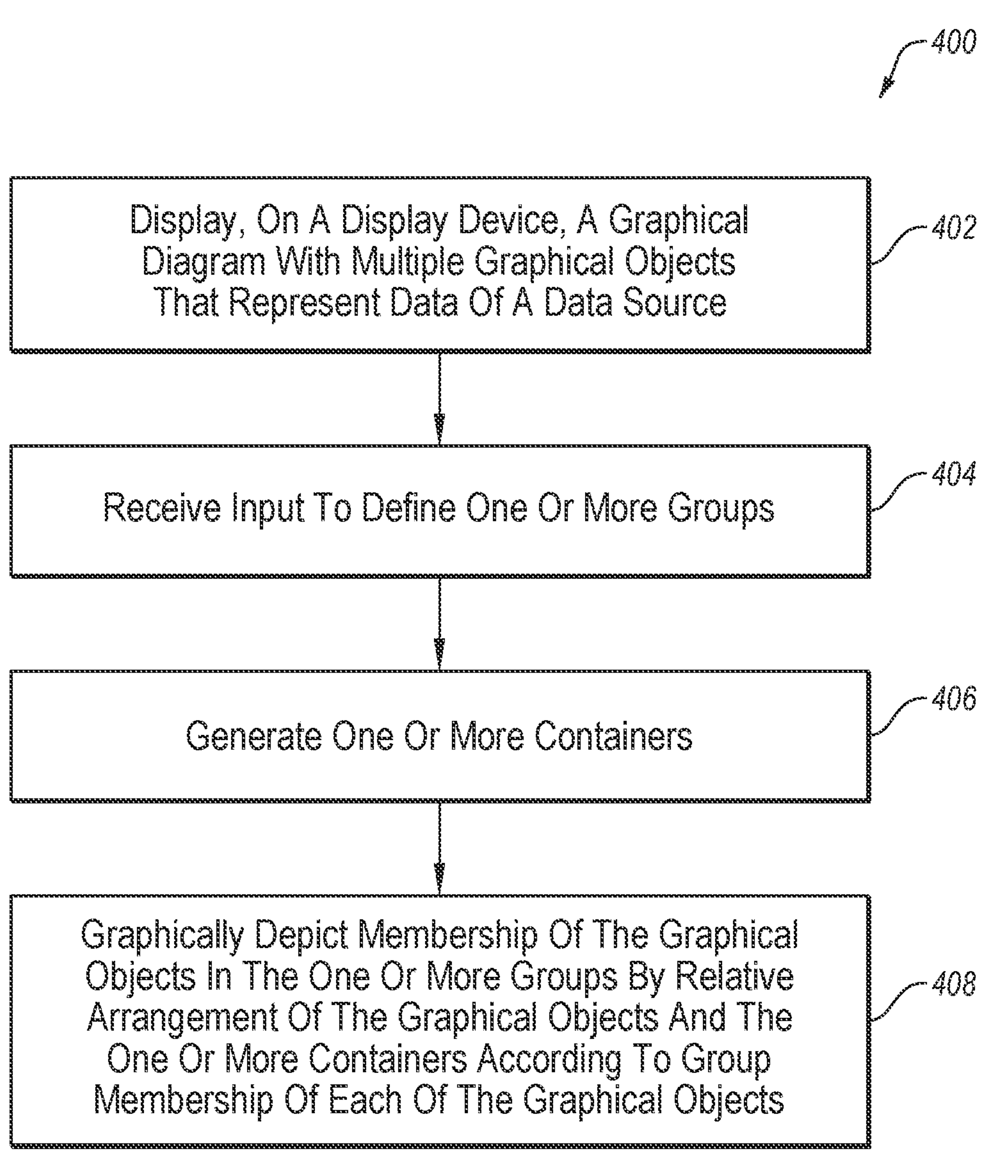
FIG. 4 illustrates a flowchart of an example method to group graphical objects that may be implemented in the operating environment of FIG. 1 and/or the UIs of FIGS. 2A-3J.

FIG. 4 illustrates a flowchart of an example method 400 to group graphical objects, arranged in accordance with at least one embodiment described herein. The method 400 may be performed by any suitable system, apparatus, or device. For example, any one or more of the client devices 104, 106, 108, the collaboration application 114, and/or the server 102 of FIG. 1 may perform or direct performance of one or more of the operations associated with the method 400. In these and other embodiments, the method 400 may be performed or controlled by one or more processors based on one or more computer-readable instructions stored on one or more non-transitory computer-readable media. Alternatively or additionally, embodiments herein may include a non-transitory computer-readable medium having computer-readable instructions stored thereon that are executable by a processor to perform or control performance of the method 400 or one or more operations thereof. The method 400 may include one or more of blocks 402, 404, 406, and/or 408.

At block 402, the method 400 may include displaying, on a display device, a graphical diagram with multiple graphical objects that represent data of a data source. For example, block 402 may include displaying the graphical diagram 206, 304 with the corresponding graphical objects representing structured source data 120 on a display device included in or coupled to the client device 104 of FIG. 1. Block 402 may be followed by block 404.

At block 404, the method 400 may include receiving input to define one or more groups. For example, block 404 may include the client device 104 of FIG. 1 receiving input to toggle any of the buttons 222, 224 to on. Alternatively or additionally, block 404 may include receiving input to select a "Group Selected" option after manual selection of multiple graphical objects to include in the group, such as the "Group Selected" option from the menu 338 of FIG. 3G. Block 404 may be followed by block 406.

At block 406, the method 400 may include, in response to the input, generating one or more containers. For example, block 406 may include generating an invisible container such as the invisible container 226 of FIG. 2B, or a visible container such as the containers 332, 334, 340 of FIGS. 3B-3F and 3H-3J. Block 406 may be followed by block 408.

At block 408, the method 400 may include, in response to the input, graphically depicting membership of the graphical objects in the one or more groups by relative arrangement of the graphical objects and the one or more containers according to group membership of each of the graphical objects. As an example, block 408 may include grouping two or more graphical objects within an invisible container, such as grouping all the auto-scaling graphical objects 214 of FIG. 2B together in one invisible container, grouping all the SQSQ graphical objects 216 of FIG. 2B together in another invisible container, and grouping the API gateway graphical object 218 of FIG. 2B by itself in another invisible container. As another example, block 408 may include grouping two or more graphical objects within a visible container, such as grouping the graphical objects 306, 308A, 310, 308C, 312, 314B, 316B, 318C, 318D, 320B, 322B in the first container 332 and grouping the graphical objects 308B, 314A, 316A, 318A, 318B, 320A, 322A in the second container 334 of FIGS. 3B-3F.

In some embodiments, the input received at block 404 includes first input to define an arbitrary group and the method 400 may further include, prior to receiving the first input, receiving second input to simultaneously select two or more of the graphical objects to include in the arbitrary group. For example, the second input may include input to simultaneously select the graphical objects 306, 310, 314A, 316B, 318A, 320A and the first input may include input to select the "Group Selected" button in the menu 338 as described with respect to FIGS. 3G-3J.

In some embodiments, the input received at block 404 includes first input to select a pre-existing container and second input to group graphical objects located within the pre-existing container into the one or more containers according to a respective value of an attribute of each of the graphical objects, e.g., as described with respect to FIGS. 2A-2D. In these and other embodiments, the grouping may apply only at one hierarchical level, e.g., below a hierarchical level of the pre-existing container, e.g., as described with respect to FIGS. 2A-2D. In more detail, the graphical objects may represent data objects of the data source, the data objects having a hierarchy. The one or more containers may include two or more containers generated within the pre-existing container for two or more different subsets of the graphical objects each grouped together in a corresponding one of the two or more containers. Two or more graphical objects grouped together in a first container of the two or more containers may each have a first value for the attribute. Two or more other graphical objects grouped together in a second container of the two or more containers may each have a second value for the attribute that is different than the first value. The grouping together of the graphical objects located within the pre-existing container into the two or more containers may apply exclusively to graphical objects that represent data objects at a first level of the hierarchy below a second level of the hierarchy represented by the pre-existing container.

In some embodiments, the input received at block 404 includes first input including a selection of an attribute to group graphical objects and the method 400 may further include identifying unique values of the attribute across the graphical objects. The one or more containers may include at least one container for each of the unique values of the attribute.

In some embodiments, the graphical objects represent data objects of the data source, the data objects having a hierarchy. The hierarchy may be graphically represented by arrangement of the graphical objects within multiple nested containers, e.g., as described with respect to FIGS. 3A-3J. The method 400 may further include preserving the hierarchy while graphically depicting membership of the graphical objects in the one or more groups. In these and other embodiments, the method 400 may further include receiving second input to select: a level of the hierarchy at which to arrange the one or more containers; or a cross-layout arrangement in which to arrange the one or more containers with the nested containers. Such second input may include, e.g., selection of one of the layout elements 307 of the panel 301 of FIG. 3A.

In some embodiments, the one or more containers include at least a first container and a second container. In these and other embodiments, preserving the hierarchy while graphically depicting membership of the graphical objects in the one or more groups may include one of: arranging the first and second containers in a cross-layout arrangement with the nested containers (e.g., as described with respect to FIG. 3B); duplicating the nested containers and arranging the first and second containers at a highest level of the hierarchy (e.g., as described with respect to FIG. 3C); or arranging the first and second containers at a level of the hierarchy beneath the highest level of the hierarchy (e.g., as described with respect to FIGS. 3D and 3E). Duplicating the nested containers and arranging the first and second containers at the highest level of the hierarchy may include positioning a first duplicate of the nested containers inside the first container; positioning graphical objects that belong to a first group represented by the first container within the first duplicate of the nested containers; positioning a second duplicate of the nested containers inside the second container; and positioning graphical objects that belong to a second group represented by the second container within the second duplicate of the nested containers.

In some embodiments, the one or more containers include at least a first container and a second container. In these and other embodiments, preserving the hierarchy while graphically depicting membership of the graphical objects in the one or more groups may include arranging the first container at each level of the hierarchy that includes at least one graphical object that belongs to the first group represented by the first container and the second container at each level of the hierarchy that includes at least one graphical object that belongs to the second group represented by the second container. The foregoing may include distributing duplicates of the first container across the nested containers such that each set of one or more graphical objects that belong to the first group at each hierarchical level immediately beneath a corresponding one of the nested containers is positioned within one of the duplicates of the first container; and distributing duplicates of the second container across the nested containers such that each set of one or more graphical objects that belong to the second group at each hierarchical level immediately beneath a corresponding one of the nested containers is positioned within one of the duplicates of the second container. The method 400 may further include receiving second input to select one of the duplicates of the first or second container; and in response to the second input, altering the graphical diagram to indicate that all other duplicates of the first or second container are duplicates of the same container as the selected duplicate (e.g., as described with respect to FIG. 3F). In some embodiments, the altering of the graphical diagram includes at least one of: highlighting all other duplicates of the first or second container; or displaying connectors between the selected duplicate of the first or second container and all other duplicates of the first or second container.

FIGS. 5A-5K include graphical representations 500A, 500B, 500C, 500D, 500E, 500F, 500G, 500H, 500I, 500J, and 500K (collectively "graphical representations 500") of other UIs to generate graphical diagrams, arranged in accordance with at least one embodiment described herein. The UIs may be provided by the browser 128 and/or the diagram application 114 of FIG. 1. For instance, the browser 128 in cooperation with the diagram application 114 may present the UIs to a user through a display of the client device 104. The UIs of FIGS. 5A-5K may be implemented individually or in combination (in whole or in part) with the UI of FIGS. 2A-2D (in whole or in part), the UI of FIGS. 3A-3J (in whole or in part), and/or other UIs described herein (in whole or in part).

In FIGS. 5A-5K, the graphical representations 500 include a graphical drawing canvas 502. As shown in some of FIGS. 5A-5K, the UIs of FIGS. 5A-5K may include one or more panels 504 and other UI elements, some of which are described elsewhere herein. The panel 504 may permit users to enable or disable various hierarchical levels, groups, and/or individual items within a group. For instance, various groups (such as Accounts, Regions, Application Load Balancers, etc.) may appear in the panel 504 next to a corresponding radio button that may be selected to display, in a graphical diagram 506, graphical objects that represent group members within the selected group or that may be deselected to remove from the graphical diagram 506 graphical objects that represent group members within the deselected group. Group members within the Accounts group may include one or more specific accounts, group members within the Regions group may include one or more specific regions, and so on. Alternatively or additionally, the groups in the panel 504 may be expanded (e.g., to see a list of individual items within the group) and/or collapsed (e.g., to hide the list) and individual items within a given group may be enabled or disable when the group is expanded, Or the individual items may be enabled or disabled in some other manner. One of the UI elements depicted in FIGS. 5A-5K is a layout tab 507 that may be selected to open a layout menu to modify the hierarchical arrangement of the graphical diagram 506. Example implementations of the layout tab 507 and corresponding layout menu are discussed elsewhere herein.

As in FIGS. 2A-2D, in general, graphical drawings or diagrams of structured source data may be displayed in the graphical drawing canvas 502. In FIGS. 5A-5K, the graphical drawing canvas 502 displays the graphical diagram 506 that includes various graphical objects that represent resources, nodes, entities, or the like in underlying structured source data (generically hereinafter "nodes"). FIGS. 5A-5K depict various views of the graphical diagram 506 that may be generated in response to various inputs, e.g., from a user. Some of the inputs are described in the context of a specific group and resulting output or diagram modification. It should be understood, with the benefit of the present disclosure, that the inputs may be applied to or with or in relation to other specific groups to obtain similar results (e.g., similar resulting outputs or diagram modifications).

Figure 5A:
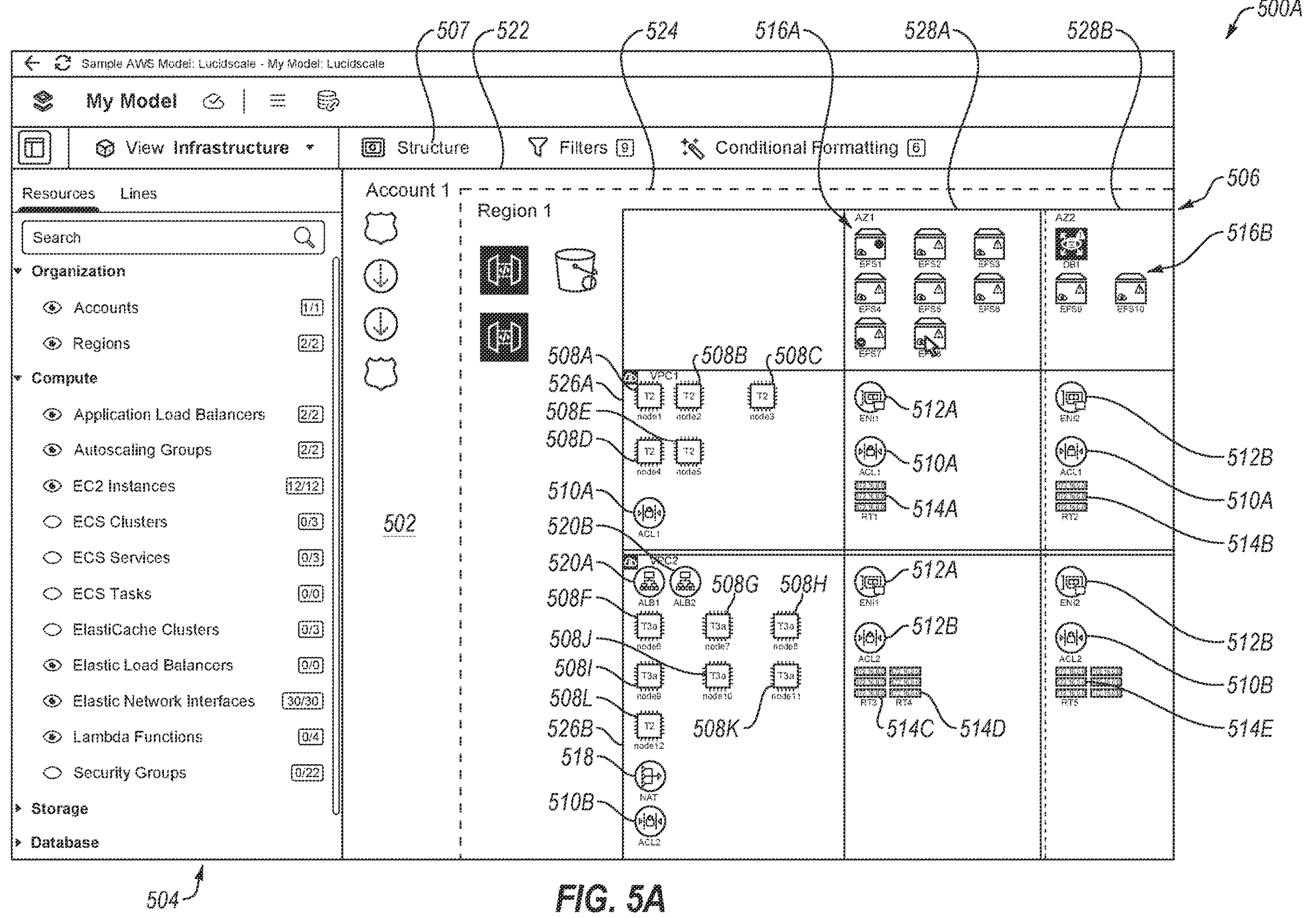
FIGS. 5A-5K include graphical representations of other UIs to generate graphical diagrams.

The specific graphical objects in a given one of FIGS. 5A-5K may vary depending on various settings as discussed herein. Referring primarily to FIG. 5A, the graphical objects in this example include various AWS icons to represent AWS nodes including, among others, compute node graphical objects 508A-508L (hereinafter collectively "compute node graphical objects 508") that represent compute resources, network access control list (ACL) graphical objects 510A, 510B (hereinafter collectively "ACL graphical objects 510") that represent ACL resources, ENI graphical objects 512A, 512B (hereinafter collectively "ENI graphical objects 512") that represent ENI resources, route table graphical objects 514A (hereinafter collectively "route table graphical objects 514") that represent route table resources, elastic file system (EFS) graphical objects 516A, 516B (hereinafter collectively "EFS graphical objects 516") that represent elastic file system resources, NAT gateway graphical object 518 that represents a NAT gateway resource, application load balancer graphical objects 520A, 520B (hereinafter collectively "application load balancer graphical objects 520") that represent application load balancer resources, an account graphical object 522 that represents an account, a region graphical object 524 that represents a region, VPC graphical objects 526A, 526B (hereinafter collectively "VPC graphical objects 526") that represent VPCs, AZ graphical objects 528A, 528B (hereinafter collectively "AZ graphical objects 528") that represent AZs, and subnet graphical objects 530A, 530B, 530C, 530D, 530E (hereinafter collectively "subnet graphical objects 530") (FIG. 5C) that represent subnets (e.g., private or public). Other graphical objects (which may represent other resources or nodes) are also shown in, e.g., FIGS. 5A and 5C, but are not specifically discussed herein. Each of the account graphical object 522, the region graphical object 524, each of the VPC graphical objects 526, each of the AZ graphical objects 528, and each of the subnet graphical objects 530 is a container graphical object and may be referred to hereinafter as a corresponding container, e.g., the account container 522.

As illustrated in FIG. 5A, graphical objects that represent nodes in a next lower hierarchical level from a node represented by a given container may be arranged accordingly within the graphical diagram 506. For example, the region container 524 may represent a region at a next lower hierarchical level from an account represented by the account container 522 such that the region container 524 may be arranged and depicted within the account container 522. Similarly, each of the VPC containers 526 and AZ containers 528 may represent a different VPC or AZ at a next lower hierarchical level from the region represented by the region container 524 such that the VPC containers 526 and the AZ containers 528 may be arranged and depicted within the region container 524.

The AZs and VPCs are at a same hierarchical level of the source data represented in, e.g., FIG. 5A, with corresponding AZ containers 528 and VPC containers 526 shown in a cross-layout arrangement in FIG. 5A. In particular, the VPC containers 526 are arranged in a column and the AZ containers 528 are arranged in a row that intersects the column, thereby forming intersection areas for each VPC container 526 and AZ container 528 pair. For example, the VPC container 526A intersects each of the AZ container 528A and the AZ container 528B to form an intersection area with each. That is, the area of overlap between the VPC container 526A and the AZ container 528A is one intersection area while the area of overlap between the VPC container 526A and the AZ container 528B is another intersection area. The VPC container 526 additionally includes a non-intersection area, i.e., a portion to the left of the AZ container 528A, that does not U overlap with any of the AZ containers 528. The VPC 526B is similarly arranged to form a different intersection area with each of the AZ containers 528 and to include a non-intersection area. Similar to the VPC containers 526, each of the AZ containers 528 includes a non-intersection area. While two VPC containers 526 representing two VPCs and two AZ containers 528 representing two AZs are depicted in FIG. 5A, more generally the graphical diagram 506 may include any number of VPC containers 526 and AZ containers 528 as may be appropriate for a given set of source data. For example, a graphical diagram 506 may include five (or other number) VPC containers 526 and eight (or other number) AZ containers 528 if the underlying source data includes five (or other number) VPCs and eight (or other number) AZs. Further, some of the views depicted in FIGS. 5A-5K depict more or fewer than two VPC containers 526 and/or AZ containers 528 in dependence on the particular settings and viewable area of the graphical diagram 506. For example, the underlying source data for the graphical diagram 506 may include more than two VPCs and more than two AZs which are simply not visible in FIG. 5A due to the settings and/or viewable area of the graphical diagram 506 in the UI of FIG. 5A but may be visible in one or more other FIGS. As another example, the VPC group or AZ group may be disabled to remove all of the corresponding VPC containers 526 or AZ containers 528 from the graphical diagram 506.

In the cross-layout arrangement of the VPC containers 526 and the AZ containers 528, graphical objects may be arranged within the intersection and non-intersection areas of the VPC containers 526 and the AZ containers 528 according to their membership in one or both of a corresponding AZ or VPC. More particularly, the graphical objects may be arranged within the intersection and non-intersection areas according to the membership of the nodes represented by the graphical objects in one or both of a corresponding AZ or VPC. For example, the route table graphical object 514A is depicted in the intersection area of the VPC container 526A and the AZ container 528A, indicating that the route table represented by the route table graphical object 514A belongs to or is a member of both the VPC represented by the VPC container 526 and the AZ represented by the AZ container 528. For purposes of the present disclosure, a graphical object may be understood to belong to a group member (such as a specific AZ or a specific VPC or other specific group member) of a group if the node represented by the graphical object is a leaf or child node of the group member in the underlying hierarchically arranged source data. AZ and VPC are each an example of a group that, as described in more detail herein, may be enabled or disabled by a user to modify the graphical diagram 506. Other groups may similarly be enabled or disabled by the user. VPC1 (as represented by the VPC container 526A) and VPC2 (as represented by the VPC container 526B) are examples of group members within the VPC group. Similarly, AZ1 (as represented by the AZ container 528A) and AZ2 (as represented by the AZ container 528B) are examples of group members within the AZ group.

For simplicity in the discussion that follows, a given graphical object and the node it represents may be used interchangeably insofar as the graphical diagram 506 uses the graphical objects to visually represent the nodes in the underlying source data. For example, a statement that the route table graphical object 514A belongs to the VPC container 526A may also be interpreted as a statement that the route table represented by the route table graphical object 514A belongs to the VPC represented by the VPC container 526A.

In FIG. 5A, the compute nodes 508A-508E are depicted in the non-intersection area of the VPC container 526A while the compute nodes 508F-508L are depicted in the non-intersection area of the VPC container 526B. In other embodiments, such as when subnets are enabled or turned on (see discussion of FIGS. 5B and 5C), the compute nodes 508 may be arranged within one or more intersection areas rather than in non-intersection areas. The reason for this difference between views is that the association of the compute nodes with the corresponding AZs is through the corresponding subnets rather than a direct relationship between the compute nodes and the corresponding AZs. In particular, each compute node is associated with a corresponding subnet which is associated in turn with a corresponding AZ. Each compute node additionally has a direct relationship with a corresponding VPC. As such, when the subnets are turned off, each compute node lacks a direct association with the corresponding AZ, falling back to the relationship with the corresponding VPC and outside of the corresponding AZ. In other embodiments, such indirect relationships (e.g., from compute node to subnet to AZ) may be represented by placing the corresponding object in the corresponding intersection area. Other graphical objects may similarly be arranged within one or more non-intersection areas in one view or intersection areas in another view (where the non-intersection areas and intersection areas exist in both views) for the same, similar, or different reasons.

Figure 5B:
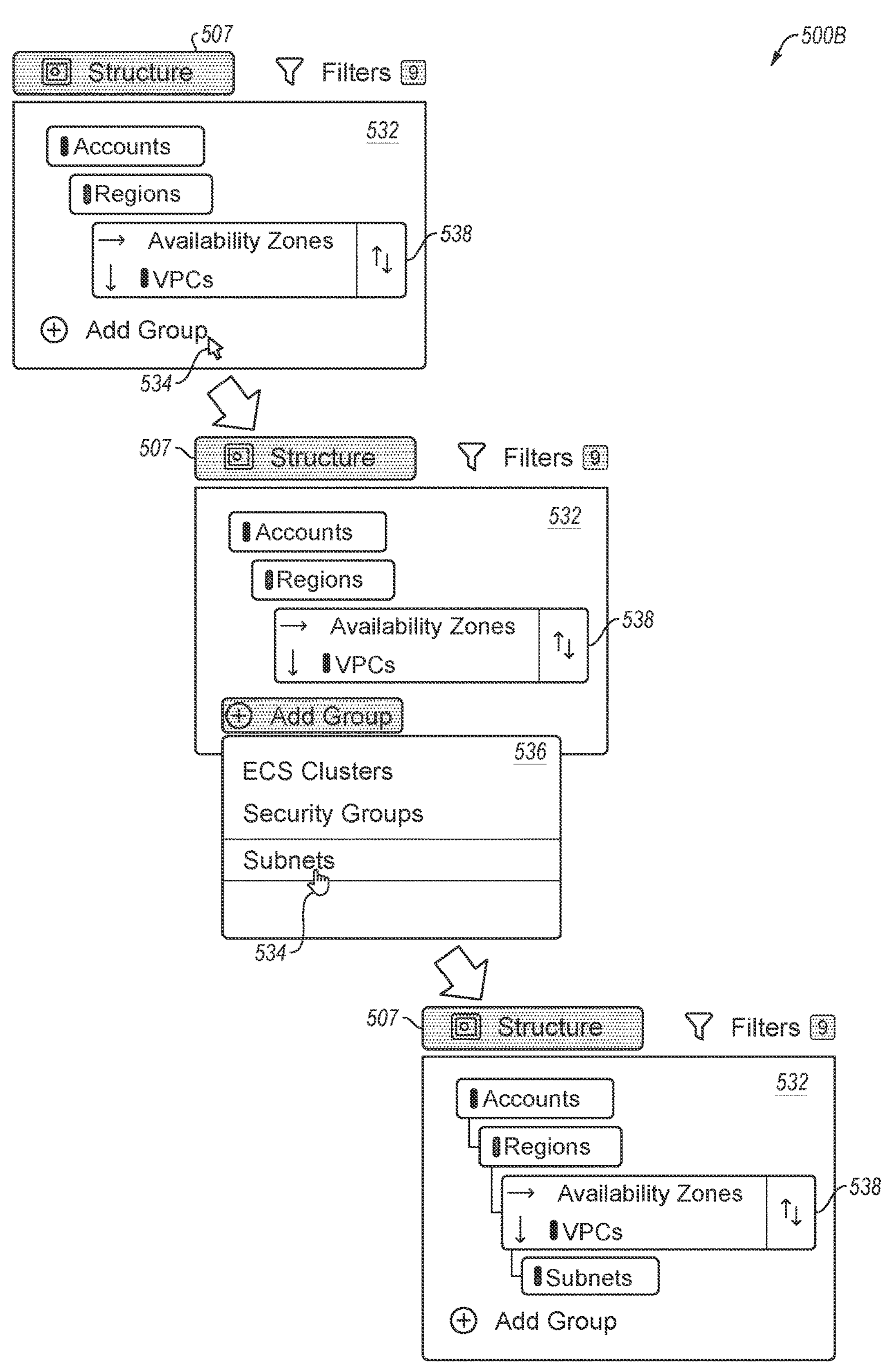

FIG. 5B depicts an example implementation of the layout tab 507 and corresponding layout menu 532 to add a group to a graphical diagram, or to enable the group in the graphical diagram. In some embodiments, selection of the layout tab 507 may highlight the layout tab 507 (e.g., to indicate or confirm selection thereof) and open the layout menu 532. The layout menu 532 may identify the groups that are currently turned on or enabled and their relative hierarchical arrangement. The layout menu 532 at top left in FIG. 5B may correspond to the view of the graphical diagram 506 in FIG. 5A and thus shows that the Account, Region, Availability Zone (or AZ), and VPC groups are enabled since groups members of each of the Account, Region, AZ, and VPC groups are included in the graphical diagram 506 of FIG. 5A. Each group that may be enabled or disabled through the layout menu 532 may include or correspond to a non-terminal hierarchical level, e.g., a hierarchical level where group members of a given group have one or more child or leaf nodes such that graphical objects that represent the group members may be container graphical objects. The layout menu 532 may indicate when two groups are at a same hierarchical level, their arrangement in a cross-layout arrangement, and/or a layout direction of each group. For instance, as illustrated in FIG. 5B, the AZs and VPCs groups are shown at the same hierarchical level beneath the Region group with an arrow to the left of each of the AZ and VPC groups indicating its layout direction. Displaying two groups (e.g., the AZs group and the VPCs group) at the same hierarchical level in a hierarchical arrangement displayed in the layout menu 532 may indicate that the two groups are arranged in a cross-layout arrangement. The arrow to the left of the AZ group is directed horizontally, indicating that the AZ group members (e.g., AZ1 and AZ2) within the AZ group are arranged horizontally, e.g., in a row, as illustrated in FIG. 5A. The arrow to the left of the VPC group is directed vertically, indicating that the VPC group members (e.g., VPC1 and VPC2) within the VPC group are arranged vertically, e.g., in a column, as illustrated in FIG. 5A.

With continued reference to FIG. 5B, to add a group, a mouse having a corresponding mouse cursor 534, or other input device, may be operated to select an option to add a group, such as an "Add Group" button in FIG. 5B. The mouse cursor 534 may take different forms in different contexts; for example, the mouse cursor 534 is depicted as an arrow in the top left of FIG. 5B and as a hand in the middle of FIG. 5B. Selection of the "Add Group" (or other) button may open a drop-down list 536 or other UI from which one or more groups may be selected. In this example, the groups include ECS Clusters, Security Group members, and Subnets, although different and/or additional groups may be included. For example, if a group has been added to the graphical diagram 506 or is already depicted in the graphical diagram 506, that group may not be included in the list 536 from which one or more groups may be selected. On the other hand, when a group is not included in the graphical diagram 506 (e.g., after removal from the graphical diagram 506 as discussed below), that group may be included in the list 536 from which groups may be selected. In some embodiments, selection of a desired group may add the selected group to the hierarchical arrangement displayed in the layout menu 532 at an appropriate hierarchical level. For example, as shown in the middle and bottom right of FIG. 5B selection of the "Subnets" group (middle of FIG. 5B) may add the "Subnets" group to the hierarchical arrangement, e.g., at the next hierarchical level beneath AZs and VPCs since the Subnets exist in the next hierarchical level beneath AZs and VPCs in the underlying source data.

Figure 5C:
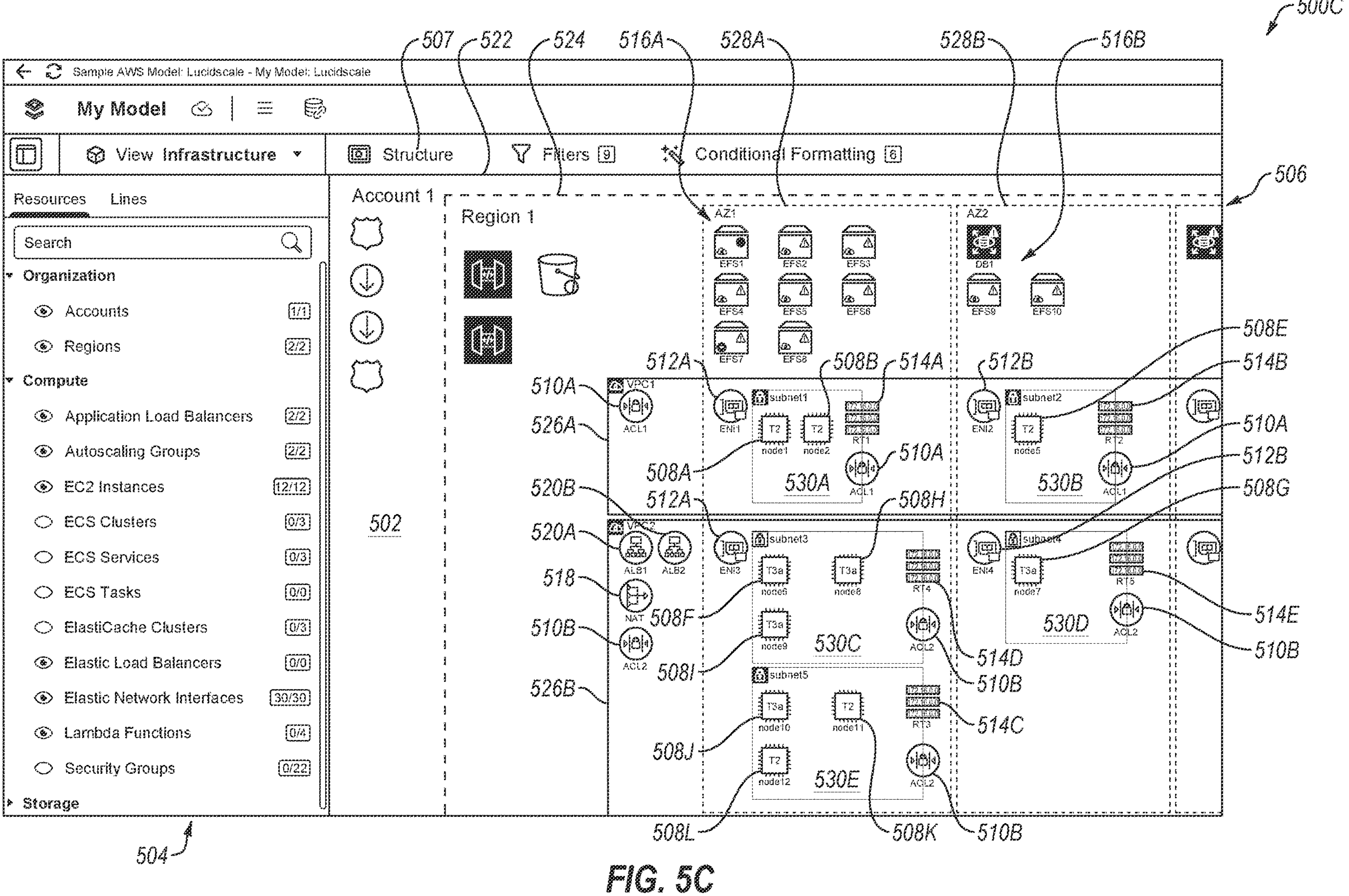

FIG. 5C depicts the graphical diagram 506 with inclusion of the "Subnets" group. The displayed hierarchical arrangement of the graphical diagram 506 in FIG. 5A may be modified to the displayed hierarchical arrangement of the graphical diagram 506 in FIG. 5C in response to addition of the "Subnets" group as described with respect to FIG. 5B. In particular, the displayed hierarchical arrangement of the graphical diagram 506 in FIG. 5C includes the subnet containers 530 arranged within a corresponding intersection area of a given VPC container 526 with a given AZ container 528. For example, the subnet container 530A (or more particularly, the subnet represented by the subnet container 530A) belongs to both the VPC container 526A (or more particularly, the VPC represented by the VPC container 526A) and the AZ container 528A (or more particularly, the AZ represented by the AZ container 528A) and is therefore arranged in the intersection area formed where the VPC container 526A and the AZ container 528A overlap. As another example, the subnet container 530D (or more particularly, the subnet represented by the subnet container 530D) belongs to both the VPC container 526B (or more particularly, the VPC represented by the VPC container 526B) and the AZ container 528B (or more particularly, the AZ represented by the AZ container 528B) and is therefore arranged in the intersection area formed where the VPC container 526B and the AZ container 528B overlap.

Each of the compute nodes 508 is associated with a corresponding one of the subnet containers 530 and is repositioned from the non-intersection areas of the VPC containers 526 in FIG. 5A to a corresponding intersection area of the VPC containers 526 and the AZ containers 528 within a corresponding one of the subnet containers 530 in FIG. 5C when the "Subnets" group is enabled. For example, the compute nodes 508A, 508B shown in the non-intersection area of the VPC container 526A in FIG. 5A belong to the subnet container 530A and when the "Subnets" group is enabled, the compute nodes 508A, 508B are repositioned within the subnet container 530A which in turn is positioned in the intersection area of the VPC container 526A and the AZ container 528A as illustrated in FIG. 5C. In other embodiments, e.g., when the compute nodes 508 are positioned within corresponding intersection areas of the VPC containers 526 and the AZ containers 528 even with the "Subnets" group disabled (e.g., whether by adding a direct connection between the compute nodes 508 and the AZs or inferring an indirect connection between the two), the compute nodes 508 within the intersection areas may simply be re-arranged within the intersection areas to also be within a corresponding subnet container 530 when the "Subnets" group is enabled.

Figure 5D:
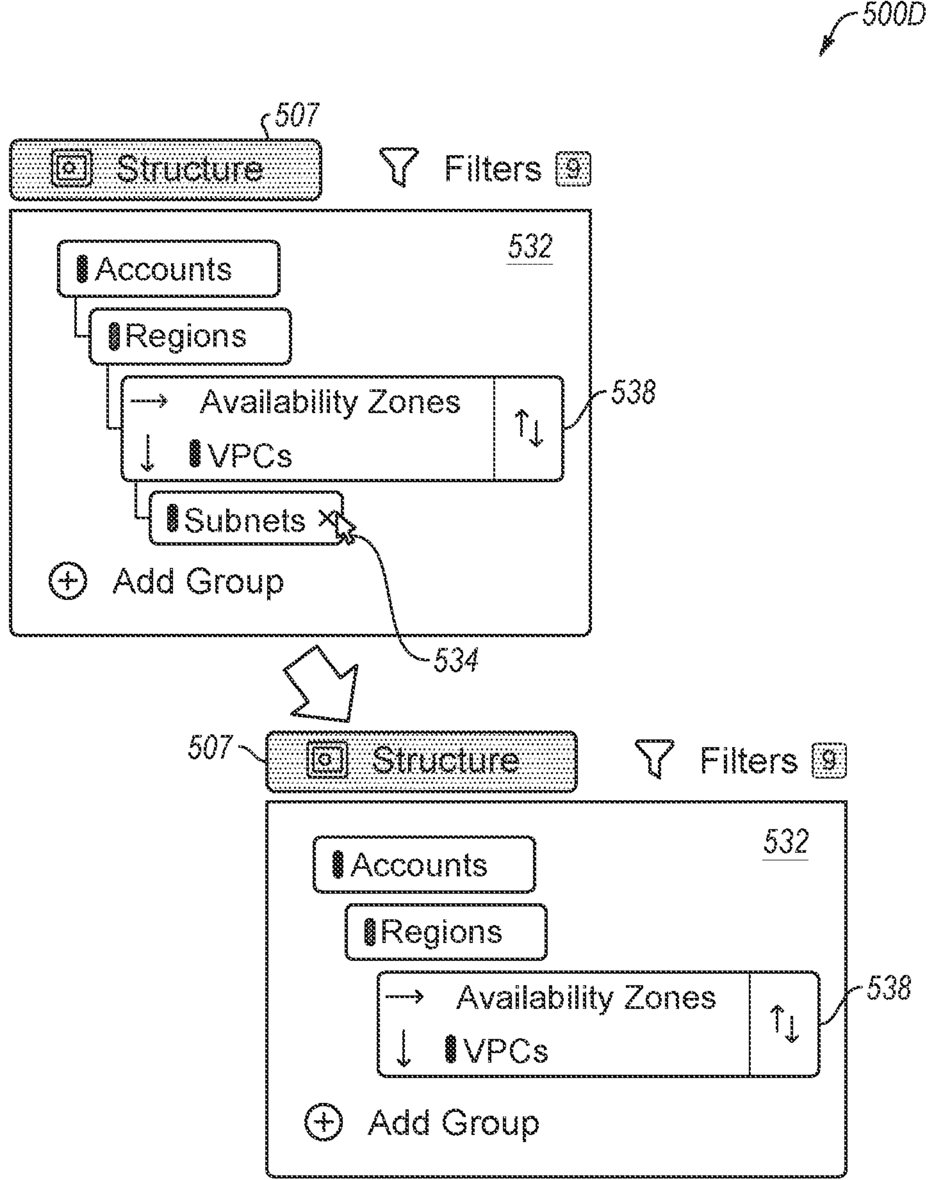

FIG. 5D depicts an example implementation of the layout menu 532 to remove a group from a graphical diagram, or to disable the group in the graphical diagram. In these and other embodiments in which a group is removed or disabled from the graphical diagram 506, the group and its arrangement within the hierarchy of the underlying source data remains in the underlying source data and it is only the display of the group in the graphical diagram 506 that is changed. As described with respect to FIG. 5B, selection of the layout tab 507 may highlight the layout tab 507 (e.g., to indicate or confirm selection thereof) and open the layout menu 532. The layout menu 532 may provide functionality to disable groups. Generally, the layout menu 532 may include one or more UI elements that may be selected to disable or remove a given group from the display of the graphical diagram 506. For instance, positioning the mouse cursor 534 over a given group displayed in the hierarchical arrangement in the layout menu 532 may cause an "x" or other UI element to appear next to the group, selection of which may remove the group from the graphical diagram 506 itself and remove the group from the hierarchical arrangement displayed in the layout menu 532. As a particular example, the upper left representation of the layout menu 532 in FIG. 5D shows an "x" next to the "Subnets" group while the mouse cursor 534 is positioned over the "Subnets" group. Selection of the "x" next to the "Subnets" group may modify the graphical diagram 506 to remove or disable "Subnets" from the graphical diagram 506. In addition, selection of the "x" next to the "Subnets" group may modify the hierarchical arrangement displayed in the layout menu 532 to remove or disable "Subnets" from the graphical diagram 506, as shown at lower right in FIG. 5D. The displayed hierarchical arrangement of the graphical diagram 506 in FIG. 5C may be modified to the displayed hierarchical arrangement of the graphical diagram 506 in FIG. 5A in response to removal of the "Subnets" group as described with respect to FIG. 5D.

Figure 5E:
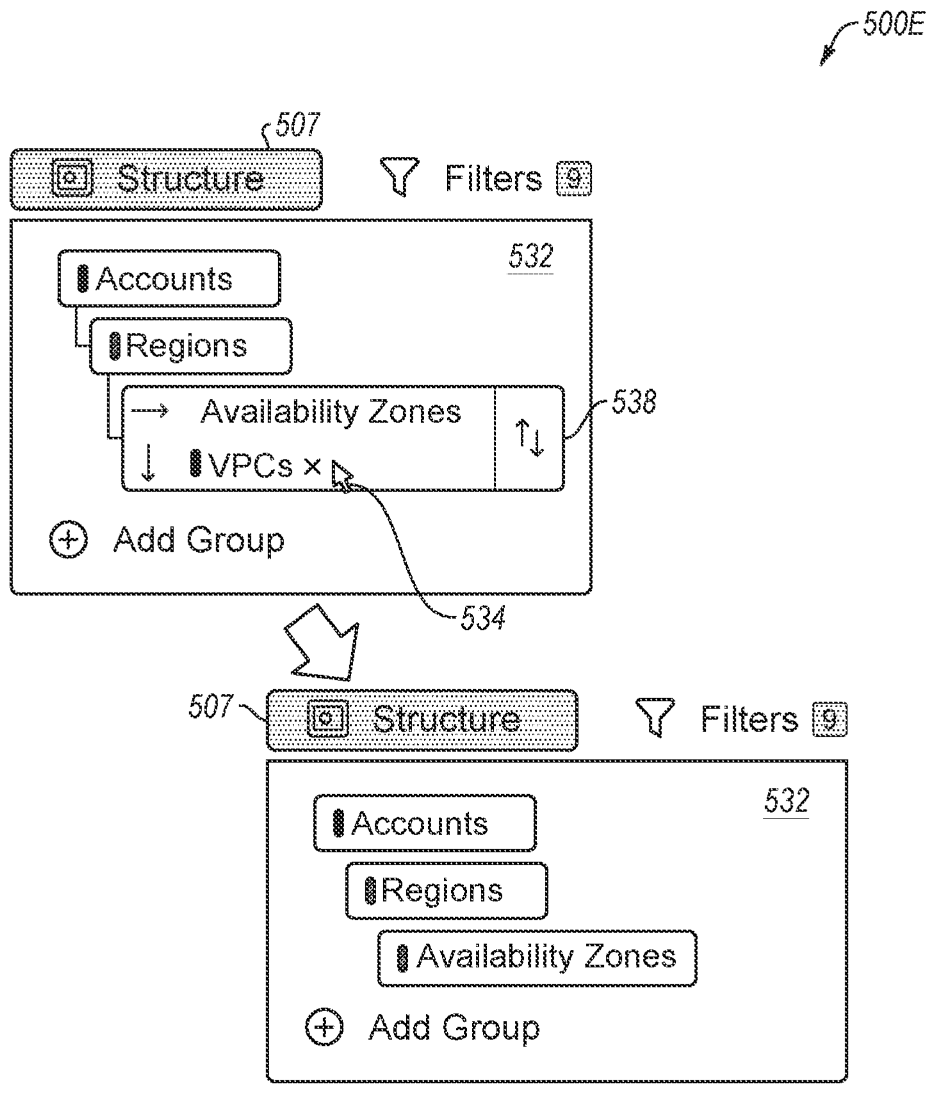

FIG. 5E depicts another example implementation of the layout menu 532 to remove a group from a graphical diagram, or to disable the group in the graphical diagram. As in FIG. 5D, and with the layout menu 532 open, the mouse cursor 534 may be positioned over any of the groups remaining in the hierarchical arrangement displayed in the layout menu 532 to cause an "x" to appear next to the group to then remove or disable the group in the graphical diagram 506. In this example, the upper left representation of the layout menu 532 in FIG. 5E shows an "x" next to the "VPCs" group while the mouse cursor 534 is positioned over the "VPCs" group. Selection of the "x" next to the "VPCs" group may modify the graphical diagram 506 to remove or disable "VPCs" from the graphical diagram 506. In addition, selection of the "x" next to the "VPCs" group may modify the hierarchical arrangement displayed in the layout menu 532 to remove or disable "VPCs" from the graphical diagram 506, as shown at lower right in FIG. 5E. The displayed hierarchical arrangement of the graphical diagram 506 in FIG. 5C may be modified to the displayed hierarchical arrangement of the graphical diagram 506 in FIG. 5E in response to removal of the "VPCs" group as described with respect to FIG. 5E.

Figure 5F:
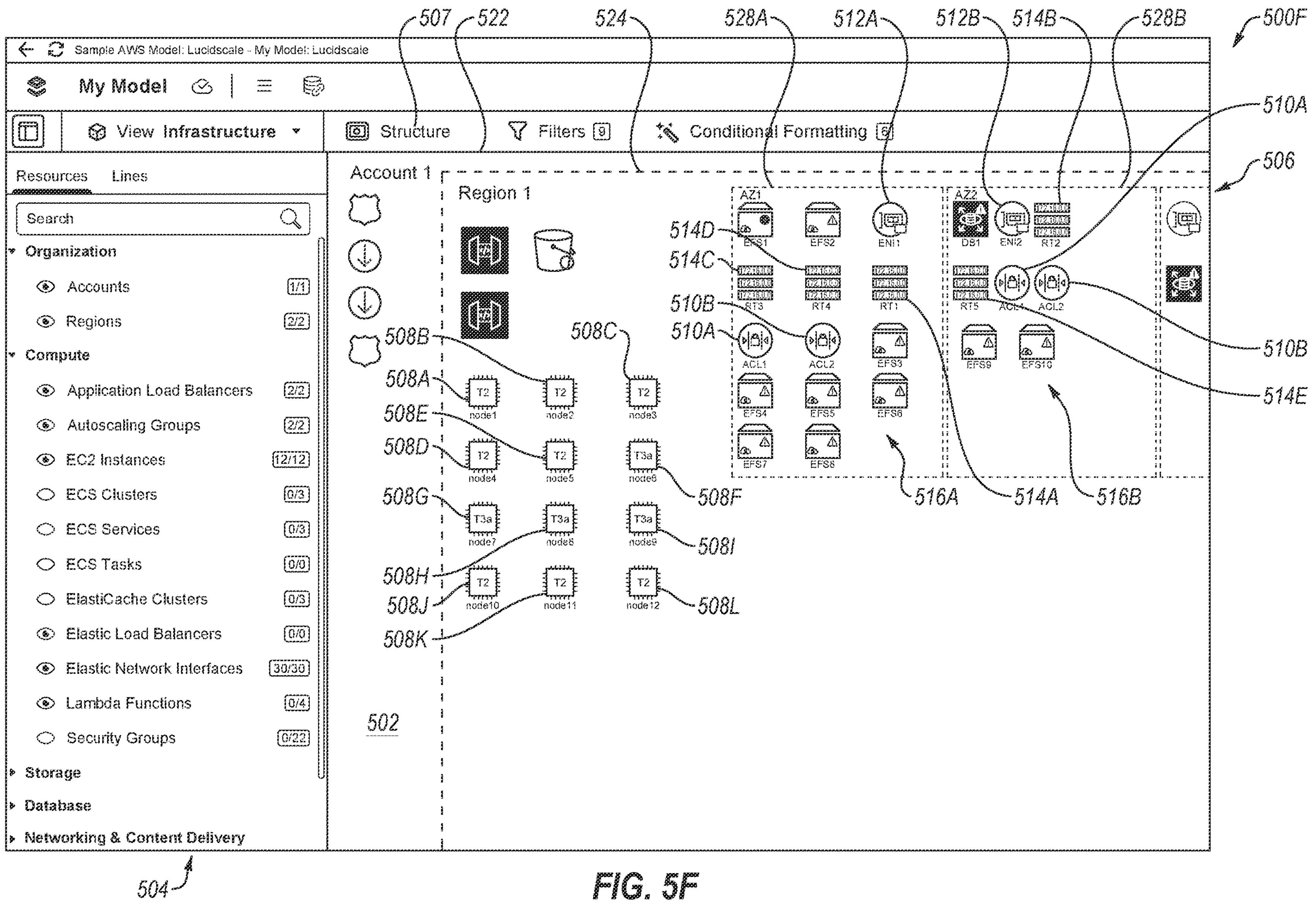

FIG. 5F depicts the graphical diagram 506 with a displayed hierarchical arrangement that includes only three groups enabled: the "Accounts" group, the "Regions" group, and the "AZs" group. The lower right representation of the layout menu 532 in FIG. 5E shows the state of the layout menu 532 corresponding to the displayed hierarchical arrangement of FIG. 5F. As illustrated in FIG. 5F, at least some of the graphical objects previously distributed across VPC containers 526 and/or subnet containers 530 within the AZ containers 528 in FIGS. 5A and/or 5C are instead positioned only within the AZ containers 528 (which in turn are within the region container 524 which is within the account container 522) since the "VPCs" group and the "Subnets" group have been disabled in FIG. 5F. On the other hand, the compute nodes 508 are not directly associated with or contained in the AZ containers 528 such that with the "Subnets" group disabled, the compute nodes 508 are not positioned within any of the AZ containers. Further with the "VPCs" group disabled, the compute nodes 508 no longer belong to any containers at the same level in the hierarchy of the underlying source data as the AZ containers 528 and are therefore shown specifically in the region container 524 in FIG. 5F. In other embodiments, e.g., when the compute nodes 508 are directly associated with the AZ containers 528 and both the "Subnets" group and the "VPCs" group are disabled, the compute nodes 508 may be arranged within corresponding AZ containers 528.

Figure 5G:
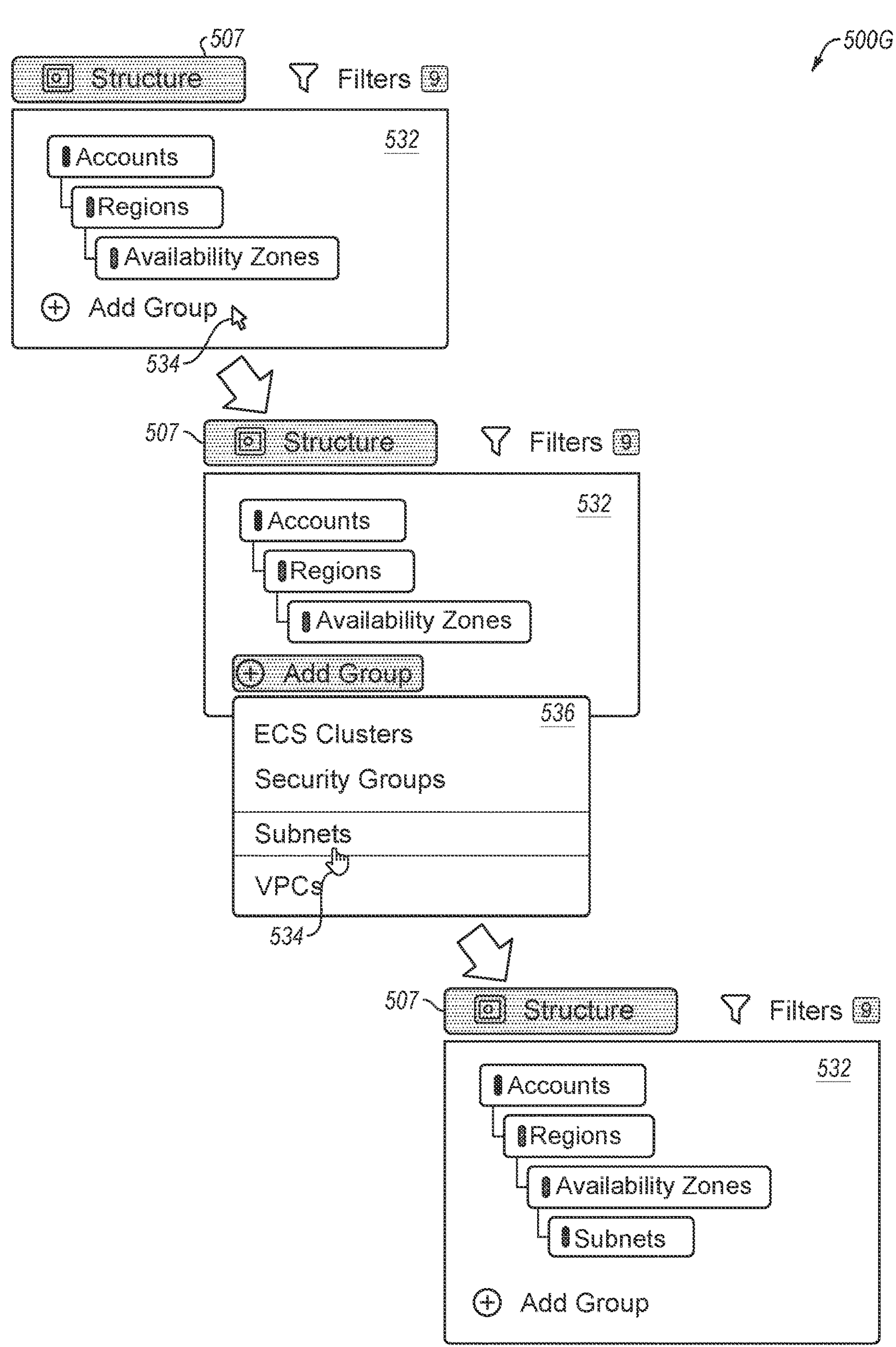
Figure 5H:
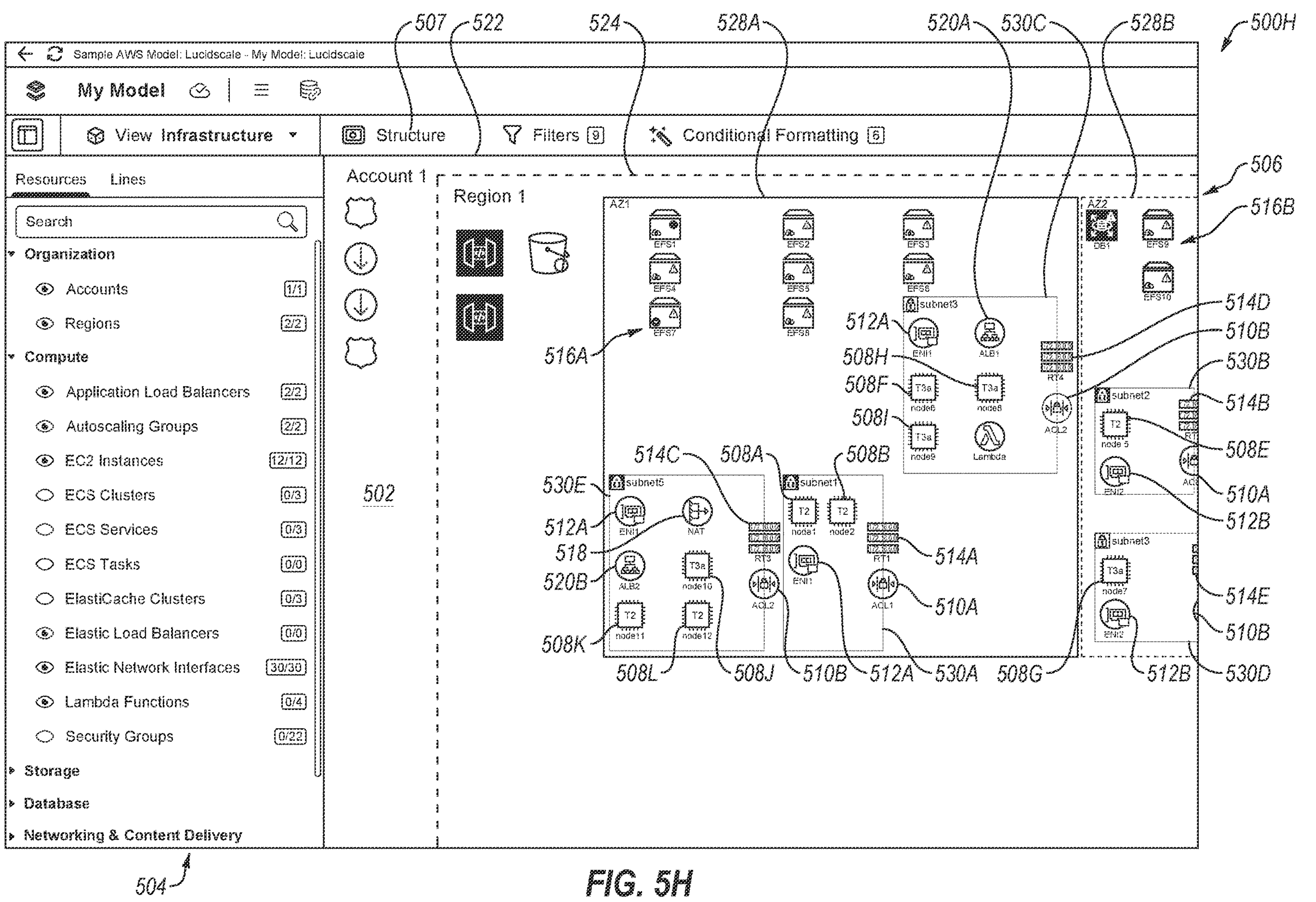

FIG. 5G depicts another example implementation of the layout menu 532 to add a group to a graphical diagram, or to enable the group in the graphical diagram. With the layout menu 532 open as shown at top left in FIG. 5G, the same operations discussed with respect to FIG. 5B may be implemented to add a group to the graphical diagram 506 of FIG. 5F. In particular, the mouse may be operated to select the "Add Group" button or other option within the layout menu 532 and a desired group may then be selected from the list 536 displayed in response to selection of the "Add Group" button. In the example of FIG. 5G, the "Subnets" group is selected as shown in the middle of FIG. 5G to cause the subnet containers 530 to be included in the displayed hierarchical arrangement of the graphical diagram 506 (along with all other enabled groups), as shown in FIG. 5H. The hierarchical arrangement displayed in the layout menu 532 is also updated to include the now enabled "Subnets" group, as shown at bottom right in FIG. 5G.

FIG. 5H depicts the graphical diagram 506 with a displayed hierarchical arrangement that includes four groups enabled: the "Accounts" group, the "Regions" group, the "AZs" group, and the "Subnets" group. The bottom right representation of the layout menu 532 in FIG. 5G shows the state of the layout menu 532 corresponding to the displayed hierarchical arrangement of FIG. 5H.

Figure 5I:
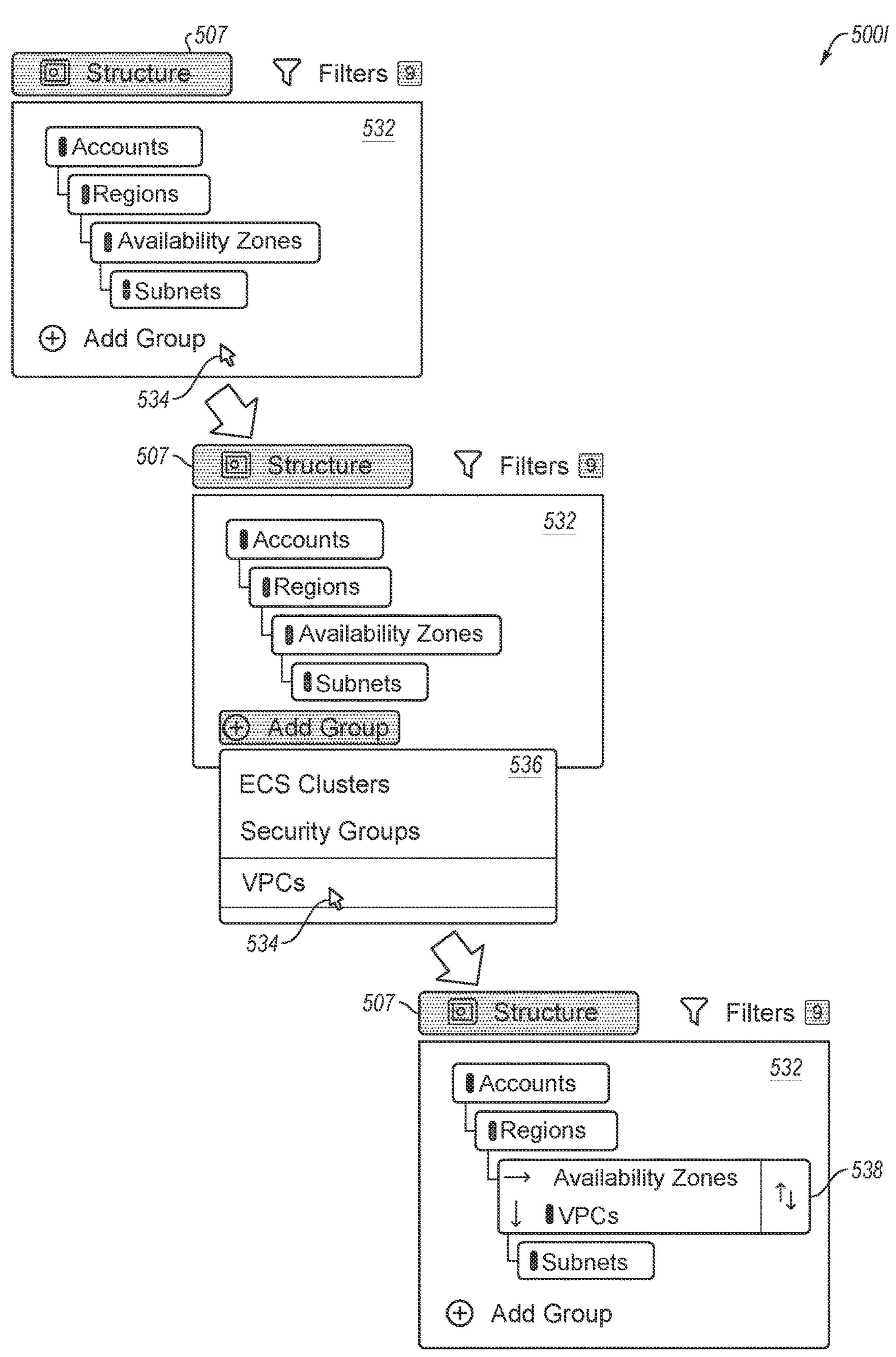

FIG. 5I depicts another example implementation of the layout menu 532 to add a group to a graphical diagram, or to enable the group in the graphical diagram. With the layout menu 532 open as shown at top left in FIG. 5I, the same operations discussed with respect to FIG. 5B and FIG. 5G may be implemented to add a group to the graphical diagram 506 of FIG. 5H. In particular, the mouse may be operated to select the "Add Group" button or other option within the layout menu 532 and a desired group may then be selected from the list 536 displayed in response to selection of the "Add Group" button. In the example of FIG. 5I, the "VPCs" group is selected as shown at middle in FIG. 5I to cause the VPC containers 526 to be included in the displayed hierarchical arrangement of the graphical diagram 506 (along with all other enabled groups), as shown in FIG. 5C. The hierarchical arrangement displayed in the layout menu 532 is also updated to include the now enabled "VPCs" group, as shown at bottom right in FIG. 5I. The bottom right representation of the layout menu 532 in FIG. 5I shows the state of the layout menu 532 corresponding to the displayed hierarchical arrangement of FIG. 5C.

Figure 5J:
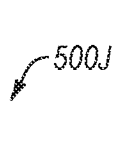
Figure 5J:
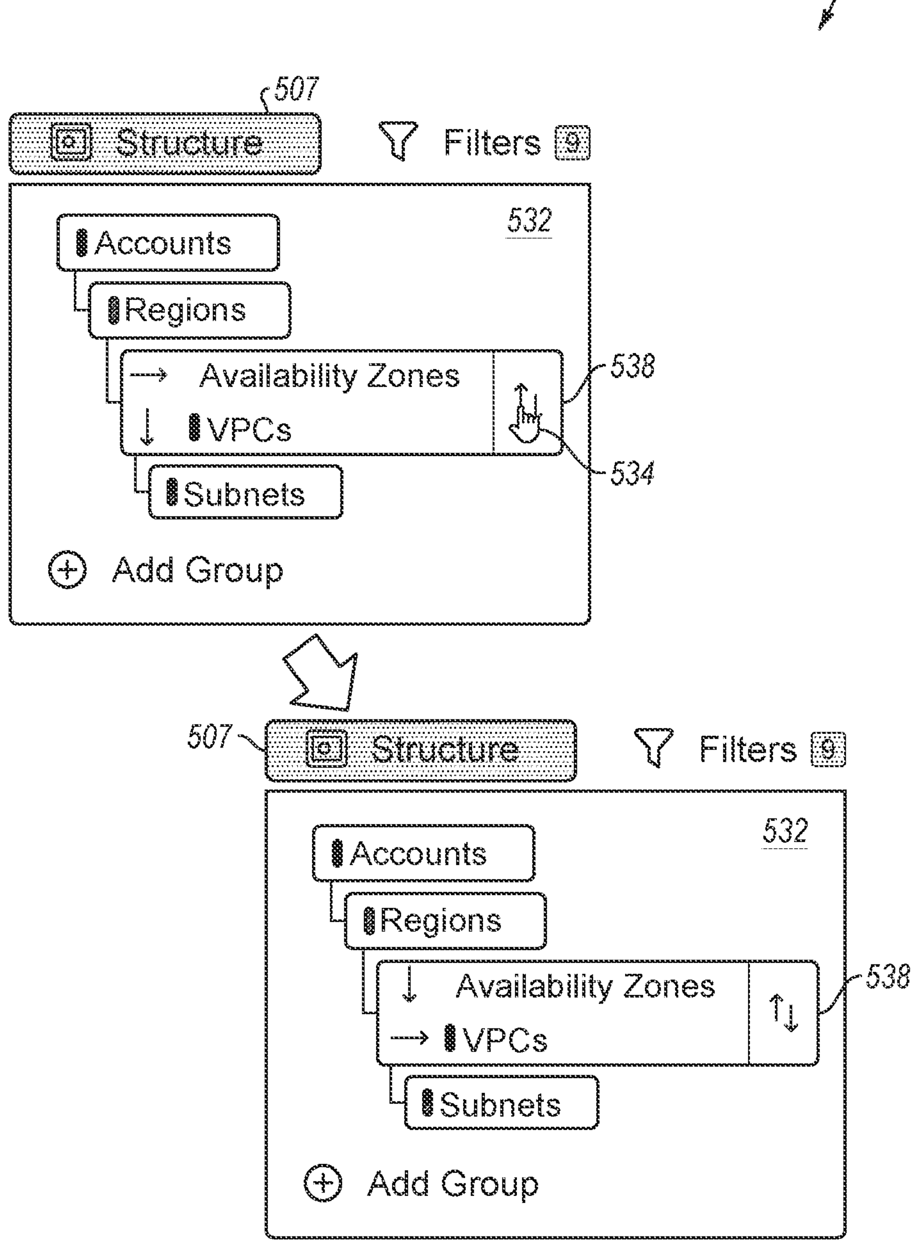

FIG. 5J depicts an example implementation of the layout menu 532 to switch layout direction in a cross-layout arrangement. In this and other embodiments, the layout menu 532 may include a UI element or option that may be selected to switch the layout directions of any pair of H enabled groups in a cross-layout arrangement. For example, the layout menu 532 may include a "switch" button 538 or other button or feature that may appear next to or in association with any cross-layout pair of enabled groups. The "switch" button 538 may be selected to switch the layout direction of each group of the cross-layout pair. The upper left representation of the layout menu 532 in FIG. 5J shows the state of the layout menu 532 corresponding to the displayed hierarchical arrangement of FIG. 5C. Initially in this example, and as illustrated in FIG. 5C, the AZ group members within the AZs group are arranged horizontally in a row while the VPC group members within the VPCs group are arranged vertically in a column. This arrangement is reflected in the top left representation of the layout menu 532 in FIG. 5J by the horizontal arrow to the left of the AZs group and the vertical arrow to the left of the VPCs group. However, selection of the "switch" button 538 may switch the layout directions of the groups in the cross-layout pair. In particular, selection of the "switch" button 538 in the top left representation of the layout menu 532 in FIG. 5J may modify the displayed hierarchical arrangement of the graphical diagram 506 from that shown in FIG. 5C to that shown in FIG. 5K in which the AZ group members within the AZs group are arranged vertically in a column (changed from horizontally in a row in FIG. 5C) while the VPC group members within the VPCs group are arranged horizontally in a row (changed from vertically in a column in FIG. 5C).

The layout menu 532 may be updated to reflect the switched layout directions. For example, and referring to FIG. 5J, the arrows to the left of the "AZs" group and the "VPCs" group in the layout menu 532 may be switched so that the arrow to the left of the AZs group changes from horizontal (upper left representation of the layout menu 532) to vertical (lower right representation of the layout menu 532) and so that the arrow to the left of the VPCs group changes from vertical (upper left representation of the layout menu 532) to horizontal (lower right representation of the layout menu 532).

Figure 5K:
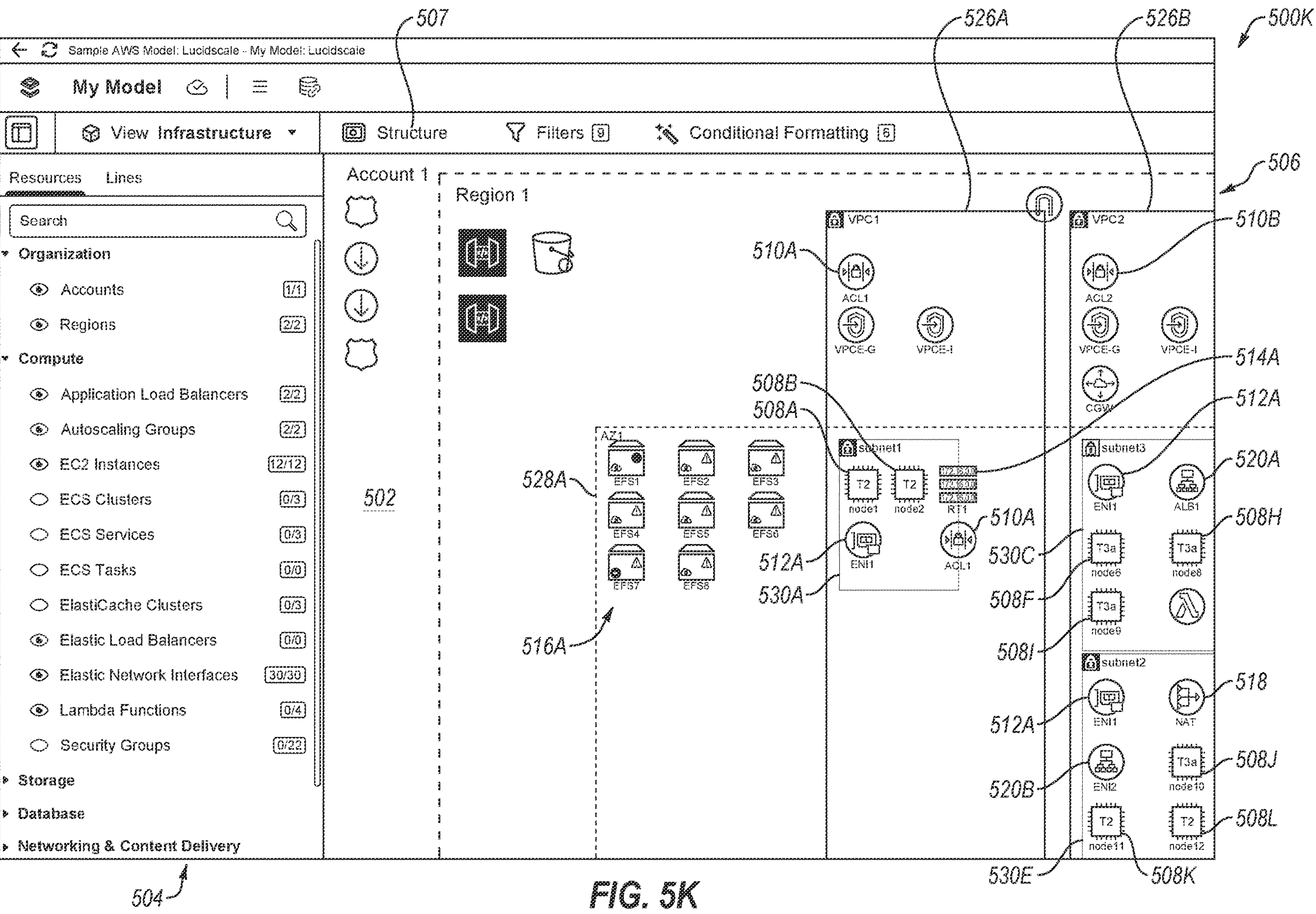

FIG. 5K depicts the graphical diagram 506 with a displayed hierarchical arrangement in which the layout directions of the VPCs group and the AZs group have been switched from, e.g., FIG. 5C. The bottom right representation of the layout menu 532 in FIG. 5J shows the state of the layout menu 532 corresponding to the displayed hierarchical arrangement of FIG. 5K.

Figure 6:
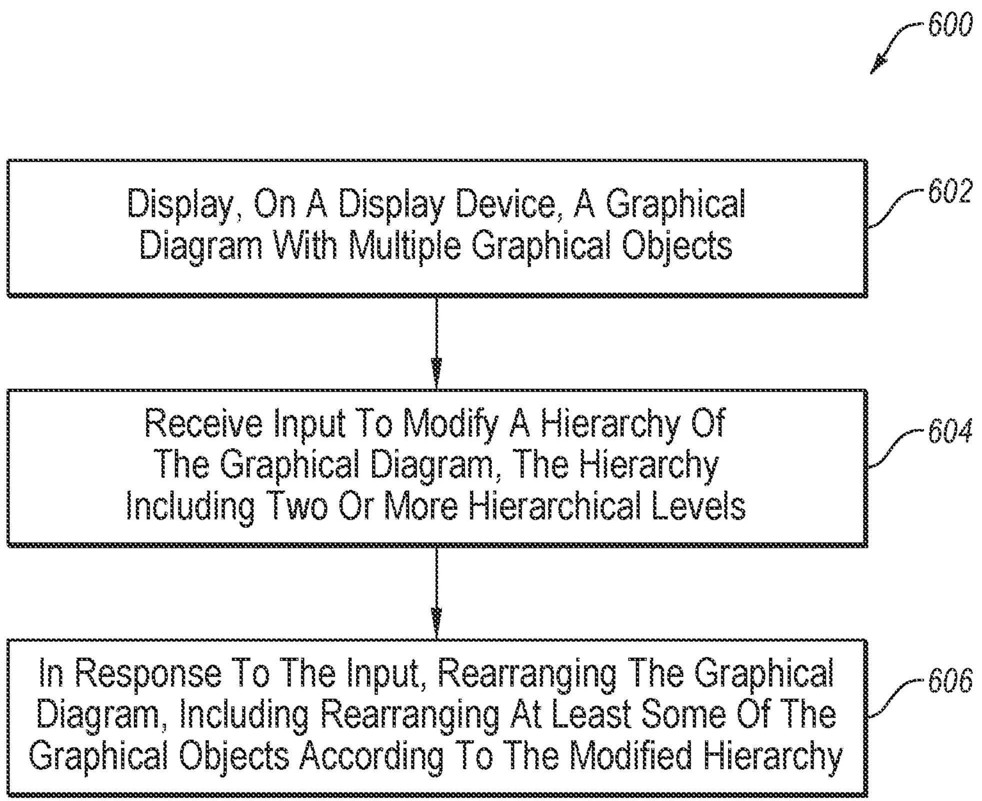
FIG. 6 illustrates a flowchart of an example method to display graphical diagrams that may be implemented in the operating environment of FIG. 1 and/or the UIs of FIGS. 5A-5K.

FIG. 6 illustrates a flowchart of an example method 600 to define a displayed hierarchy, arranged in accordance with at least one embodiment described herein. The method 600 may be performed by any suitable system, apparatus, or device. For example, any one or more of the client devices 104, 106, 108, the collaboration application 114, and/or the server 102 of FIG. 1 may perform or direct performance of one or more of the operations associated with the method 600. In these and other embodiments, the method 600 may be performed or controlled by one or more processors based on one or more computer-readable instructions stored on one or more non-transitory computer-readable media. Alternatively or additionally, embodiments herein may include a non-transitory computer-readable medium having computer-readable instructions stored thereon that are executable by a processor to perform or control performance of the method 600 or one or more operations thereof. The method 600 may include one or more of blocks 602, 604, and/or 606.

At block 602, the method 600 may include displaying, on a display device, a graphical diagram with multiple graphical objects. The graphical objects may represent data of a data source. The data of the data source may have a hierarchical arrangement. In some embodiments, block 602 may include displaying the graphical diagram 206, 304, 506 with the corresponding graphical objects representing structured source data 120 on a display device included in or coupled to the client device 104 of FIG. 1. Block 602 may be followed by block 604.

At block 604, the method 600 may include receiving input effective to modify a hierarchy of the graphical diagram, the hierarchy including two or more hierarchical levels. For example, block 604 may include the client device 104 of FIG. 1 receiving input to select one of the layout elements 307 in FIG. 3A, to select or identify a location at which to position containers, to select the layout tab 507 of FIGS. 5A-5K, and/or to select one or more options within the layout menu 532 of FIGS. 5A-5K. Block 604 may be followed by block 606.

At block 606, the method 600 may include, in response to the input, rearranging the graphical diagram according to the modified hierarchy, including rearranging at least some of the graphical objects according to the modified hierarchy. For example, if a group is enabled, one or more containers representing group members of the now enabled group may be newly displayed and each of the graphical objects may be arranged within or without the one or more containers depending on their membership (or not) in a corresponding group member. Graphical objects that belong to a given group member may be arranged within the corresponding container while graphical objects that do not belong to any of the group members may be arranged to be outside each of the newly displayed containers.

In some embodiments, receiving the input effective to modify the hierarchy of the graphical diagram at block 604 includes receiving input effective to disable or enable a group at a first hierarchical level of the two or more hierarchical levels. For example, the input effective to U disable or enable a group may include input to toggle either or both of the buttons 222, 224 of FIGS. 2A-2D from “off” to “on” or “on” to “off” or input to create a user-defined group. As another example, the input effective to disable or enable a group may include input to remove a group from or add a group to the displayed hierarchical arrangement of the layout menu 532 as described with respect to FIGS. 5A-5K. In these and/or other embodiments, rearranging the graphical diagram according to the modified hierarchy at block 606 may include removing from the first hierarchical level of the graphical diagram on the display device one or more graphical containers that respectively represent one or more group members of the group in response to receiving input effective to disable the group. For instance, toggling the button 222 in FIG. 2B or 2D from “on” to “off” may remove the invisible containers that surround the different types of graphical objects by type in FIG. 2B or 2D and cause the graphical objects to be rearranged to the state shown in FIG. 2A (if the button 224 is currently toggled to “off”) or FIG. 2C (if the button 224 is currently toggled to “on”). As another example, disabling the “Subnets” group as described with respect to FIG. 5D and/or the “VPCs” group as described with respect to FIG. 5E may cause the subnet containers 530 and/or the VPC containers 526 to be removed from the graphical diagram 506. Alternatively, rearranging the graphical diagram according to the modified hierarchy at block 606 may include adding to the first hierarchical level of the graphical diagram on the display device one or more graphical containers that respectively represent one or more group members of the group in response to receiving input effective to enable the group. For instance, toggling the button 222 in FIG. 2A or 2C from “off” to “on” may add the invisible containers to surround the different types of graphical objects by type and cause the graphical objects to be rearranged from not being arranged in containers by type as shown in FIG. 2A or 2C to being arranged in containers by type as shown in FIG. 2B (if the button 224 is currently toggled to “off”) or FIG. 2D (if the button 224 is currently toggled to “on”). As another example, enabling the “Subnets” group as described with respect to FIGS. 5B and 5G and/or the “VPCs” group as described with respect to FIG. 5I may cause the subnet containers 530 and/or the VPC containers 526 to be added to the graphical diagram 506.

In some embodiments, receiving the input effective to modify the hierarchy of the graphical diagram at block 604 includes receiving input effective to disable a first group at a first hierarchical level of the two or more hierarchical levels. The input to disable the first group may include input to toggle the button 222, 224 from “on” to “off” or to select the layout tab 507 and select a group to disable from the menu 532. The first group may include one or more first group members; for instance, the VPCs group in FIGS. 5A-5K includes at least two group members: the VPC 526A and the VPC 526B. One or more first subsets of the graphical objects may respectively belong to the one or more first group members; for example, the RT graphical object 514A and the ACL graphical object 510A belong to the VPC 526A while the RT graphical objects 514C, 514D and the ACL graphical object 510B belong to the VPC 526B, as illustrated in FIG. 5C. Rearranging the graphical diagram according to the modified hierarchy at block 606 may include removing from the first hierarchical level of the graphical diagram on the display device one or more first graphical containers that respectively represent the one or more first group members of the first group. For example, and referring to FIGS. 5C and 5F, the VPC containers 526 are removed from the graphical diagram 506 in response to disabling the VPCs group. Rearranging at least some of the graphical objects according to the modified hierarchy at block 606 may include rearranging graphical objects of the one or more first subsets on the display device according to their membership in one or more second group members of a second group that is different than the first group. For example, and referring to FIGS. 5C and 5F, the RT graphical objects 514A, 514C, 514D and the ACL graphical objects 510 are rearranged from FIG. 5C to FIG. 5F according to their membership in the AZ containers 528 without considering their membership in the VPC containers 526.

In some embodiments, receiving the input effective to modify the hierarchy of the graphical diagram at block 604 includes receiving input effective to enable a group at a first hierarchical level of the two or more hierarchical levels. The input to enable the first group may include input to toggle the button 222, 224 from “off” to “on” or to select the layout tab 507 and select a group to enable from the menu 532. The group may include one or more group members; for example, the “Subnets” group of FIGS. 5A-5K includes subnets 530A-530D. One or more subsets of the graphical objects may respectively belong to the one or more group members; for example, the compute node graphical objects 508A, 508B belong to the subnet 530A while the compute node 508E belongs to the subnet 530B, as illustrated in FIG. 5C. Rearranging the graphical diagram according to the modified hierarchy at block 606 may include adding one or more graphical containers to the graphical diagram on the display device arranged in the graphical diagram at the first hierarchical level. For example, and referring to FIGS. 5A and 5C, the subnet containers 530 are added to the graphical diagram 506 in response to enabling the “Subnets” group. The one or more graphical containers may respectively represent the one or more group members of the group. Rearranging at least some of the graphical objects according to the modified hierarchy at block 606 may include rearranging graphical objects of the one or more subsets into the one or more graphical containers on the display device according to their membership in the one or more group members. For example, and referring to FIGS. 5A and 5C, the compute nodes 508A, 508B, 508C are rearranged from FIG. 5A to FIG. 5C according to their membership in the subnet containers 530A, 530B; e.g., the compute nodes 508A, 508B, 508E are moved from being contained only within the VPC container 526 to being contained within a corresponding one of the subnet containers 530A, 530B.

In some embodiments, receiving the input effective to modify the hierarchy of the graphical diagram at block 604 includes receiving input effective to disable or enable a cross-layout in which first and second groups at a first hierarchical level of the two or more hierarchical levels are both enabled simultaneously. The input to disable or enable the cross-layout may include input to select or deselect the "Cross-Layout" option in FIG. 3A or to remove or add a group from or to a same hierarchical level as another group as in the case of adding or removing the "AZs" group or "VPCs" group to or from the same hierarchical level as the other of the "VPCs" group or the "AZs" group, e.g., using the layout menu 532 of FIGS. 5A-5K. Rearranging the graphical diagram according to the modified hierarchy at block 606 may include, in response to receiving the input effective to enable the cross-layout, displaying on the display device intersecting first and second containers respectively representing first and second group members of the first and second groups and rearranging graphical objects in intersection areas or non-intersection areas of the first and second graphical containers according to their membership in one or both of a corresponding first or second group member. Examples of the foregoing are disclosed with respect to, e.g., FIGS. 3B, 5A, 5C, and 5K and the accompanying description. Alternatively, rearranging the graphical diagram according to the modified hierarchy at block 606 may include, in response to receiving the input effective to disable the cross-layout, removing from the first hierarchical level of the graphical diagram on the display device one or more first graphical containers that respectively represent one or more first group members of the first group and rearranging on the display device graphical objects belonging to the one or more first group members according to their membership in one or more other group members represented by one or more other currently displayed graphical containers. Examples of the foregoing are disclosed with respect to, e.g., FIGS. 3C-3J, 5F, 5H and the accompanying description.

In some embodiments, receiving the input effective to modify the hierarchy of the graphical diagram at block 604 includes receiving input effective to enable a cross-layout in which first and second groups at a first hierarchical level of the two or more hierarchical levels are both enabled simultaneously. The input to enable the cross-layout may include input to select the "Cross-Layout" option in FIG. 3A or to add a group to a same hierarchical level as another group as in the case of adding the "AZs" group or "VPCs" group to the same hierarchical level as the other of the "VPCs" group or the "AZs" group, e.g., using the layout menu 532 of FIGS. 5A-5K. Rearranging the graphical diagram according to the modified hierarchy at block 606 may include displaying on the display device a row of one or more first graphical containers that represent one or more first group members of the first group and a column of one or more second graphical containers that represent one or more second group members of the second group, the row of one or more first graphical containers and the column of one or more second graphical containers arranged to intersect each other. Rearranging the graphical objects according to the modified hierarchy at block 606 may include positioning at least some of the graphical objects in intersection areas or non-intersection areas of the one or more first graphical containers and the one or more second graphical containers according to their membership in one or both of a corresponding first or second group member. Examples of the foregoing are disclosed with respect to, e.g., FIGS. 3C-3J, 5F, 5H and the accompanying description. In some embodiments, each graphical object that belongs to a single first group member or second group member is positioned in a non-intersection area of the corresponding first or second graphical container and each graphical object that belongs to both a first group member and a second group member is positioned in an intersection area of the corresponding first and second graphical containers.

In some embodiments, receiving the input effective to modify the hierarchy of the graphical diagram at block 604 includes receiving input effective to disable a cross-layout in which first and second groups at a first hierarchical level of the two or more hierarchical levels are both enabled simultaneously. The input to disable the cross-layout may include input to deselect the "Cross-Layout" option in FIG. 3A (e.g., via selection of the Hierarchical option) or to remove a group from a same hierarchical level as another group as in the case of removing the "AZs" group or "VPCs" group from the same hierarchical level as the other of the "VPCs" group or the "AZs" group, e.g., using the layout menu 532 of FIGS. 5A-5K. Rearranging the graphical diagram according to the modified hierarchy at block 606 may include removing from the first hierarchical level of the graphical diagram on the display device one or more first graphical containers that respectively represent one or more first group members of the first group, the one or more first graphical containers prior to removal arranged in a row or column that intersects a column or row of one or more second graphical containers that respectively represent one or more second group members of the second group. Rearranging at least some of the graphical objects according to the modified hierarchy at block 606 may include positioning on the display device graphical objects belonging to the one or more first group members within or without one or more other currently displayed graphical containers according to their membership in one or more other group members represented by the one or more other currently displayed graphical containers.

In some embodiments, receiving the input effective to modify the hierarchy of the graphical diagram at block 604 includes receiving input effective to move a first group from a first hierarchical level of the two or more hierarchical levels to a second hierarchical level of the two or more hierarchical levels. Rearranging the graphical diagram according to the modified hierarchy at block 606 may include expanding a first graphical container that represents a first group member of the first group to surround a second graphical container that represents a second group member of a second group at a lower hierarchical level in the modified hierarchy than the first group, the second graphical container surrounding the first graphical container prior to the rearranging and the second group at a higher hierarchical level than the first group prior to the modifying. Alternatively, rearranging the graphical diagram according to the modified hierarchy at block 606 may include reducing a first graphical container that represents a first group member of the first group to be surrounded by a second graphical container that represents a second group member of a second group at a higher hierarchical level in the modified hierarchy than the first group, the second graphical container being surrounded by the first graphical container prior to the rearranging and the second group at a lower hierarchical level than the first group prior to the modifying. Examples of the foregoing are described with respect to, e.g., FIGS. 3B-3E.

In some embodiments, the graphical objects may represent data objects in structured source data and the method 600 may further include enforcing semantic constraints derived from the structured source data when rearranging the graphical diagram according to the modified hierarchy. As an example, enforcing semantic constraints derived from the structured source data when rearranging the graphical diagram according to the modified hierarchy may include depicting data storage volumes within a corresponding AZ and/or a region and outside of any VPC. In particular, data storage volumes such as the data storage volumes 516A, 516B in, e.g., FIGS. 5A and 5C do not reside within any VPCs because VPCs are a purely virtual construct. However, data storage volumes do reside inside corresponding AZs and regions, which are physical constructs. Thus, in the example of FIGS. 5A, 5C, 5F, 5H, and 5K, the data storage volumes 516A, 516B are shown within corresponding AZs and regions but outside of any VPCs. As another example, ACLs, such as the ACLs 510 in, e.g., FIGS. 5A and 5C, are control lists that exist because of corresponding VPCs and subnets. ACLs may be defined in a VPC, but are attached to Subnets. The diagram may permit the ACLs to be shown at the hierarchical level that is appropriate. For instance, enforcing the semantic constraints may include showing a given ACL attached to a corresponding subnet in a corresponding location if the ACL is attached to a Subnet such that there is an association with that subnet to a given AZ. Alternatively or additionally, enforcing the semantic constraints may include showing the ACL in the corresponding VPC and not with an AZ if the ACL is defined in the VPC without an association with a corresponding subnet.

In some embodiments, the method 600 may further include receiving second input to switch between two different visualization techniques. The two different visualization techniques may include a containment visualization technique in which graphical objects that are associated with a group member in a group at a higher hierarchical level than the graphical objects are displayed within a graphical container that represents the group member. Alternatively or additionally, the two different visualization techniques may include an association visualization technique in which graphical objects that are associated with a group member in a group at a higher hierarchical level than the graphical objects are displayed with a graphical badge that indicates a given graphical object is associated with a given group member. In an example, the layout menu 532 may have a user interface element to change the visualization technique used for a given group from containment to association or vice versa. When the selected visualization technique for a group is containment, the graphical diagram 506 may include a different graphical container for each group member of the group, with graphical objects arranged within or without the graphical containers based on their membership in a corresponding group member. On the other hand, when the selected visualization technique for a group is association, the graphical diagram 506 may apply, for each group member of the group, a corresponding badge or icon to each graphical object that belongs to the corresponding group member.

FIG. 7 is a block diagram illustrating an example computing device 700 that is arranged to generate and/or display graphical diagrams, arranged in accordance with at least one embodiment described herein. The computing device 700 may include, be included in, or otherwise correspond to either or both of the server 102 or the client devices 104, 106, 108 of FIG. 1. In a basic configuration 702, the computing device 700 typically includes one or more processors 704 and a system memory 706. A memory bus 708 may be used to communicate between the processor 704 and the system memory 706.

Depending on the desired configuration, the processor 704 may be of any type including, but not limited to, a microprocessor (μP), a microcontroller (μC), a digital signal processor (DSP), or any combination thereof. The processor 704 may include one or more levels of caching, such as a level one cache 710 and a level two cache 712, a processor core 714, and registers 716. The processor core 714 may include an arithmetic logic unit (ALU), a floating point unit (FPU), a digital signal processing core (DSP Core), or any combination thereof. An example memory controller 718 may also be used with the processor 704, or in some implementations the memory controller 718 may include an internal part of the processor 704.

Depending on the desired configuration, the system memory 706 may be of any type including volatile memory (such as RAM), nonvolatile memory (such as ROM, flash memory, etc.), or any combination thereof. The system memory 706 may include an operating system 720, one or more applications 722, and program data 724. The application 722 may include a diagram application 726 that is arranged to generate and/or display graphical diagrams. The diagram application 726 may include, be included in, or otherwise correspond to the diagram application 114 of FIG. 1. The program data 724 may include graphical diagrams 728 (which may include, be included in, or otherwise correspond to the graphical diagrams 126 of FIG. 1) as is described herein, structured source data collections (such as structured source data 120 of FIG. 1), models of structured source data (such as models 122 of FIG. 1) and/or other graphical data. In some embodiments, the application 722 may be arranged to operate with the program data 724 on the operating system 720 such that one or more methods may be provided as described herein.

The computing device 700 may have additional features or functionality, and additional interfaces to facilitate communications between the basic configuration 702 and any involved devices and interfaces. For example, a bus/interface controller 730 may be used to facilitate communications between the basic configuration 702 and one or more data storage devices 732 via a storage interface bus 734. The data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 706, the removable storage devices 736, and the non-removable storage devices 738 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 700. Any such computer storage media or non-transitory computer-readable media may be part of the computing device 700.

The computing device 700 may also include an interface bus 740 to facilitate communication from various interface devices (e.g., output devices 742, peripheral interfaces 744, and communication devices 746) to the basic configuration 702 via the bus/interface controller 730. The output devices 742 include a graphics processing unit 748 and an audio processing unit 750, which may be configured to communicate to various external devices such as a display or speakers via one or more A/V ports 752. Diagrams, flowcharts, organizational charts, connectors, and/or other graphical objects generated by the diagram application 726 may be output through the graphics processing unit 748 to such a display. The peripheral interfaces 744 include a serial interface controller 754 or a parallel interface controller 756, which may be configured to communicate with external devices such as input devices (e.g., keyboard, mouse, pen, voice input device, touch input device, etc.), sensors, or other peripheral devices (e.g., printer, scanner, etc.) via one or more I/O ports 758. Such input devices may be operated by a user to provide input to the diagram application 726, which input may be effective to, e.g., generate curved connectors, designate points as designated points of one or more curved connectors, relocate one or more designated points, and/or to accomplish other operations within the diagram application 726. The communication devices 746 include a network controller 760, which may be arranged to facilitate communications with one or more other computing devices 762 over a network communication link via one or more communication ports 764.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 700 may be implemented as a portion of a small-form factor portable (or mobile) electronic device such as a smartphone, a personal data assistant (PDA) or an application-specific device. The computing device 700 may also be implemented as a personal computer including tablet computer, laptop computer, and/or non-laptop computer configurations, or a server computer including both rack-mounted server computer and blade server computer configurations.

Embodiments described herein may be implemented using computer-readable media for carrying or having computer-executable instructions or data structures stored thereon. Such computer-readable media may be any available media that may be accessed by a general-purpose or special-purpose computer. By way of example, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method to display graphical diagrams, the method comprising:

displaying, on a display device, a graphical diagram with a plurality of graphical objects, the plurality of graphical objects representing a plurality of data objects, resources, or nodes that are arranged hierarchically in structured source data, wherein the structured source data defines a hierarchy including two or more hierarchical levels, and wherein each data object, resource, or node in the structured source data belongs to one or more groups defined at a given hierarchical level of the hierarchy;

receiving input effective to modify a hierarchy of the graphical diagram, the hierarchy including two or more hierarchical levels, including receiving input effective to enable a cross-layout in which first and second group categories each representing a different grouping category at a first hierarchical level of the two or more hierarchical levels are both enabled simultaneously; and rearranging the graphical diagram using a recursive algorithm that traverses the hierarchical levels of the structured source data according to the modified hierarchy, including:

displaying on the display device a row of one or more first graphical containers that represent one or more first groups of the first group category and a column of one or more second graphical containers that represent one or more second groups of the second group category, the row of one or more first graphical containers and the column of one or more second graphical containers arranged to intersect each other; and rearranging at least some of the plurality of graphical objects according to the modified hierarchy includes positioning the at least some of the graphical objects in intersection areas or non-intersection areas of the one or more first graphical containers and the one or more second graphical containers according to membership of corresponding data objects, resources, or nodes represented by the at least some of the plurality of graphical objects in one or both of a corresponding first or second group in the structured source data, wherein a graphical object is positioned in an intersection area when its corresponding data object, resource, or node belongs to both a group of the first group category and a group of the second group category as defined in the structured source data, and is positioned in a non-intersection area when its corresponding data object, resource, or node belongs to only one of the first group category or the second group category as defined in the structured source data.

2. The computer-implemented method of claim 1, further comprising, receiving second input to further modify the hierarchy of the graphical diagram and rearranging the graphical diagram using the recursive algorithm according to the further modified hierarchy, wherein:

receiving the second input effective to further modify the hierarchy of the graphical diagram includes receiving input effective to disable or enable a group category at a first hierarchical level of the two or more hierarchical levels; and rearranging the graphical diagram according to the further modified hierarchy includes one of:

removing from the first hierarchical level of the graphical diagram on the display device one or more graphical containers that respectively represent one or more groups of the group category in response to receiving input effective to disable the group category; or adding to the first hierarchical level of the graphical diagram on the display device one or more graphical containers that respectively represent one or more groups of the group category in response to receiving input effective to enable the group category.

3. The computer-implemented method of claim 1, further comprising, receiving second input to further modify the hierarchy of the graphical diagram and rearranging the graphical diagram using the recursive algorithm according to the further modified hierarchy, including rearranging at least some of the plurality of graphical objects according to the further modified hierarchy, wherein:

receiving the second input effective to further modify the hierarchy of the graphical diagram includes receiving input effective to disable the first group category at the first hierarchical level of the two or more hierarchical levels;

one or more first subsets of the plurality of graphical objects respectively belong to the one or more first groups;

rearranging the graphical diagram according to the further modified hierarchy includes removing from the first hierarchical level of the graphical diagram on the display device the one or more first graphical containers that respectively represent the one or more first groups of the first group category; and rearranging the at least some of the plurality of graphical objects according to the further modified hierarchy includes rearranging graphical objects of the one or more first subsets on the display device according to their membership in the one or more second groups of the second group category in the structured source data.

4. The computer-implemented method of claim 1, wherein:

the method further comprises, prior to receiving the input effective to enable the cross-layout, receiving second input effective to enable the first group category at the first hierarchical level of the two or more hierarchical levels;

one or more subsets of the plurality of graphical objects respectively belong to the one or more first groups;

the method further comprises, prior to rearranging the at least some of the plurality of graphical objects according to the modified hierarchy, adding the one or more first graphical containers to the graphical diagram on the display device arranged in the graphical diagram at the first hierarchical level;

the one or more first graphical containers respectively represent the one or more first groups of the first group category; and the method further comprises, prior to rearranging the at least some of the plurality of graphical objects according to the modified hierarchy, rearranging graphical objects of the one or more subsets into the one or more first graphical containers on the display device according to their membership in the one or more groups.

5. The computer-implemented method of claim 1, further comprising, receiving second input to further modify the hierarchy of the graphical diagram and rearranging the graphical diagram using the recursive algorithm according to the further modified hierarchy, wherein:

receiving the second input effective to further modify the hierarchy of the graphical diagram includes receiving input effective to disable the cross-layout in which the first and second group categories at the first hierarchical level of the two or more hierarchical levels are both enabled simultaneously; and rearranging the graphical diagram according to the further modified hierarchy includes removing from the first hierarchical level of the graphical diagram on the display device the one or more first graphical containers that respectively represent the one or more first groups of the first group category and rearranging on the display device graphical objects belonging to the one or more first groups according to their membership in the one or more second groups represented by the one or more second graphical containers.

6. The computer-implemented method of claim 1, further comprising, receiving second input to further modify the hierarchy of the graphical diagram and rearranging the graphical diagram using the recursive algorithm according to the further modified hierarchy, including rearranging at least some of the plurality of graphical objects according to the further modified hierarchy, wherein:

receiving the second input effective to further modify the hierarchy of the graphical diagram includes receiving input effective to disable the cross-layout in which the first and second group categories at the first hierarchical level of the two or more hierarchical levels are both enabled simultaneously;

rearranging the graphical diagram according to the further modified hierarchy includes removing from the first hierarchical level of the graphical diagram on the display device the one or more first graphical containers that respectively represent the one or more first groups of the first group category, the one or more first graphical containers prior to removal arranged in the row that intersects the column of the one or more second graphical containers that respectively represent the one or more second groups of the second group category; and rearranging the at least some of the plurality of graphical objects according to the further modified hierarchy includes positioning on the display device graphical objects belonging to the one or more first groups within or without one or more other currently displayed graphical containers according to their membership in one or more other groups represented by the one or more other currently displayed graphical containers.

7. The computer-implemented method of claim 1, further comprising, receiving second input to further modify the hierarchy of the graphical diagram and rearranging the graphical diagram using the recursive algorithm according to the further modified hierarchy, wherein:

receiving the second input effective to further modify the hierarchy of the graphical diagram includes receiving input effective to move the first group category from the first hierarchical level of the two or more hierarchical levels to a second hierarchical level of the two or more hierarchical levels; and rearranging the graphical diagram according to the further modified hierarchy includes one of:

expanding one of the one or more first graphical containers that represents one of the one or more first groups of the first group category to surround a third graphical container that represents a third group of a third group category at a lower hierarchical level in the modified hierarchy than the first group category, the third graphical container surrounding the first graphical container prior to the rearranging and the third group category at a higher hierarchical level than the first group category prior to the modifying; or reducing one of the one or more first graphical containers that represents one of the one or more first groups of the first group category to be surrounded by a third graphical container that represents a third group of a third group category at a higher hierarchical level in the modified hierarchy than the first group category, the third graphical container being surrounded by the third graphical container prior to the rearranging and the third group category at a lower hierarchical level than the first group category prior to the modifying.

8. The computer-implemented method of claim 1, the method further comprising enforcing semantic constraints derived from the structured source data when rearranging the graphical diagram according to the modified hierarchy.

9. The computer-implemented method of claim 1, further comprising receiving second input effective to switch between two different visualization techniques, wherein the two different visualization techniques include:

a containment visualization technique in which graphical objects that are associated with a group in a group category at a higher hierarchical level than the graphical objects are displayed within a graphical container that represents the group; and an association visualization technique in which graphical objects that are associated with a group in a group category at a higher hierarchical level than the graphical objects are displayed with a graphical badge that indicates a given graphical object is associated with a given group.

10. A non-transitory computer-readable medium having computer-readable instructions stored thereon that are executable by a processor to perform or control performance of operations comprising:

displaying, on a display device, a graphical diagram with a plurality of graphical objects, the plurality of graphical objects representing a plurality of data objects, resources, or nodes that are arranged hierarchically in structured source data, wherein the structured source data defines a hierarchy including two or more hierarchical levels, and wherein each data object, resource, or node in the structured source data belongs to one or more groups defined at a given hierarchical level of the hierarchy;

receiving input effective to modify a hierarchy of the graphical diagram, the hierarchy including two or more hierarchical levels, including receiving input effective to enable a cross-layout in which first and second group categories each representing a different grouping category a first hierarchical level of the two or more hierarchical levels are both enabled simultaneously; and rearranging the graphical diagram using a recursive algorithm that traverses the hierarchical levels of the structured source data according to the modified hierarchy, including;

displaying on the display device a row of one or more first graphical containers that represent one or more first groups of the first group category and a column of one or more second graphical containers that represent one or more second groups of the second group category, the row of one or more first graphical containers and the column of one or more second graphical containers arranged to intersect each other; and rearranging the at least some of the plurality of graphical objects according to the modified hierarchy includes positioning the at least some of the graphical objects in intersection areas or non-intersection areas of the one or more first graphical containers and the one or more second graphical containers according to membership of corresponding data objects, resources, or nodes represented by the at least some of the plurality of graphical objects in one or both of a corresponding first or second group in the structured source data, wherein a graphical object is positioned in an intersection area when its corresponding data object, resource, or node belongs to both a group of the first group category and a group of the second group category as defined in the structured source data, and is positioned in a non-intersection area when its corresponding data object, resource, or node belongs to only one of the first group category or the second group category as defined in the structured source data.

11. The non-transitory computer-readable medium of claim 10, the operations further comprising, receiving second input to further modify the hierarchy of the graphical diagram and rearranging the graphical diagram using the recursive algorithm according to the further modified hierarchy, wherein:

receiving the second input effective to further modify the hierarchy of the graphical diagram includes receiving input effective to disable or enable a group category at a first hierarchical level of the two or more hierarchical levels; and rearranging the graphical diagram according to the further modified hierarchy includes one of:

removing from the first hierarchical level of the graphical diagram on the display device one or more graphical containers that respectively represent one or more groups of the group category in response to receiving input effective to disable the group category; or adding to the first hierarchical level of the graphical diagram on the display device one or more graphical containers that respectively represent one or more groups of the group category in response to receiving input effective to enable the group category.

12. The non-transitory computer-readable medium of claim 10, the operations further comprising, receiving second input to further modify the hierarchy of the graphical diagram and rearranging the graphical diagram using the recursive algorithm according to the further modified hierarchy, including rearranging at least some of the plurality of graphical objects according to the further modified hierarchy, wherein:

receiving the second input effective to further modify the hierarchy of the graphical diagram includes receiving input effective to disable the first group category at the first hierarchical level of the two or more hierarchical levels;

one or more first subsets of the plurality of graphical objects respectively belong to the one or more first groups;

rearranging the graphical diagram according to the further modified hierarchy includes removing from the first hierarchical level of the graphical diagram on the display device the one or more first graphical containers that respectively represent the one or more first groups of the first group category; and rearranging the at least some of the plurality of graphical objects according to the further modified hierarchy includes rearranging graphical objects of the one or more first subsets on the display device according to their membership in the one or more second groups of the second group category in the structured source data.

13. The non-transitory computer-readable medium of claim 10, wherein:

the method further comprises, prior to receiving the input effective to enable the cross-layout, receiving second input effective to enable the first group category at the first hierarchical level of the two or more hierarchical levels;

one or more subsets of the plurality of graphical objects respectively belong to the one or more first groups;

the method further comprises, prior to rearranging the at least some of the plurality of graphical objects according to the modified hierarchy, adding the one or more first graphical containers to the graphical diagram on the display device arranged in the graphical diagram at the first hierarchical level;

the one or more first graphical containers respectively represent the one or more first groups of the first group category; and the operations further comprise, prior to rearranging the at least some of the plurality of graphical objects according to the modified hierarchy, rearranging graphical objects of the one or more subsets into the one or more first graphical containers on the display device according to their membership in the one or more groups.

14. The non-transitory computer-readable medium of claim 10, the operations further comprising, receiving second input to further modify the hierarchy of the graphical diagram and rearranging the graphical diagram using the recursive algorithm according to the further modified hierarchy, wherein:

receiving the second input effective to further modify the hierarchy of the graphical diagram includes receiving input effective to disable the cross-layout in which the first and second group categories at the first hierarchical level of the two or more hierarchical levels are both enabled simultaneously; and rearranging the graphical diagram according to the further modified hierarchy includes removing from the first hierarchical level of the graphical diagram on the display device the one or more first graphical containers that respectively represent the one or more first groups of the first group category and rearranging on the display device graphical objects belonging to the one or more first groups according to their membership in the one or more second groups represented by the one or more second graphical containers.

15. The non-transitory computer-readable medium of claim 10, the operations further comprising, receiving second input to further modify the hierarchy of the graphical diagram and rearranging the graphical diagram using the recursive algorithm according to the further modified hierarchy, including rearranging at least some of the plurality of graphical objects according to the further modified hierarchy, wherein:

receiving the second input effective to further modify the hierarchy of the graphical diagram includes receiving input effective to disable the cross-layout in which the first and second group categories at the first hierarchical level of the two or more hierarchical levels are both enabled simultaneously;

rearranging the graphical diagram according to the further modified hierarchy includes removing from the first hierarchical level of the graphical diagram on the display device the one or more first graphical containers that respectively represent the one or more first groups of the first group category, the one or more first graphical containers prior to removal arranged in the row that intersects the column of the one or more second graphical containers that respectively represent the one or more second groups of the second group category; and rearranging the at least some of the plurality of graphical objects according to the further modified hierarchy includes positioning on the display device graphical objects belonging to the one or more first groups within or without one or more other currently displayed graphical containers according to their membership in one or more other groups represented by the one or more other currently displayed graphical containers.

16. The non-transitory computer-readable medium of claim 10, the operations further comprising, receiving second input to further modify the hierarchy of the graphical diagram and rearranging the graphical diagram using the recursive algorithm according to the further modified hierarchy, wherein:

receiving the second input effective to further modify the hierarchy of the graphical diagram includes receiving input effective to move first group category from the first hierarchical level of the two or more hierarchical levels to a second hierarchical level of the two or more hierarchical levels; and rearranging the graphical diagram according to the further modified hierarchy includes one of:

expanding one of the one or more first graphical containers that represents one of the one or more first groups of the first group category to surround a third graphical container that represents a third group of a third group category at a lower hierarchical level in the modified hierarchy than the first group category, the third graphical container surrounding the first graphical container prior to the rearranging and the third group category at a higher hierarchical level than the first group category prior to the modifying; or reducing one of the one or more first graphical containers that represents one of the one or more first groups of the first group category to be surrounded by a third graphical container that represents a third group of a third group category at a higher hierarchical level in the modified hierarchy than the first group category, the third graphical container being surrounded by the first graphical container prior to the rearranging and the third group category at a lower hierarchical level than the first group category prior to the modifying.

17. The non-transitory computer-readable medium of claim 10, the operations further comprising enforcing semantic constraints derived from the structured source data when rearranging the graphical diagram according to the modified hierarchy.

18. The non-transitory computer-readable medium of claim 10, the operations further comprising receiving second input effective to switch between two different visualization techniques, wherein the two different visualization techniques include:

a containment visualization technique in which graphical objects that are associated with a group in a group category at a higher hierarchical level than the graphical objects are displayed within a graphical container that represents the group; and an association visualization technique in which graphical objects that are associated with a group in a group category at a higher hierarchical level than the graphical objects are displayed with a graphical badge that indicates a given graphical object is associated with a given group.

* * * * *